US012776306B2

(12) United States Patent
Tolomei et al.

(10) Patent No.: US 12,776,306 B2
(45) Date of Patent: *Oct. 27, 2026

(54) NETWORKED MICROPHONE DEVICES, SYSTEMS, AND METHODS OF LOCALIZED ARBITRATION

(71) Applicant: Sonos, Inc., Santa Barbara, CA (US)

(72) Inventors: John Tolomei, Renton, WA (US); Klaus Hartung, Boston, MA (US)

(73) Assignee: Sonos, Inc., Goleta, CA (US)

( * ) Notice: Subject to any disclaimer, the term of this patent is extended or adjusted under 35 U.S.C. 154(b) by 304 days.

This patent is subject to a terminal disclaimer.

(21) Appl. No.: 18/508,060

(22) Filed: Nov. 13, 2023

(65) Prior Publication Data

US 2024/0153496 A1 May 9, 2024

Related U.S. Application Data

(63) Continuation of application No. 18/145,520, filed on Dec. 22, 2022, now Pat. No. 11,817,083, which is a (Continued)

(51) Int. Cl.

*G10L 15/22* (2006.01)
*G10L 15/08* (2006.01)
*H04R 3/00* (2006.01)

(52) U.S. Cl.

CPC .............. *G10L 15/08* (2013.01); *G10L 15/22* (2013.01); *H04R 3/005* (2013.01); (Continued)

(58) Field of Classification Search

None

See application file for complete search history.

(56) References Cited

U.S. PATENT DOCUMENTS 999,715 A 8/1911 Gundersen
4,741,038 A 4/1988 Elko et al.
(Continued)

FOREIGN PATENT DOCUMENTS

AU 2017100486 A4 6/2017
AU 2017100581 A4 6/2017
(Continued)

OTHER PUBLICATIONS

US 9,299,346 B1, 03/2016, Hart et al. (withdrawn)
(Continued)

*Primary Examiner* — Jakieda R Jackson

(57) ABSTRACT

A first playback device is configured to perform functions comprising: detecting sound, identifying a wake word based on the sound as detected by the first device, receiving an indication that a second playback device has also detected the sound and identified the wake word based on the sound as detected by the second device, after receiving the indication, evaluating which of the first and second devices is to extract sound data representing the sound and thereby determining that the extraction of the sound data is to be performed by the second device over the first device, in response to the determining, foregoing extraction of the sound data, receiving VAS response data that is indicative of a given VAS response corresponding to a given voice input identified in the sound data extracted by the second device, and based on the VAS response data, output the given VAS response.

20 Claims, 11 Drawing Sheets

Related U.S. Application Data continuation of application No. 17/486,574, filed on Sep. 27, 2021, now Pat. No. 11,538,460, which is a continuation of application No. 16/219,702, filed on Dec. 13, 2018, now Pat. No. 11,132,989.

(52) U.S. Cl.
CPC .. *G10L 2015/088* (2013.01); *G10L 2015/223* (2013.01); *G10L 2015/226* (2013.01)

(56) References Cited

U.S. PATENT DOCUMENTS

| | | | |
|---|---|---|---|
| 4,941,187 | A | 7/1990 | Slater |
| 4,974,213 | A | 11/1990 | Siwecki |
| 5,036,538 | A | 7/1991 | Oken et al. |
| 5,440,644 | A | 8/1995 | Farinelli et al. |
| 5,588,065 | A | 12/1996 | Tanaka et al. |
| 5,717,768 | A | 2/1998 | Laroche |
| 5,740,260 | A | 4/1998 | Odom |
| 5,761,320 | A | 6/1998 | Farinelli et al. |
| 5,857,172 | A | 1/1999 | Rozak |
| 5,923,902 | A | 7/1999 | Inagaki |
| 5,949,414 | A | 9/1999 | Namikata et al. |
| 6,032,202 | A | 2/2000 | Lea et al. |
| 6,070,140 | A | 5/2000 | Tran |
| 6,088,459 | A | 7/2000 | Hobelsberger |
| 6,219,645 | B1 | 4/2001 | Byers |
| 6,256,554 | B1 | 7/2001 | DiLorenzo |
| 6,301,603 | B1 | 10/2001 | Maher et al. |
| 6,311,157 | B1 | 10/2001 | Strong |
| 6,366,886 | B1 | 4/2002 | Dragosh et al. |
| 6,404,811 | B1 | 6/2002 | Cvetko et al. |
| 6,408,078 | B1 | 6/2002 | Hobelsberger |
| 6,469,633 | B1 | 10/2002 | Wachter |
| 6,522,886 | B1 | 2/2003 | Youngs et al. |
| 6,594,347 | B1 | 7/2003 | Calder et al. |
| 6,594,630 | B1 | 7/2003 | Zlokarnik et al. |
| 6,611,537 | B1 | 8/2003 | Edens et al. |
| 6,611,604 | B1 | 8/2003 | Irby et al. |
| 6,631,410 | B1 | 10/2003 | Kowalski et al. |
| 6,704,671 | B1 | 3/2004 | Umminger, III |
| 6,757,517 | B2 | 6/2004 | Chang |
| 6,778,869 | B2 | 8/2004 | Champion |
| 6,937,977 | B2 | 8/2005 | Gerson |
| 7,099,821 | B2 | 8/2006 | Visser et al. |
| 7,103,542 | B2 | 9/2006 | Doyle |
| 7,130,608 | B2 | 10/2006 | Hollstrom et al. |
| 7,130,616 | B2 | 10/2006 | Janik |
| 7,143,939 | B2 | 12/2006 | Henzerling |
| 7,174,299 | B2 | 2/2007 | Fujii et al. |
| 7,228,275 | B1 | 6/2007 | Endo et al. |
| 7,236,773 | B2 | 6/2007 | Thomas |
| 7,295,548 | B2 | 11/2007 | Blank et al. |
| 7,356,471 | B2 | 4/2008 | Ito et al. |
| 7,383,297 | B1 | 6/2008 | Atsmon et al. |
| 7,391,791 | B2 | 6/2008 | Balassanian et al. |
| 7,483,538 | B2 | 1/2009 | McCarty et al. |
| 7,516,068 | B1 | 4/2009 | Clark |
| 7,571,014 | B1 | 8/2009 | Lambourne et al. |
| 7,577,757 | B2 | 8/2009 | Carter et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,661,107 | B1 | 2/2010 | Van et al. |
| 7,702,508 | B2 | 4/2010 | Bennett |
| 7,705,565 | B2 | 4/2010 | Patino et al. |
| 7,792,311 | B1 | 9/2010 | Holmgren et al. |
| 7,853,341 | B2 | 12/2010 | McCarty et al. |
| 7,961,892 | B2 | 6/2011 | Fedigan |
| 7,987,294 | B2 | 7/2011 | Bryce et al. |
| 8,014,423 | B2 | 9/2011 | Thaler et al. |
| 8,019,076 | B1 | 9/2011 | Lambert |
| 8,032,383 | B1 | 10/2011 | Bhardwaj et al. |
| 8,041,565 | B1 | 10/2011 | Bhardwaj et al. |
| 8,045,952 | B2 | 10/2011 | Qureshey et al. |
| 8,073,125 | B2 | 12/2011 | Zhang et al. |
| 8,073,681 | B2 | 12/2011 | Baldwin et al. |
| 8,085,947 | B2 | 12/2011 | Haulick et al. |
| 8,103,009 | B2 | 1/2012 | McCarty et al. |
| 8,136,040 | B2 | 3/2012 | Fleming |
| 8,165,867 | B1 | 4/2012 | Fish |
| 8,233,632 | B1 | 7/2012 | Macdonald et al. |
| 8,234,395 | B2 | 7/2012 | Millington |
| 8,239,206 | B1 | 8/2012 | LeBeau et al. |
| 8,255,224 | B2 | 8/2012 | Singleton et al. |
| 8,284,982 | B2 | 10/2012 | Bailey |
| 8,290,603 | B1 | 10/2012 | Lambourne |
| 8,325,909 | B2 | 12/2012 | Tashev et al. |
| 8,340,975 | B1 | 12/2012 | Rosenberger |
| 8,364,481 | B2 | 1/2013 | Strope et al. |
| 8,385,557 | B2 | 2/2013 | Tashev et al. |
| 8,386,261 | B2 | 2/2013 | Mellott et al. |
| 8,386,523 | B2 | 2/2013 | Mody et al. |
| 8,423,893 | B2 | 4/2013 | Ramsay et al. |
| 8,428,758 | B2 | 4/2013 | Naik et al. |
| 8,453,058 | B1 | 5/2013 | Coccaro et al. |
| 8,473,618 | B2 | 6/2013 | Spear et al. |
| 8,483,853 | B1 | 7/2013 | Lambourne |
| 8,484,025 | B1 | 7/2013 | Moreno et al. |
| 8,489,398 | B1 | 7/2013 | Gruenstein |
| 8,566,722 | B2 | 10/2013 | Gordon et al. |
| 8,588,849 | B2 | 11/2013 | Patterson et al. |
| 8,594,320 | B2 | 11/2013 | Faller |
| 8,600,443 | B2 | 12/2013 | Kawaguchi et al. |
| 8,620,232 | B2 | 12/2013 | Helsloot |
| 8,639,214 | B1 | 1/2014 | Fujisaki |
| 8,676,273 | B1 | 3/2014 | Fujisaki |
| 8,710,970 | B2 | 4/2014 | Oelrich et al. |
| 8,719,039 | B1 | 5/2014 | Sharifi |
| 8,738,925 | B1 | 5/2014 | Park et al. |
| 8,762,156 | B2 | 6/2014 | Chen |
| 8,768,712 | B1 | 7/2014 | Sharifi |
| 8,775,191 | B1 | 7/2014 | Sharifi et al. |
| 8,798,995 | B1 | 8/2014 | Edara |
| 8,831,761 | B2 | 9/2014 | Kemp et al. |
| 8,831,957 | B2 | 9/2014 | Taubman et al. |
| 8,848,879 | B1 | 9/2014 | Coughlan et al. |
| 8,861,756 | B2 | 10/2014 | Zhu et al. |
| 8,874,448 | B1 | 10/2014 | Kauffmann et al. |
| 8,898,063 | B1 | 11/2014 | Sykes et al. |
| 8,938,394 | B1 | 1/2015 | Faaborg et al. |
| 8,942,252 | B2 | 1/2015 | Balassanian et al. |
| 8,983,383 | B1 | 3/2015 | Haskin |
| 8,983,844 | B1 | 3/2015 | Thomas et al. |
| 9,002,024 | B2 | 4/2015 | Nakadai et al. |
| 9,015,049 | B2 | 4/2015 | Baldwin et al. |
| 9,042,556 | B2 | 5/2015 | Kallai et al. |
| 9,047,857 | B1 | 6/2015 | Barton |
| 9,060,224 | B1 | 6/2015 | List |
| 9,070,367 | B1 | 6/2015 | Hoffmeister et al. |
| 9,088,336 | B2 | 7/2015 | Mani et al. |
| 9,094,539 | B1 | 7/2015 | Noble |
| 9,098,467 | B1 | 8/2015 | Blanksteen et al. |
| 9,124,650 | B2 | 9/2015 | Maharajh et al. |
| 9,124,711 | B2 | 9/2015 | Park et al. |
| 9,148,742 | B1 | 9/2015 | Koulomzin et al. |
| 9,183,845 | B1 | 11/2015 | Gopalakrishnan et al. |
| 9,190,043 | B2 | 11/2015 | Krisch et al. |
| 9,208,785 | B2 | 12/2015 | Ben-David et al. |
| 9,215,545 | B2 | 12/2015 | Dublin et al. |
| 9,226,088 | B2 | 12/2015 | Pandey et al. |
| 9,245,527 | B2 | 1/2016 | Lindahl |
| 9,251,793 | B2 | 2/2016 | Lebeau et al. |
| 9,253,572 | B2 | 2/2016 | Beddingfield, Sr. et al. |
| 9,262,612 | B2 | 2/2016 | Cheyer |
| 9,263,042 | B1 | 2/2016 | Sharifi |
| 9,275,637 | B1 | 3/2016 | Salvador et al. |
| 9,288,597 | B2 | 3/2016 | Carlsson et al. |
| 9,300,266 | B2 | 3/2016 | Grokop |
| 9,304,736 | B1 | 4/2016 | Whiteley et al. |
| 9,307,321 | B1 | 4/2016 | Unruh |
| 9,313,317 | B1 | 4/2016 | Lebeau et al. |
| 9,318,107 | B1 | 4/2016 | Sharifi |
| 9,319,816 | B1 | 4/2016 | Narayanan |

(56) References Cited

U.S. PATENT DOCUMENTS

| | | | |
|---|---|---|---|
| 9,324,322 | B1 | 4/2016 | Torok et al. |
| 9,335,819 | B1 | 5/2016 | Jaeger et al. |
| 9,354,687 | B2 | 5/2016 | Bansal et al. |
| 9,361,878 | B2 | 6/2016 | Boukadakis |
| 9,361,885 | B2 | 6/2016 | Ganong, III et al. |
| 9,368,105 | B1 | 6/2016 | Freed et al. |
| 9,373,329 | B2 | 6/2016 | Strope et al. |
| 9,374,634 | B2 | 6/2016 | Macours |
| 9,386,154 | B2 | 7/2016 | Baciu et al. |
| 9,390,708 | B1 | 7/2016 | Hoffmeister |
| 9,401,058 | B2 | 7/2016 | De La Fuente et al. |
| 9,412,392 | B2 | 8/2016 | Lindahl et al. |
| 9,426,567 | B2 | 8/2016 | Lee et al. |
| 9,431,021 | B1 | 8/2016 | Scalise et al. |
| 9,443,516 | B2 | 9/2016 | Katuri et al. |
| 9,443,527 | B1 | 9/2016 | Watanabe et al. |
| 9,472,201 | B1 | 10/2016 | Sleator |
| 9,472,203 | B1 | 10/2016 | Ayrapetian et al. |
| 9,484,030 | B1 | 11/2016 | Meaney et al. |
| 9,489,948 | B1 | 11/2016 | Chu et al. |
| 9,491,033 | B1 | 11/2016 | Soyannwo et al. |
| 9,494,683 | B1 | 11/2016 | Sadek |
| 9,509,269 | B1 | 11/2016 | Rosenberg |
| 9,510,101 | B1 | 11/2016 | Polleros |
| 9,514,476 | B2 | 12/2016 | Kay et al. |
| 9,514,747 | B1 | 12/2016 | Bisani et al. |
| 9,514,752 | B2 | 12/2016 | Sharifi |
| 9,516,081 | B2 | 12/2016 | Tebbs et al. |
| 9,532,139 | B1 | 12/2016 | Lu et al. |
| 9,536,541 | B2 | 1/2017 | Chen et al. |
| 9,542,941 | B1 | 1/2017 | Weksler et al. |
| 9,548,053 | B1 | 1/2017 | Basye et al. |
| 9,548,066 | B2 | 1/2017 | Jain et al. |
| 9,552,816 | B2 | 1/2017 | Vanlund et al. |
| 9,554,210 | B1 | 1/2017 | Ayrapetian et al. |
| 9,558,755 | B1 | 1/2017 | Laroche et al. |
| 9,560,441 | B1 | 1/2017 | McDonough, Jr. et al. |
| 9,576,591 | B2 | 2/2017 | Kim et al. |
| 9,601,116 | B2 | 3/2017 | Casado et al. |
| 9,615,170 | B2 | 4/2017 | Kirsch et al. |
| 9,615,171 | B1 | 4/2017 | O'Neill et al. |
| 9,626,695 | B2 | 4/2017 | Balasubramanian et al. |
| 9,632,748 | B2 | 4/2017 | Faaborg et al. |
| 9,633,186 | B2 | 4/2017 | Ingrassia, Jr. et al. |
| 9,633,368 | B2 | 4/2017 | Greenzeiger et al. |
| 9,633,660 | B2 | 4/2017 | Haughay et al. |
| 9,633,661 | B1 | 4/2017 | Typrin et al. |
| 9,633,671 | B2 | 4/2017 | Giacobello et al. |
| 9,633,674 | B2 | 4/2017 | Sinha et al. |
| 9,640,179 | B1 | 5/2017 | Hart et al. |
| 9,640,183 | B2 | 5/2017 | Jung et al. |
| 9,640,194 | B1 | 5/2017 | Nemala et al. |
| 9,641,919 | B1 | 5/2017 | Poole et al. |
| 9,646,614 | B2 | 5/2017 | Bellegarda et al. |
| 9,648,564 | B1 | 5/2017 | Cui et al. |
| 9,653,060 | B1 | 5/2017 | Hilmes et al. |
| 9,653,075 | B1 | 5/2017 | Chen et al. |
| 9,659,555 | B1 | 5/2017 | Hilmes et al. |
| 9,672,812 | B1 | 6/2017 | Watanabe et al. |
| 9,672,821 | B2 | 6/2017 | Krishnaswamy et al. |
| 9,674,587 | B2 | 6/2017 | Triplett et al. |
| 9,685,171 | B1 | 6/2017 | Yang |
| 9,691,378 | B1 | 6/2017 | Meyers et al. |
| 9,691,379 | B1 | 6/2017 | Mathias et al. |
| 9,691,384 | B1 | 6/2017 | Wang et al. |
| 9,697,826 | B2 | 7/2017 | Sainath et al. |
| 9,697,828 | B1 | 7/2017 | Prasad et al. |
| 9,698,999 | B2 | 7/2017 | Mutagi et al. |
| 9,704,478 | B1 | 7/2017 | Vitaladevuni et al. |
| 9,706,320 | B2 | 7/2017 | Starobin et al. |
| 9,721,566 | B2 | 8/2017 | Newendorp et al. |
| 9,721,568 | B1 | 8/2017 | Polansky et al. |
| 9,721,570 | B1 | 8/2017 | Beal et al. |
| 9,728,188 | B1 | 8/2017 | Rosen et al. |
| 9,734,822 | B1 | 8/2017 | Sundaram et al. |
| 9,736,578 | B2 | 8/2017 | Iyengar et al. |
| 9,743,204 | B1 | 8/2017 | Welch et al. |
| 9,743,207 | B1 | 8/2017 | Hartung |
| 9,747,011 | B2 | 8/2017 | Lewis et al. |
| 9,747,899 | B2 | 8/2017 | Pogue et al. |
| 9,747,920 | B2 | 8/2017 | Ayrapetian et al. |
| 9,747,926 | B2 | 8/2017 | Sharifi et al. |
| 9,749,738 | B1 | 8/2017 | Adsumilli et al. |
| 9,749,760 | B2 | 8/2017 | Lambourne |
| 9,754,605 | B1 | 9/2017 | Chhetri |
| 9,756,422 | B2 | 9/2017 | Paquier et al. |
| 9,762,967 | B2 | 9/2017 | Clarke et al. |
| 9,767,786 | B2 | 9/2017 | Starobin et al. |
| 9,769,420 | B1 | 9/2017 | Moses |
| 9,779,725 | B2 | 10/2017 | Sun et al. |
| 9,779,732 | B2 | 10/2017 | Lee et al. |
| 9,779,734 | B2 | 10/2017 | Lee |
| 9,779,735 | B2 | 10/2017 | Civelli et al. |
| 9,781,532 | B2 | 10/2017 | Sheen |
| 9,799,330 | B2 | 10/2017 | Nemala et al. |
| 9,805,733 | B2 | 10/2017 | Park |
| 9,811,314 | B2 | 11/2017 | Plagge et al. |
| 9,812,128 | B2 | 11/2017 | Mixter et al. |
| 9,813,810 | B1 | 11/2017 | Nongpiur |
| 9,813,812 | B2 | 11/2017 | Berthelsen et al. |
| 9,818,407 | B1 | 11/2017 | Secker-Walker et al. |
| 9,820,036 | B1 | 11/2017 | Tritschler et al. |
| 9,820,039 | B2 | 11/2017 | Lang |
| 9,826,306 | B2 | 11/2017 | Lang |
| 9,865,259 | B1 | 1/2018 | Typrin et al. |
| 9,865,264 | B2 | 1/2018 | Gelfenbeyn et al. |
| 9,875,740 | B1 | 1/2018 | Kumar et al. |
| 9,881,616 | B2 | 1/2018 | Beckley et al. |
| 9,898,250 | B1 | 2/2018 | Williams et al. |
| 9,899,021 | B1 | 2/2018 | Vitaladevuni et al. |
| 9,900,723 | B1 | 2/2018 | Choisel et al. |
| 9,916,839 | B1 | 3/2018 | Scalise et al. |
| 9,940,930 | B1 | 4/2018 | Campbell et al. |
| 9,947,316 | B2 | 4/2018 | Millington et al. |
| 9,947,333 | B1 | 4/2018 | David |
| 9,972,318 | B1 | 5/2018 | Kelly et al. |
| 9,972,343 | B1 | 5/2018 | Thorson et al. |
| 9,973,849 | B1 | 5/2018 | Zhang et al. |
| 9,979,560 | B2 | 5/2018 | Kim et al. |
| 9,992,642 | B1 | 6/2018 | Rapp et al. |
| 9,997,151 | B1 | 6/2018 | Ayrapetian et al. |
| 10,013,381 | B2 | 7/2018 | Mayman et al. |
| 10,013,995 | B1 | 7/2018 | Lashkari et al. |
| 10,025,447 | B1 | 7/2018 | Dixit et al. |
| 10,026,401 | B1 | 7/2018 | Mutagi et al. |
| 10,028,069 | B1 | 7/2018 | Lang |
| 10,038,419 | B1 | 7/2018 | Elliot et al. |
| 10,048,930 | B1 | 8/2018 | Vega et al. |
| 10,049,675 | B2 | 8/2018 | Haughay |
| 10,051,366 | B1 | 8/2018 | Buoni et al. |
| 10,051,600 | B1 | 8/2018 | Zhong et al. |
| 10,057,698 | B2 | 8/2018 | Drinkwater et al. |
| RE47,049 | E | 9/2018 | Zhu et al. |
| 10,068,573 | B1 | 9/2018 | Aykac et al. |
| 10,074,369 | B2 | 9/2018 | Devaraj et al. |
| 10,074,371 | B1 | 9/2018 | Wang et al. |
| 10,079,015 | B1 | 9/2018 | Lockhart et al. |
| 10,089,981 | B1 | 10/2018 | Elangovan et al. |
| 10,108,393 | B2 | 10/2018 | Millington et al. |
| 10,115,400 | B2 | 10/2018 | Wilberding |
| 10,116,748 | B2 | 10/2018 | Farmer et al. |
| 10,127,908 | B1 | 11/2018 | Deller et al. |
| 10,127,911 | B2 | 11/2018 | Kim et al. |
| 10,134,388 | B1 | 11/2018 | Lilly |
| 10,134,398 | B2 | 11/2018 | Sharifi |
| 10,134,399 | B2 | 11/2018 | Lang et al. |
| 10,136,204 | B1 | 11/2018 | Poole et al. |
| 10,152,969 | B2 | 12/2018 | Reilly et al. |
| 10,157,042 | B1 | 12/2018 | Jayakumar et al. |
| 10,181,323 | B2 | 1/2019 | Beckhardt et al. |
| 10,186,265 | B1 | 1/2019 | Lockhart et al. |
| 10,186,266 | B1 | 1/2019 | Devaraj et al. |
| 10,186,276 | B2 | 1/2019 | Dewasurendra et al. |
| 10,192,546 | B1 | 1/2019 | Piersol et al. |

(56) References Cited

U.S. PATENT DOCUMENTS

| | | | |
|---|---|---|---|
| 10,204,624 | B1 | 2/2019 | Knudson et al. |
| 10,224,056 | B1 | 3/2019 | Torok et al. |
| 10,225,651 | B2 | 3/2019 | Lang |
| 10,229,680 | B1 | 3/2019 | Gillespie et al. |
| 10,241,754 | B1 | 3/2019 | Kadarundalagi Raghuram Doss et al. |
| 10,248,376 | B2 | 4/2019 | Keyser-Allen et al. |
| 10,249,205 | B2 | 4/2019 | Hammersley et al. |
| 10,276,161 | B2 | 4/2019 | Hughes et al. |
| 10,297,256 | B2 | 5/2019 | Reilly et al. |
| 10,304,440 | B1 | 5/2019 | Panchapagesan et al. |
| 10,304,475 | B1 | 5/2019 | Wang et al. |
| 10,318,236 | B1 | 6/2019 | Pal et al. |
| 10,332,508 | B1 | 6/2019 | Hoffmeister |
| 10,339,917 | B2 | 7/2019 | Aleksic et al. |
| 10,339,957 | B1 | 7/2019 | Chenier et al. |
| 10,346,122 | B1 | 7/2019 | Morgan |
| 10,354,650 | B2 | 7/2019 | Gruenstein et al. |
| 10,354,658 | B2 | 7/2019 | Wilberding |
| 10,365,887 | B1 | 7/2019 | Mulherkar |
| 10,365,889 | B2 | 7/2019 | Plagge et al. |
| 10,366,688 | B2 | 7/2019 | Gunn et al. |
| 10,366,699 | B1 | 7/2019 | Dharia et al. |
| 10,374,816 | B1 | 8/2019 | Leblang et al. |
| 10,381,001 | B2 | 8/2019 | Gunn et al. |
| 10,381,002 | B2 | 8/2019 | Gunn et al. |
| 10,381,003 | B2 | 8/2019 | Wakisaka et al. |
| 10,388,272 | B1 | 8/2019 | Thomson et al. |
| 10,424,296 | B2 | 9/2019 | Penilla et al. |
| 10,433,058 | B1 | 10/2019 | Torgerson et al. |
| 10,445,057 | B2 | 10/2019 | Vega et al. |
| 10,445,365 | B2 | 10/2019 | Luke et al. |
| 10,469,966 | B2 | 11/2019 | Lambourne |
| 10,482,899 | B2 | 11/2019 | Ramprashad et al. |
| 10,499,146 | B2 | 12/2019 | Lang et al. |
| 10,510,340 | B1 | 12/2019 | Fu et al. |
| 10,510,362 | B2 | 12/2019 | Hicks et al. |
| 10,511,904 | B2 | 12/2019 | Buoni et al. |
| 10,515,625 | B1 | 12/2019 | Metallinou et al. |
| 10,522,146 | B1 | 12/2019 | Tushinskiy |
| 10,546,583 | B2 | 1/2020 | White et al. |
| 10,565,998 | B2 | 2/2020 | Wilberding |
| 10,565,999 | B2 | 2/2020 | Wilberding |
| 10,567,515 | B1 | 2/2020 | Bao |
| 10,573,312 | B1 | 2/2020 | Thomson et al. |
| 10,573,321 | B1 | 2/2020 | Smith et al. |
| 10,580,405 | B1 | 3/2020 | Wang et al. |
| 10,586,534 | B1 | 3/2020 | Argyropoulos et al. |
| 10,586,540 | B1 | 3/2020 | Smith et al. |
| 10,593,328 | B1 | 3/2020 | Wang et al. |
| 10,593,330 | B2 | 3/2020 | Sharifi |
| 10,599,287 | B2 | 3/2020 | Kumar et al. |
| 10,600,406 | B1 | 3/2020 | Shapiro et al. |
| 10,602,268 | B1 | 3/2020 | Soto |
| 10,614,807 | B2 | 4/2020 | Beckhardt et al. |
| 10,621,981 | B2 | 4/2020 | Sereshki |
| 10,622,009 | B1 | 4/2020 | Zhang et al. |
| 10,623,811 | B1 | 4/2020 | Cwik |
| 10,624,612 | B2 | 4/2020 | Sumi et al. |
| 10,643,609 | B1 | 5/2020 | Pogue et al. |
| 10,645,130 | B2 | 5/2020 | Corbin et al. |
| 10,672,383 | B1 | 6/2020 | Thomson et al. |
| 10,679,625 | B1 | 6/2020 | Lockhart et al. |
| 10,681,460 | B2 | 6/2020 | Woo et al. |
| 10,685,669 | B1 | 6/2020 | Lan et al. |
| 10,694,608 | B2 | 6/2020 | Baker et al. |
| 10,699,711 | B2 | 6/2020 | Reilly |
| 10,706,843 | B1 | 7/2020 | Elangovan et al. |
| 10,712,997 | B2 | 7/2020 | Wilberding et al. |
| 10,720,173 | B2 | 7/2020 | Freeman et al. |
| 10,728,196 | B2 | 7/2020 | Wang |
| 10,735,870 | B2 | 8/2020 | Ballande et al. |
| 10,740,065 | B2 | 8/2020 | Jarvis et al. |
| 10,746,840 | B1 | 8/2020 | Barton et al. |
| 10,748,531 | B2 | 8/2020 | Kim |
| 10,762,896 | B1 | 9/2020 | Yavagal et al. |
| 10,777,189 | B1 | 9/2020 | Fu et al. |
| 10,777,203 | B1 | 9/2020 | Pasko |
| 10,789,041 | B2 | 9/2020 | Kim et al. |
| 10,797,667 | B2 | 10/2020 | Fish et al. |
| 10,824,682 | B2 | 11/2020 | Alvares et al. |
| 10,825,471 | B2 | 11/2020 | Walley et al. |
| 10,837,667 | B2 | 11/2020 | Nelson et al. |
| 10,847,137 | B1 | 11/2020 | Mandal et al. |
| 10,847,143 | B2 | 11/2020 | Millington et al. |
| 10,847,149 | B1 | 11/2020 | Mok et al. |
| 10,847,164 | B2 | 11/2020 | Wilberding |
| 10,848,885 | B2 | 11/2020 | Lambourne |
| RE48,371 | E | 12/2020 | Zhu et al. |
| 10,867,596 | B2 | 12/2020 | Yoneda et al. |
| 10,867,604 | B2 | 12/2020 | Smith et al. |
| 10,871,943 | B1 | 12/2020 | D'Amato et al. |
| 10,878,811 | B2 | 12/2020 | Smith et al. |
| 10,878,826 | B2 | 12/2020 | Li et al. |
| 10,885,091 | B1 | 1/2021 | Meng et al. |
| 10,897,679 | B2 | 1/2021 | Lambourne |
| 10,911,596 | B1 | 2/2021 | Do et al. |
| 10,943,598 | B2 | 3/2021 | Singh et al. |
| 10,964,314 | B2 | 3/2021 | Jazi et al. |
| 10,971,158 | B1 | 4/2021 | Patangay et al. |
| 11,024,311 | B2 | 6/2021 | Mixter et al. |
| 11,025,569 | B2 | 6/2021 | Lind et al. |
| 11,050,615 | B2 | 6/2021 | Mathews et al. |
| 11,062,705 | B2 | 7/2021 | Watanabe et al. |
| 11,095,978 | B2 | 8/2021 | Gigandet et al. |
| 11,100,923 | B2 | 8/2021 | Fainberg et al. |
| 11,127,405 | B1 | 9/2021 | Antos et al. |
| 11,137,979 | B2 | 10/2021 | Plagge |
| 11,138,969 | B2 | 10/2021 | D'Amato |
| 11,140,494 | B2 | 10/2021 | Pedersen et al. |
| 11,159,878 | B1 | 10/2021 | Chatlani et al. |
| 11,172,328 | B2 | 11/2021 | Soto et al. |
| 11,172,329 | B2 | 11/2021 | Soto et al. |
| 11,175,880 | B2 | 11/2021 | Liu et al. |
| 11,184,704 | B2 | 11/2021 | Jarvis et al. |
| 11,184,969 | B2 | 11/2021 | Lang |
| 11,189,284 | B2 | 11/2021 | Maeng |
| 11,206,052 | B1 | 12/2021 | Park et al. |
| 11,212,612 | B2 | 12/2021 | Lang et al. |
| 11,264,019 | B2 | 3/2022 | Bhattacharya et al. |
| 11,277,512 | B1 | 3/2022 | Leeds et al. |
| 11,302,326 | B2 | 4/2022 | Sereshki |
| 11,315,556 | B2 | 4/2022 | Smith et al. |
| 11,354,092 | B2 | 6/2022 | D'Amato et al. |
| 11,361,763 | B1 | 6/2022 | Maas et al. |
| 11,373,645 | B1 | 6/2022 | Mathew et al. |
| 11,388,532 | B2 | 7/2022 | Lambourne |
| 11,411,763 | B2 | 8/2022 | Mackay et al. |
| 11,445,301 | B2 | 9/2022 | Park et al. |
| 11,475,899 | B2 | 10/2022 | Lesso |
| 11,514,898 | B2 | 11/2022 | Millington |
| 11,531,520 | B2 | 12/2022 | Wilberding |
| 11,532,306 | B2 | 12/2022 | Kim et al. |
| 11,538,460 | B2 | 12/2022 | Tolomei |
| 11,580,969 | B2 | 2/2023 | Han et al. |
| 11,646,023 | B2 | 5/2023 | Smith |
| 11,664,023 | B2 | 5/2023 | Reilly |
| 11,694,689 | B2 | 7/2023 | Smith |
| 11,709,653 | B1 | 7/2023 | Shin |
| 11,714,600 | B2 | 8/2023 | D'Amato |
| 11,727,936 | B2 | 8/2023 | Smith |
| 11,769,505 | B2 | 9/2023 | Sereshki |
| 11,790,937 | B2 | 10/2023 | Smith et al. |
| 11,817,076 | B2 | 11/2023 | Sereshki et al. |
| 2001/0003173 | A1 | 6/2001 | Lim |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0034280 | A1 | 3/2002 | Infosino |
| 2002/0046023 | A1 | 4/2002 | Fujii et al. |
| 2002/0054685 | A1 | 5/2002 | Avendano et al. |
| 2002/0055950 | A1 | 5/2002 | Witteman |
| 2002/0072816 | A1 | 6/2002 | Shdema et al. |
| 2002/0116196 | A1 | 8/2002 | Tran |

(56) References Cited

U.S. PATENT DOCUMENTS

2002/0124097 A1 9/2002 Isely et al.
2002/0143532 A1 10/2002 McLean et al.
2003/0015354 A1 1/2003 Edwards et al.
2003/0038848 A1 2/2003 Lee et al.
2003/0040908 A1 2/2003 Yang et al.
2003/0070182 A1 4/2003 Pierre et al.
2003/0070869 A1 4/2003 Hlibowicki
2003/0072462 A1 4/2003 Hlibowicki
2003/0095672 A1 5/2003 Hobelsberger
2003/0097482 A1 5/2003 DeHart et al.
2003/0130850 A1 7/2003 Badt et al.
2003/0157951 A1 8/2003 Hasty, Jr.
2003/0235244 A1 12/2003 Pessoa et al.
2004/0024478 A1 2/2004 Hans et al.
2004/0093219 A1 5/2004 Shin et al.
2004/0105566 A1 6/2004 Matsunaga et al.
2004/0127241 A1 7/2004 Shostak
2004/0128135 A1 7/2004 Anastasakos et al.
2004/0153321 A1 8/2004 Chung et al.
2004/0161082 A1 8/2004 Brown et al.
2004/0234088 A1 11/2004 McCarty et al.
2005/0031131 A1 2/2005 Browning et al.
2005/0031132 A1 2/2005 Browning et al.
2005/0031133 A1 2/2005 Browning et al.
2005/0031134 A1 2/2005 Leske
2005/0031137 A1 2/2005 Browning et al.
2005/0031138 A1 2/2005 Browning et al.
2005/0031139 A1 2/2005 Browning et al.
2005/0031140 A1 2/2005 Browning
2005/0033582 A1 2/2005 Gadd et al.
2005/0047606 A1 3/2005 Lee et al.
2005/0077843 A1 4/2005 Benditt
2005/0131558 A1 6/2005 Braithwaite et al.
2005/0164664 A1 7/2005 DiFonzo et al.
2005/0195988 A1 9/2005 Tashev et al.
2005/0201254 A1 9/2005 Looney et al.
2005/0207584 A1 9/2005 Bright
2005/0235334 A1 10/2005 Togashi et al.
2005/0254662 A1 11/2005 Blank et al.
2005/0268234 A1 12/2005 Rossi, Jr. et al.
2005/0283330 A1 12/2005 Laraia et al.
2005/0283475 A1 12/2005 Beranek et al.
2006/0004834 A1 1/2006 Pyhalammi et al.
2006/0023945 A1 2/2006 King et al.
2006/0041431 A1 2/2006 Maes
2006/0093128 A1 5/2006 Oxford
2006/0104451 A1 5/2006 Browning et al.
2006/0104454 A1 5/2006 Guitarte Perez et al.
2006/0147058 A1 7/2006 Wang
2006/0161964 A1 7/2006 Chung
2006/0190269 A1 8/2006 Tessel et al.
2006/0190968 A1 8/2006 Jung et al.
2006/0247913 A1 11/2006 Huerta et al.
2006/0262943 A1 11/2006 Oxford
2007/0018844 A1 1/2007 Sutardja
2007/0019815 A1 1/2007 Asada et al.
2007/0033043 A1 2/2007 Hyakumoto
2007/0038461 A1 2/2007 Abbott et al.
2007/0038999 A1 2/2007 Millington
2007/0060054 A1 3/2007 Romesburg
2007/0071206 A1 3/2007 Gainsboro et al.
2007/0071255 A1 3/2007 Schobben
2007/0076131 A1 4/2007 Li et al.
2007/0076906 A1 4/2007 Takagi et al.
2007/0140058 A1 6/2007 Mcintosh et al.
2007/0140521 A1 6/2007 Mitobe et al.
2007/0142944 A1 6/2007 Goldberg et al.
2007/0147651 A1 6/2007 Mitobe et al.
2007/0201639 A1 8/2007 Park et al.
2007/0254604 A1 11/2007 Kim
2007/0286426 A1 12/2007 Xiang et al.
2008/0008333 A1 1/2008 Nishikawa et al.
2008/0031466 A1 2/2008 Buck et al.
2008/0037814 A1 2/2008 Shau
2008/0090537 A1 4/2008 Sutardja
2008/0090617 A1 4/2008 Sutardja
2008/0144858 A1 6/2008 Khawand et al.
2008/0146289 A1 6/2008 Korneluk et al.
2008/0160977 A1 7/2008 Ahmaniemi et al.
2008/0182518 A1 7/2008 Lo
2008/0192946 A1 8/2008 Faller
2008/0207115 A1 8/2008 Lee et al.
2008/0208594 A1 8/2008 Cross et al.
2008/0221897 A1 9/2008 Cerra et al.
2008/0247530 A1 10/2008 Barton et al.
2008/0248797 A1 10/2008 Freeman et al.
2008/0291896 A1 11/2008 Tuubel et al.
2008/0291916 A1 11/2008 Xiong et al.
2008/0301729 A1 12/2008 Broos et al.
2009/0003620 A1 1/2009 McKillop et al.
2009/0005893 A1 1/2009 Sugii et al.
2009/0010445 A1 1/2009 Matsuo
2009/0013255 A1 1/2009 Yuschik et al.
2009/0018828 A1 1/2009 Nakadai et al.
2009/0043206 A1 2/2009 Towfiq et al.
2009/0046866 A1 2/2009 Feng et al.
2009/0052688 A1 2/2009 Ishibashi et al.
2009/0076821 A1 3/2009 Brenner et al.
2009/0113053 A1 4/2009 Van Wie et al.
2009/0153289 A1 6/2009 Hope et al.
2009/0191854 A1 7/2009 Beason
2009/0197524 A1 8/2009 Haff et al.
2009/0214048 A1 8/2009 Stokes, III et al.
2009/0220107 A1 9/2009 Every et al.
2009/0228919 A1 9/2009 Zott et al.
2009/0238377 A1 9/2009 Ramakrishnan et al.
2009/0238386 A1 9/2009 Usher et al.
2009/0248397 A1 10/2009 Garcia et al.
2009/0249222 A1 10/2009 Schmidt et al.
2009/0264072 A1 10/2009 Dai
2009/0299745 A1 12/2009 Kennewick et al.
2009/0323907 A1 12/2009 Gupta et al.
2009/0323924 A1 12/2009 Tashev et al.
2009/0326949 A1 12/2009 Douthitt et al.
2010/0014690 A1 1/2010 Wolff et al.
2010/0023638 A1 1/2010 Bowman
2010/0035593 A1 2/2010 Franco et al.
2010/0041443 A1 2/2010 Yokota
2010/0070276 A1 3/2010 Wasserblat et al.
2010/0070922 A1 3/2010 DeMaio et al.
2010/0075723 A1 3/2010 Min et al.
2010/0088100 A1 4/2010 Lindahl
2010/0092004 A1 4/2010 Kuze
2010/0161335 A1 6/2010 Whynot
2010/0172516 A1 7/2010 Lastrucci
2010/0178873 A1 7/2010 Lee et al.
2010/0179806 A1 7/2010 Zhang et al.
2010/0179874 A1 7/2010 Higgins et al.
2010/0185448 A1 7/2010 Meisel
2010/0211199 A1 8/2010 Naik et al.
2010/0260348 A1 10/2010 Bhow et al.
2010/0278351 A1 11/2010 Fozunbal et al.
2010/0299639 A1 11/2010 Ramsay et al.
2010/0329472 A1 12/2010 Nakadai et al.
2010/0332236 A1 12/2010 Tan
2011/0019833 A1 1/2011 Kuech et al.
2011/0033059 A1 2/2011 Bhaskar et al.
2011/0035580 A1 2/2011 Wang et al.
2011/0044461 A1 2/2011 Kuech et al.
2011/0044489 A1 2/2011 Saiki et al.
2011/0046952 A1 2/2011 Koshinaka
2011/0066634 A1 3/2011 Phillips et al.
2011/0091055 A1 4/2011 Leblanc
2011/0103615 A1 5/2011 Sun
2011/0131032 A1 6/2011 Yang, II et al.
2011/0145581 A1 6/2011 Malhotra et al.
2011/0170707 A1 7/2011 Yamada et al.
2011/0176687 A1 7/2011 Birkenes
2011/0182436 A1 7/2011 Murgia et al.
2011/0202924 A1 8/2011 Banguero et al.
2011/0218656 A1 9/2011 Bishop et al.
2011/0267985 A1 11/2011 Wilkinson et al.
2011/0276333 A1 11/2011 Wang et al.
2011/0280422 A1 11/2011 Neumeyer et al.

(56) References Cited

U.S. PATENT DOCUMENTS

2011/0285808 A1 11/2011 Feng et al.
2011/0289506 A1 11/2011 Trivi et al.
2011/0299706 A1 12/2011 Sakai
2012/0009906 A1 1/2012 Patterson et al.
2012/0020485 A1 1/2012 Visser et al.
2012/0020486 A1 1/2012 Fried et al.
2012/0022863 A1 1/2012 Cho et al.
2012/0022864 A1 1/2012 Leman et al.
2012/0027218 A1 2/2012 Every et al.
2012/0076308 A1 3/2012 Kuech et al.
2012/0078635 A1 3/2012 Rothkopf et al.
2012/0086568 A1 4/2012 Scott et al.
2012/0123268 A1 5/2012 Tanaka et al.
2012/0128160 A1 5/2012 Kim et al.
2012/0131125 A1 5/2012 Seidel et al.
2012/0148075 A1 6/2012 Goh et al.
2012/0162540 A1 6/2012 Ouchi et al.
2012/0163603 A1 6/2012 Abe et al.
2012/0177215 A1 7/2012 Bose et al.
2012/0183149 A1 7/2012 Hiroe
2012/0224457 A1 9/2012 Kim et al.
2012/0224715 A1 9/2012 Kikkeri
2012/0237047 A1 9/2012 Neal et al.
2012/0245941 A1 9/2012 Cheyer
2012/0265528 A1 10/2012 Gruber et al.
2012/0288100 A1 11/2012 Cho
2012/0297284 A1 11/2012 Matthews, III et al.
2012/0308044 A1 12/2012 Vander et al.
2012/0308046 A1 12/2012 Muza
2013/0006453 A1 1/2013 Wang et al.
2013/0024018 A1 1/2013 Chang et al.
2013/0034241 A1 2/2013 Pandey et al.
2013/0039527 A1 2/2013 Jensen et al.
2013/0051755 A1 2/2013 Brown et al.
2013/0058492 A1 3/2013 Silzle et al.
2013/0066453 A1 3/2013 Seefeldt
2013/0073293 A1 3/2013 Jang et al.
2013/0080146 A1 3/2013 Kato et al.
2013/0080167 A1 3/2013 Mozer
2013/0080171 A1 3/2013 Mozer et al.
2013/0124211 A1 5/2013 Mcdonough
2013/0129100 A1 5/2013 Sorensen
2013/0148821 A1 6/2013 Sorensen
2013/0170647 A1 7/2013 Reilly et al.
2013/0171930 A1 7/2013 Anand et al.
2013/0179173 A1 7/2013 Lee et al.
2013/0183944 A1 7/2013 Mozer et al.
2013/0185639 A1 7/2013 Lim
2013/0191119 A1 7/2013 Sugiyama
2013/0191122 A1 7/2013 Mason
2013/0198298 A1 8/2013 Li et al.
2013/0211826 A1 8/2013 Mannby
2013/0216056 A1 8/2013 Thyssen
2013/0230184 A1 9/2013 Kuech et al.
2013/0238326 A1 9/2013 Kim et al.
2013/0262101 A1 10/2013 Srinivasan
2013/0283169 A1 10/2013 Van Wie
2013/0289994 A1 10/2013 Newman et al.
2013/0294611 A1 11/2013 Yoo et al.
2013/0301840 A1 11/2013 Yemdji et al.
2013/0315420 A1 11/2013 You
2013/0317635 A1 11/2013 Bates et al.
2013/0322462 A1 12/2013 Poulsen
2013/0322634 A1 12/2013 Bennett et al.
2013/0322665 A1 12/2013 Bennett et al.
2013/0324031 A1 12/2013 Loureiro
2013/0329896 A1 12/2013 Krishnaswamy et al.
2013/0331970 A1 12/2013 Beckhardt et al.
2013/0332165 A1 12/2013 Beckley et al.
2013/0336499 A1 12/2013 Beckhardt et al.
2013/0339028 A1 12/2013 Rosner et al.
2013/0343567 A1 12/2013 Triplett et al.
2014/0003611 A1 1/2014 Mohammad et al.
2014/0003625 A1 1/2014 Sheen et al.
2014/0003635 A1 1/2014 Mohammad et al.
2014/0005813 A1 1/2014 Reimann
2014/0006026 A1 1/2014 Lamb et al.
2014/0006825 A1 1/2014 Shenhav
2014/0019743 A1 1/2014 DeLuca
2014/0034929 A1 2/2014 Hamada et al.
2014/0046464 A1 2/2014 Reimann
2014/0056435 A1 2/2014 Kjems et al.
2014/0064476 A1 3/2014 Mani et al.
2014/0064501 A1 3/2014 Olsen et al.
2014/0073298 A1 3/2014 Rossmann
2014/0075306 A1 3/2014 Rega
2014/0075311 A1 3/2014 Boettcher et al.
2014/0094151 A1 4/2014 Klappert et al.
2014/0100854 A1 4/2014 Chen et al.
2014/0108010 A1 4/2014 Maltseff et al.
2014/0109138 A1 4/2014 Cannistraro et al.
2014/0122075 A1 5/2014 Bak et al.
2014/0122092 A1 5/2014 Goldstein
2014/0126745 A1 5/2014 Dickins et al.
2014/0136195 A1 5/2014 Abdossalami et al.
2014/0145168 A1 5/2014 Ohsawa et al.
2014/0146983 A1 5/2014 Kim et al.
2014/0149118 A1 5/2014 Lee et al.
2014/0159581 A1 6/2014 Pruemmer et al.
2014/0161263 A1 6/2014 Koishida et al.
2014/0163978 A1 6/2014 Basye et al.
2014/0164400 A1 6/2014 Kruglick
2014/0167929 A1 6/2014 Shim et al.
2014/0167931 A1 6/2014 Lee et al.
2014/0168344 A1 6/2014 Shoemake et al.
2014/0172899 A1 6/2014 Hakkani-Tur et al.
2014/0172953 A1 6/2014 Blanksteen
2014/0181199 A1 6/2014 Kumar et al.
2014/0181271 A1 6/2014 Millington
2014/0188476 A1 7/2014 Li et al.
2014/0192986 A1 7/2014 Lee et al.
2014/0195252 A1 7/2014 Gruber et al.
2014/0200881 A1 7/2014 Chatlani
2014/0207457 A1 7/2014 Biatov et al.
2014/0214429 A1 7/2014 Pantel
2014/0215332 A1 7/2014 Lee et al.
2014/0219472 A1 8/2014 Huang et al.
2014/0222436 A1 8/2014 Binder et al.
2014/0229184 A1 8/2014 Shires
2014/0229959 A1 8/2014 Beckhardt et al.
2014/0244013 A1 8/2014 Reilly
2014/0244269 A1 8/2014 Tokutake
2014/0244712 A1 8/2014 Walters et al.
2014/0249817 A1 9/2014 Hart et al.
2014/0252386 A1 9/2014 Ito et al.
2014/0253676 A1 9/2014 Nagase et al.
2014/0254805 A1 9/2014 Su et al.
2014/0258292 A1 9/2014 Thramann et al.
2014/0259075 A1 9/2014 Chang et al.
2014/0269757 A1 9/2014 Park et al.
2014/0270216 A1 9/2014 Tsilfidis et al.
2014/0270282 A1 9/2014 Tammi et al.
2014/0274185 A1 9/2014 Luna et al.
2014/0274203 A1 9/2014 Ganong, III et al.
2014/0274218 A1 9/2014 Kadiwala et al.
2014/0277650 A1 9/2014 Zurek et al.
2014/0278343 A1 9/2014 Tran
2014/0278372 A1 9/2014 Nakadai et al.
2014/0278445 A1 9/2014 Eddington, Jr.
2014/0278933 A1 9/2014 McMillan
2014/0288686 A1 9/2014 Sant et al.
2014/0291642 A1 10/2014 Watabe et al.
2014/0303969 A1 10/2014 Inose et al.
2014/0310002 A1 10/2014 Nitz et al.
2014/0310614 A1 10/2014 Jones
2014/0324203 A1 10/2014 Coburn, IV et al.
2014/0328490 A1 11/2014 Mohammad et al.
2014/0330896 A1 11/2014 Addala et al.
2014/0334645 A1 11/2014 Yun et al.
2014/0340888 A1 11/2014 Ishisone et al.
2014/0357248 A1 12/2014 Tonshal et al.
2014/0358535 A1 12/2014 Lee et al.
2014/0363022 A1 12/2014 Dizon et al.
2014/0363024 A1 12/2014 Apodaca

(56) References Cited

U.S. PATENT DOCUMENTS

2014/0364089 A1 12/2014 Lienhart et al.
2014/0365225 A1 12/2014 Haiut
2014/0365227 A1 12/2014 Cash et al.
2014/0368734 A1 12/2014 Hoffert et al.
2014/0369491 A1 12/2014 Kloberdans et al.
2014/0372109 A1 12/2014 Iyer et al.
2015/0006176 A1 1/2015 Pogue et al.
2015/0006184 A1 1/2015 Marti et al.
2015/0010169 A1 1/2015 Popova et al.
2015/0014680 A1 1/2015 Yamazaki et al.
2015/0016642 A1 1/2015 Walsh et al.
2015/0018992 A1 1/2015 Griffiths et al.
2015/0019201 A1 1/2015 Schoenbach
2015/0019219 A1 1/2015 Tzirkel-Hancock et al.
2015/0030172 A1 1/2015 Gaensler et al.
2015/0032443 A1 1/2015 Karov et al.
2015/0032456 A1 1/2015 Wait
2015/0036831 A1 2/2015 Klippel
2015/0039303 A1 2/2015 Lesso et al.
2015/0039310 A1 2/2015 Clark et al.
2015/0039311 A1 2/2015 Clark et al.
2015/0039317 A1 2/2015 Klein et al.
2015/0058018 A1 2/2015 Georges et al.
2015/0063580 A1 3/2015 Huang et al.
2015/0066479 A1 3/2015 Pasupalak et al.
2015/0073807 A1 3/2015 Kumar
2015/0086034 A1 3/2015 Lombardi et al.
2015/0088500 A1 3/2015 Conliffe
2015/0091709 A1 4/2015 Reichert et al.
2015/0092947 A1 4/2015 Gossain et al.
2015/0104037 A1 4/2015 Lee et al.
2015/0106085 A1 4/2015 Lindahl
2015/0110294 A1 4/2015 Chen et al.
2015/0112672 A1 4/2015 Giacobello et al.
2015/0112689 A1 4/2015 Nandy et al.
2015/0124975 A1 5/2015 Pontoppidan
2015/0126255 A1 5/2015 Yang et al.
2015/0128065 A1 5/2015 Torii et al.
2015/0134456 A1 5/2015 Baldwin
2015/0154953 A1 6/2015 Bapat et al.
2015/0154954 A1 6/2015 Sharifi
2015/0154976 A1 6/2015 Mutagi
2015/0161990 A1 6/2015 Sharifi
2015/0169279 A1 6/2015 Duga
2015/0170645 A1 6/2015 Di et al.
2015/0170665 A1 6/2015 Gundeti et al.
2015/0172843 A1 6/2015 Quan
2015/0179181 A1 6/2015 Morris et al.
2015/0180432 A1 6/2015 Gao et al.
2015/0181318 A1 6/2015 Gautama et al.
2015/0189438 A1 7/2015 Hampiholi et al.
2015/0200454 A1 7/2015 Heusdens et al.
2015/0200923 A1 7/2015 Triplett
2015/0201271 A1 7/2015 Diethorn et al.
2015/0215382 A1 7/2015 Arora et al.
2015/0221307 A1 8/2015 Shah et al.
2015/0221678 A1 8/2015 Yamazaki et al.
2015/0222563 A1 8/2015 Burns et al.
2015/0222987 A1 8/2015 Angel, Jr. et al.
2015/0228274 A1 8/2015 Leppanen et al.
2015/0228803 A1 8/2015 Koezuka et al.
2015/0237406 A1 8/2015 Ochoa et al.
2015/0243287 A1 8/2015 Nakano et al.
2015/0245152 A1 8/2015 Ding et al.
2015/0245154 A1 8/2015 Dadu et al.
2015/0248885 A1 9/2015 Koulomzin
2015/0249889 A1 9/2015 Iyer et al.
2015/0253292 A1 9/2015 Larkin et al.
2015/0253960 A1 9/2015 Lin et al.
2015/0254057 A1 9/2015 Klein et al.
2015/0263174 A1 9/2015 Yamazaki et al.
2015/0271593 A1 9/2015 Sun et al.
2015/0277846 A1 10/2015 Yen et al.
2015/0279351 A1 10/2015 Nguyen et al.
2015/0280676 A1 10/2015 Holman et al.
2015/0296299 A1 10/2015 Klippel et al.
2015/0302856 A1 10/2015 Kim et al.
2015/0319529 A1 11/2015 Klippel
2015/0325267 A1 11/2015 Lee et al.
2015/0331663 A1 11/2015 Beckhardt et al.
2015/0334471 A1 11/2015 Innes et al.
2015/0338917 A1 11/2015 Steiner et al.
2015/0341406 A1 11/2015 Rockefeller et al.
2015/0346845 A1 12/2015 Di et al.
2015/0348548 A1 12/2015 Piernot et al.
2015/0348551 A1 12/2015 Gruber et al.
2015/0355878 A1 12/2015 Corbin
2015/0356968 A1 12/2015 Rice et al.
2015/0363061 A1 12/2015 De Nigris, III et al.
2015/0363401 A1 12/2015 Chen et al.
2015/0370531 A1 12/2015 Faaborg
2015/0371657 A1 12/2015 Gao
2015/0371659 A1 12/2015 Gao
2015/0371664 A1 12/2015 Bar-Or et al.
2015/0373100 A1 12/2015 Kravets et al.
2015/0380010 A1 12/2015 Srinivasan
2015/0382047 A1 12/2015 Van Os et al.
2015/0382128 A1 12/2015 Ridihalgh et al.
2016/0007116 A1 1/2016 Holman
2016/0014536 A1 1/2016 Sheen
2016/0018873 A1 1/2016 Fernald et al.
2016/0021458 A1 1/2016 Johnson et al.
2016/0026428 A1 1/2016 Morganstern et al.
2016/0027440 A1 1/2016 Gelfenbeyn et al.
2016/0029142 A1 1/2016 Isaac et al.
2016/0034448 A1 2/2016 Tran
2016/0035321 A1 2/2016 Cho et al.
2016/0035337 A1 2/2016 Aggarwal et al.
2016/0036962 A1 2/2016 Rand et al.
2016/0042748 A1 2/2016 Jain et al.
2016/0044151 A1 2/2016 Shoemaker et al.
2016/0050488 A1 2/2016 Matheja et al.
2016/0055847 A1 2/2016 Dahan
2016/0055850 A1 2/2016 Nakadai et al.
2016/0057522 A1 2/2016 Choisel et al.
2016/0066087 A1 3/2016 Solbach et al.
2016/0070526 A1 3/2016 Sheen
2016/0072804 A1 3/2016 Chien et al.
2016/0077710 A1 3/2016 Lewis et al.
2016/0077794 A1 3/2016 Kim et al.
2016/0078864 A1 3/2016 Palanisamy et al.
2016/0086609 A1 3/2016 Yue et al.
2016/0088036 A1 3/2016 Corbin et al.
2016/0088392 A1 3/2016 Huttunen et al.
2016/0093281 A1 3/2016 Kuo et al.
2016/0093304 A1 3/2016 Kim et al.
2016/0094718 A1 3/2016 Mani et al.
2016/0094917 A1 3/2016 Wilk et al.
2016/0098393 A1 4/2016 Hebert
2016/0098992 A1 4/2016 Renard et al.
2016/0103653 A1 4/2016 Jang
2016/0104480 A1 4/2016 Sharifi
2016/0111110 A1 4/2016 Gautama et al.
2016/0118048 A1 4/2016 Heide
2016/0125876 A1 5/2016 Schroeter et al.
2016/0127780 A1 5/2016 Roberts et al.
2016/0133259 A1 5/2016 Rubin et al.
2016/0134924 A1 5/2016 Bush et al.
2016/0134966 A1 5/2016 Fitzgerald et al.
2016/0134982 A1 5/2016 Iyer
2016/0140957 A1 5/2016 Duta et al.
2016/0148612 A1 5/2016 Guo et al.
2016/0148615 A1 5/2016 Lee et al.
2016/0154089 A1 6/2016 Altman
2016/0155442 A1 6/2016 Kannan et al.
2016/0155443 A1 6/2016 Khan et al.
2016/0157035 A1 6/2016 Russell et al.
2016/0162469 A1 6/2016 Santos
2016/0171976 A1 6/2016 Sun et al.
2016/0173578 A1 6/2016 Sharma et al.
2016/0173983 A1 6/2016 Berthelsen et al.
2016/0180853 A1 6/2016 Vanlund et al.
2016/0189716 A1 6/2016 Lindahl et al.
2016/0192099 A1 6/2016 Oishi et al.

(56) References Cited

U.S. PATENT DOCUMENTS

| | | | | |
|---|---|---|---|---|
| 2016/0196499 | A1 | 7/2016 | Khan et al. | |
| 2016/0203331 | A1 | 7/2016 | Khan et al. | |
| 2016/0210110 | A1 | 7/2016 | Feldman | |
| 2016/0212488 | A1 | 7/2016 | Os et al. | |
| 2016/0212538 | A1 | 7/2016 | Fullam et al. | |
| 2016/0216938 | A1 | 7/2016 | Millington | |
| 2016/0217789 | A1 | 7/2016 | Lee et al. | |
| 2016/0225385 | A1 | 8/2016 | Hammarqvist | |
| 2016/0232451 | A1 | 8/2016 | Scherzer | |
| 2016/0234204 | A1 | 8/2016 | Rishi et al. | |
| 2016/0239255 | A1 | 8/2016 | Chavez et al. | |
| 2016/0240192 | A1 | 8/2016 | Raghuvir | |
| 2016/0241976 | A1 | 8/2016 | Pearson | |
| 2016/0253050 | A1 | 9/2016 | Mishra et al. | |
| 2016/0260431 | A1 | 9/2016 | Newendorp et al. | |
| 2016/0283841 | A1 | 9/2016 | Sainath et al. | |
| 2016/0299737 | A1 | 10/2016 | Clayton et al. | |
| 2016/0302018 | A1 | 10/2016 | Russell et al. | |
| 2016/0314782 | A1 | 10/2016 | Klimanis | |
| 2016/0316293 | A1 | 10/2016 | Klimanis | |
| 2016/0322045 | A1 | 11/2016 | Hatfield et al. | |
| 2016/0335485 | A1 | 11/2016 | Kim | |
| 2016/0336519 | A1 | 11/2016 | Seo et al. | |
| 2016/0343866 | A1 | 11/2016 | Koezuka et al. | |
| 2016/0343949 | A1 | 11/2016 | Seo et al. | |
| 2016/0343954 | A1 | 11/2016 | Seo et al. | |
| 2016/0345114 | A1 | 11/2016 | Hanna et al. | |
| 2016/0352915 | A1 | 12/2016 | Gautama | |
| 2016/0353217 | A1 | 12/2016 | Starobin et al. | |
| 2016/0353218 | A1 | 12/2016 | Starobin et al. | |
| 2016/0357503 | A1 | 12/2016 | Triplett et al. | |
| 2016/0364206 | A1 | 12/2016 | Keyser-Allen et al. | |
| 2016/0366515 | A1 | 12/2016 | Mendes et al. | |
| 2016/0372113 | A1 | 12/2016 | David et al. | |
| 2016/0372688 | A1 | 12/2016 | Seo et al. | |
| 2016/0373269 | A1 | 12/2016 | Okubo et al. | |
| 2016/0373909 | A1 | 12/2016 | Rasmussen et al. | |
| 2016/0379634 | A1 | 12/2016 | Yamamoto et al. | |
| 2016/0379635 | A1 | 12/2016 | Page | |
| 2017/0003931 | A1 | 1/2017 | Dvortsov et al. | |
| 2017/0012207 | A1 | 1/2017 | Seo et al. | |
| 2017/0012232 | A1 | 1/2017 | Kataishi et al. | |
| 2017/0019732 | A1 | 1/2017 | Mendes et al. | |
| 2017/0025124 | A1 | 1/2017 | Mixter et al. | |
| 2017/0025615 | A1 | 1/2017 | Seo et al. | |
| 2017/0025630 | A1 | 1/2017 | Seo et al. | |
| 2017/0026769 | A1 | 1/2017 | Patel | |
| 2017/0032244 | A1 | 2/2017 | Kurata | |
| 2017/0034263 | A1 | 2/2017 | Archambault et al. | |
| 2017/0039025 | A1 | 2/2017 | Kielak | |
| 2017/0040002 | A1 | 2/2017 | Basson et al. | |
| 2017/0040018 | A1 | 2/2017 | Tormey | |
| 2017/0041724 | A1 | 2/2017 | Master et al. | |
| 2017/0053648 | A1 | 2/2017 | Chi | |
| 2017/0053650 | A1 | 2/2017 | Ogawa | |
| 2017/0060526 | A1 | 3/2017 | Barton et al. | |
| 2017/0062734 | A1 | 3/2017 | Suzuki et al. | |
| 2017/0070478 | A1 | 3/2017 | Park et al. | |
| 2017/0076212 | A1 | 3/2017 | Shams et al. | |
| 2017/0076720 | A1 | 3/2017 | Gopalan et al. | |
| 2017/0076726 | A1 | 3/2017 | Bae | |
| 2017/0078824 | A1 | 3/2017 | Heo | |
| 2017/0083285 | A1* | 3/2017 | Meyers | G10L 15/222 |
| 2017/0083606 | A1 | 3/2017 | Mohan | |
| 2017/0084277 | A1 | 3/2017 | Sharifi | |
| 2017/0084278 | A1 | 3/2017 | Jung | |
| 2017/0084292 | A1 | 3/2017 | Yoo | |
| 2017/0084295 | A1 | 3/2017 | Tsiartas et al. | |
| 2017/0090864 | A1 | 3/2017 | Jorgovanovic | |
| 2017/0092278 | A1 | 3/2017 | Evermann et al. | |
| 2017/0092297 | A1 | 3/2017 | Sainath et al. | |
| 2017/0092299 | A1 | 3/2017 | Matsuo | |
| 2017/0092889 | A1 | 3/2017 | Seo et al. | |
| 2017/0092890 | A1 | 3/2017 | Seo et al. | |
| 2017/0094215 | A1 | 3/2017 | Western | |
| 2017/0103748 | A1 | 4/2017 | Weissberg et al. | |
| 2017/0103754 | A1 | 4/2017 | Higbie et al. | |
| 2017/0103755 | A1 | 4/2017 | Jeon et al. | |
| 2017/0110124 | A1 | 4/2017 | Boesen et al. | |
| 2017/0110130 | A1 | 4/2017 | Sharifi et al. | |
| 2017/0110144 | A1 | 4/2017 | Sharifi et al. | |
| 2017/0117497 | A1 | 4/2017 | Seo et al. | |
| 2017/0123251 | A1 | 5/2017 | Nakada et al. | |
| 2017/0125037 | A1 | 5/2017 | Shin | |
| 2017/0125456 | A1 | 5/2017 | Kasahara | |
| 2017/0133007 | A1 | 5/2017 | Drewes | |
| 2017/0133011 | A1 | 5/2017 | Chen et al. | |
| 2017/0134872 | A1 | 5/2017 | Silva et al. | |
| 2017/0139720 | A1 | 5/2017 | Stein | |
| 2017/0140449 | A1 | 5/2017 | Kannan | |
| 2017/0140748 | A1 | 5/2017 | Roberts et al. | |
| 2017/0140750 | A1 | 5/2017 | Wang et al. | |
| 2017/0140757 | A1 | 5/2017 | Penilla et al. | |
| 2017/0140759 | A1 | 5/2017 | Kumar et al. | |
| 2017/0151930 | A1 | 6/2017 | Boesen | |
| 2017/0164139 | A1 | 6/2017 | Deselaers et al. | |
| 2017/0177585 | A1 | 6/2017 | Rodger et al. | |
| 2017/0178662 | A1 | 6/2017 | Ayrapetian et al. | |
| 2017/0180561 | A1 | 6/2017 | Kadiwala et al. | |
| 2017/0186425 | A1 | 6/2017 | Dawes et al. | |
| 2017/0186427 | A1 | 6/2017 | Wang et al. | |
| 2017/0188150 | A1 | 6/2017 | Brunet et al. | |
| 2017/0188437 | A1 | 6/2017 | Banta | |
| 2017/0193999 | A1 | 7/2017 | Aleksic et al. | |
| 2017/0206896 | A1 | 7/2017 | Ko et al. | |
| 2017/0206900 | A1 | 7/2017 | Lee et al. | |
| 2017/0214996 | A1 | 7/2017 | Yeo | |
| 2017/0236512 | A1 | 8/2017 | Williams et al. | |
| 2017/0236515 | A1 | 8/2017 | Pinsky et al. | |
| 2017/0242649 | A1 | 8/2017 | Jarvis et al. | |
| 2017/0242651 | A1 | 8/2017 | Lang et al. | |
| 2017/0242653 | A1 | 8/2017 | Lang et al. | |
| 2017/0242656 | A1 | 8/2017 | Plagge et al. | |
| 2017/0242657 | A1 | 8/2017 | Jarvis et al. | |
| 2017/0243576 | A1 | 8/2017 | Millington et al. | |
| 2017/0243587 | A1 | 8/2017 | Plagge et al. | |
| 2017/0245076 | A1 | 8/2017 | Kusano et al. | |
| 2017/0255612 | A1 | 9/2017 | Sarikaya et al. | |
| 2017/0257686 | A1 | 9/2017 | Gautama et al. | |
| 2017/0269900 | A1 | 9/2017 | Triplett | |
| 2017/0269975 | A1 | 9/2017 | Wood et al. | |
| 2017/0270919 | A1 | 9/2017 | Parthasarathi et al. | |
| 2017/0278512 | A1 | 9/2017 | Pandya et al. | |
| 2017/0287485 | A1 | 10/2017 | Civelli et al. | |
| 2017/0300289 | A1 | 10/2017 | Gattis | |
| 2017/0300990 | A1 | 10/2017 | Tanaka et al. | |
| 2017/0329397 | A1 | 11/2017 | Lin | |
| 2017/0330565 | A1 | 11/2017 | Daley et al. | |
| 2017/0331869 | A1 | 11/2017 | Bendahan et al. | |
| 2017/0332035 | A1 | 11/2017 | Shah et al. | |
| 2017/0332168 | A1 | 11/2017 | Moghimi et al. | |
| 2017/0337932 | A1 | 11/2017 | Iyengar et al. | |
| 2017/0346872 | A1 | 11/2017 | Naik et al. | |
| 2017/0352357 | A1 | 12/2017 | Fink | |
| 2017/0353789 | A1 | 12/2017 | Kim et al. | |
| 2017/0357390 | A1 | 12/2017 | Alonso Ruiz et al. | |
| 2017/0357475 | A1 | 12/2017 | Lee et al. | |
| 2017/0357478 | A1 | 12/2017 | Piersol et al. | |
| 2017/0364371 | A1 | 12/2017 | Nandi et al. | |
| 2017/0365247 | A1 | 12/2017 | Ushakov | |
| 2017/0366393 | A1 | 12/2017 | Shaker et al. | |
| 2017/0374454 | A1 | 12/2017 | Bernardini et al. | |
| 2017/0374552 | A1 | 12/2017 | Xia et al. | |
| 2018/0012077 | A1 | 1/2018 | Laska et al. | |
| 2018/0018964 | A1 | 1/2018 | Reilly et al. | |
| 2018/0018965 | A1 | 1/2018 | Daley | |
| 2018/0018967 | A1 | 1/2018 | Lang et al. | |
| 2018/0020306 | A1 | 1/2018 | Sheen | |
| 2018/0025733 | A1 | 1/2018 | Qian et al. | |
| 2018/0033428 | A1 | 2/2018 | Kim et al. | |
| 2018/0033429 | A1 | 2/2018 | Makke et al. | |
| 2018/0033438 | A1 | 2/2018 | Toma et al. | |
| 2018/0040324 | A1 | 2/2018 | Wilberding | |
| 2018/0047394 | A1 | 2/2018 | Tian et al. | |

(56) References Cited

U.S. PATENT DOCUMENTS

2018/0053504 A1 2/2018 Wang et al.
2018/0054506 A1 2/2018 Hart et al.
2018/0061396 A1 3/2018 Srinivasan et al.
2018/0061402 A1 3/2018 Devaraj et al.
2018/0061404 A1 3/2018 Devaraj et al.
2018/0061409 A1 3/2018 Valentine et al.
2018/0061419 A1 3/2018 Melendo Casado et al.
2018/0061420 A1 3/2018 Patil et al.
2018/0062871 A1 3/2018 Jones et al.
2018/0084367 A1 3/2018 Greff et al.
2018/0088900 A1 3/2018 Glaser et al.
2018/0091898 A1 3/2018 Yoon et al.
2018/0091913 A1 3/2018 Hartung et al.
2018/0096678 A1 4/2018 Zhou et al.
2018/0096683 A1 4/2018 James et al.
2018/0096696 A1 4/2018 Mixter
2018/0107446 A1 4/2018 Wilberding et al.
2018/0108351 A1 4/2018 Beckhardt et al.
2018/0120947 A1 5/2018 Wells et al.
2018/0122372 A1 5/2018 Wanderlust
2018/0122378 A1 5/2018 Mixter et al.
2018/0130469 A1 5/2018 Gruenstein et al.
2018/0132217 A1 5/2018 Stirling-Gallacher
2018/0132298 A1 5/2018 Birnam et al.
2018/0137857 A1 5/2018 Zhou et al.
2018/0137861 A1 5/2018 Ogawa
2018/0139512 A1 5/2018 Moran et al.
2018/0152557 A1 5/2018 White et al.
2018/0158454 A1 6/2018 Campbell et al.
2018/0165055 A1 6/2018 Yu et al.
2018/0167981 A1 6/2018 Jonna et al.
2018/0174597 A1 6/2018 Lee et al.
2018/0182383 A1 6/2018 Kim et al.
2018/0182390 A1 6/2018 Hughes et al.
2018/0182397 A1 6/2018 Carbune et al.
2018/0182410 A1 6/2018 Kaskari et al.
2018/0188948 A1 7/2018 Ouyang et al.
2018/0190274 A1 7/2018 Kirazci et al.
2018/0190285 A1 7/2018 Heckmann et al.
2018/0196776 A1 7/2018 Hershko et al.
2018/0197533 A1 7/2018 Lyon et al.
2018/0199130 A1 7/2018 Jaffe et al.
2018/0199146 A1 7/2018 Sheen
2018/0204569 A1 7/2018 Nadkar et al.
2018/0205963 A1 7/2018 Matei et al.
2018/0210698 A1 7/2018 Park et al.
2018/0211665 A1 7/2018 Park et al.
2018/0218747 A1 8/2018 Moghimi et al.
2018/0219976 A1 8/2018 Decenzo et al.
2018/0225933 A1 8/2018 Park et al.
2018/0228006 A1 8/2018 Baker et al.
2018/0233130 A1 8/2018 Kaskari et al.
2018/0233136 A1 8/2018 Torok et al.
2018/0233137 A1 8/2018 Torok et al.
2018/0233139 A1 8/2018 Finkelstein et al.
2018/0233141 A1 8/2018 Solomon et al.
2018/0233142 A1 8/2018 Koishida et al.
2018/0233150 A1 8/2018 Gruenstein et al.
2018/0234765 A1 8/2018 Torok et al.
2018/0260680 A1 9/2018 Finkelstein et al.
2018/0261213 A1 9/2018 Arik et al.
2018/0262793 A1 9/2018 Lau et al.
2018/0262831 A1 9/2018 Matheja et al.
2018/0270565 A1 9/2018 Ganeshkumar
2018/0270573 A1 9/2018 Lang et al.
2018/0270575 A1 9/2018 Akutagawa
2018/0277107 A1 9/2018 Kim
2018/0277113 A1 9/2018 Hartung et al.
2018/0277119 A1 9/2018 Baba et al.
2018/0277133 A1 9/2018 Deetz et al.
2018/0286394 A1 10/2018 Li et al.
2018/0286414 A1 10/2018 Ravindran et al.
2018/0293221 A1 10/2018 Finkelstein et al.
2018/0293484 A1 10/2018 Wang et al.
2018/0301147 A1 10/2018 Kim
2018/0308470 A1 10/2018 Park et al.
2018/0314552 A1 11/2018 Kim et al.
2018/0322891 A1 11/2018 Van Den Oord et al.
2018/0324756 A1 11/2018 Ryu et al.
2018/0330589 A1 11/2018 Horling
2018/0330727 A1 11/2018 Tulli
2018/0335903 A1 11/2018 Coffman et al.
2018/0336274 A1 11/2018 Choudhury et al.
2018/0336892 A1 11/2018 Kim et al.
2018/0349093 A1 12/2018 McCarty et al.
2018/0350356 A1 12/2018 Garcia
2018/0350379 A1 12/2018 Wung et al.
2018/0352014 A1 12/2018 Alsina et al.
2018/0352334 A1 12/2018 Family et al.
2018/0356962 A1 12/2018 Corbin
2018/0358009 A1 12/2018 Daley et al.
2018/0358019 A1 12/2018 Mont-Reynaud
2018/0365567 A1 12/2018 Kolavennu et al.
2018/0367944 A1 12/2018 Heo et al.
2019/0012141 A1 1/2019 Piersol et al.
2019/0013019 A1 1/2019 Lawrence
2019/0014592 A1 1/2019 Hampel et al.
2019/0019112 A1 1/2019 Gelfenbeyn et al.
2019/0033446 A1 1/2019 Bultan et al.
2019/0035404 A1 1/2019 Gabel et al.
2019/0037173 A1 1/2019 Lee
2019/0042187 A1 2/2019 Truong et al.
2019/0043488 A1 2/2019 Bocklet et al.
2019/0043492 A1 2/2019 Lang
2019/0044745 A1 2/2019 Knudson et al.
2019/0051298 A1 2/2019 Lee et al.
2019/0051299 A1 2/2019 Ossowski et al.
2019/0066672 A1 2/2019 Wood et al.
2019/0066680 A1 2/2019 Woo et al.
2019/0066687 A1 2/2019 Wood et al.
2019/0066710 A1 2/2019 Bryan et al.
2019/0073999 A1 3/2019 Prémont et al.
2019/0074025 A1 3/2019 Lashkari et al.
2019/0079724 A1 3/2019 Feuz et al.
2019/0081507 A1 3/2019 Ide
2019/0081810 A1 3/2019 Jung
2019/0082255 A1 3/2019 Tajiri et al.
2019/0087455 A1 3/2019 He et al.
2019/0088261 A1 3/2019 Lang et al.
2019/0090056 A1 3/2019 Rexach et al.
2019/0096408 A1 3/2019 Li et al.
2019/0098400 A1 3/2019 Buoni et al.
2019/0104119 A1 4/2019 Giorgi et al.
2019/0104373 A1 4/2019 Wodrich et al.
2019/0108839 A1 4/2019 Reilly et al.
2019/0115011 A1 4/2019 Khellah et al.
2019/0122662 A1 4/2019 Chang et al.
2019/0130906 A1 5/2019 Kobayashi et al.
2019/0147860 A1 5/2019 Chen et al.
2019/0156847 A1 5/2019 Bryan et al.
2019/0163153 A1 5/2019 Price et al.
2019/0172452 A1 6/2019 Smith et al.
2019/0172467 A1 6/2019 Kim et al.
2019/0172476 A1 6/2019 Wung et al.
2019/0173687 A1 6/2019 Mackay et al.
2019/0179607 A1 6/2019 Thangarathnam et al.
2019/0179611 A1 6/2019 Wojogbe et al.
2019/0182072 A1 6/2019 Roe et al.
2019/0186937 A1 6/2019 Sharifi et al.
2019/0188328 A1 6/2019 Oyenan et al.
2019/0189117 A1 6/2019 Kumar
2019/0206391 A1 7/2019 Busch et al.
2019/0206405 A1 7/2019 Gillespie et al.
2019/0206412 A1 7/2019 Li et al.
2019/0219976 A1 7/2019 Giorgi et al.
2019/0220246 A1 7/2019 Orr et al.
2019/0221206 A1 7/2019 Chen et al.
2019/0237067 A1 8/2019 Friedman et al.
2019/0237089 A1 8/2019 Shin
2019/0239008 A1 8/2019 Lambourne
2019/0239009 A1 8/2019 Lambourne
2019/0243603 A1 8/2019 Keyser-Allen et al.
2019/0243606 A1 8/2019 Jayakumar et al.
2019/0244608 A1 8/2019 Choi et al.

(56) References Cited

U.S. PATENT DOCUMENTS

2019/0251960 A1 8/2019 Maker et al.
2019/0259408 A1 8/2019 Freeman et al.
2019/0281387 A1 9/2019 Woo et al.
2019/0281397 A1 9/2019 Lambourne
2019/0287536 A1 9/2019 Sharifi et al.
2019/0287546 A1 9/2019 Ganeshkumar
2019/0288970 A1 9/2019 Siddiq
2019/0289367 A1 9/2019 Siddiq
2019/0295542 A1 9/2019 Huang et al.
2019/0295555 A1 9/2019 Wilberding
2019/0295556 A1 9/2019 Wilberding
2019/0295563 A1 9/2019 Kamdar et al.
2019/0297388 A1 9/2019 Panchaksharaiah et al.
2019/0304443 A1 10/2019 Bhagwan
2019/0311710 A1 10/2019 Eraslan et al.
2019/0311712 A1 10/2019 Firik et al.
2019/0311715 A1 10/2019 Pfeffinger et al.
2019/0311718 A1 10/2019 Huber et al.
2019/0311720 A1 10/2019 Pasko
2019/0311722 A1 10/2019 Caldwell
2019/0317606 A1 10/2019 Jain et al.
2019/0318729 A1 10/2019 Chao et al.
2019/0325870 A1 10/2019 Mitic
2019/0325888 A1 10/2019 Geng
2019/0341037 A1 11/2019 Bromand et al.
2019/0341038 A1 11/2019 Bromand et al.
2019/0342962 A1 11/2019 Chang et al.
2019/0347063 A1 11/2019 Liu et al.
2019/0348044 A1 11/2019 Chun et al.
2019/0362714 A1 11/2019 Mori et al.
2019/0364375 A1 11/2019 Soto et al.
2019/0364422 A1 11/2019 Zhuo
2019/0371310 A1 12/2019 Fox et al.
2019/0371324 A1 12/2019 Powell et al.
2019/0371329 A1 12/2019 D'Souza et al.
2019/0371342 A1 12/2019 Tukka et al.
2019/0392832 A1 12/2019 Mitsui et al.
2020/0007987 A1 1/2020 Woo et al.
2020/0034492 A1 1/2020 Verbeke et al.
2020/0043489 A1 2/2020 Bradley et al.
2020/0043494 A1 2/2020 Maeng
2020/0051554 A1 2/2020 Kim et al.
2020/0066279 A1 2/2020 Kang et al.
2020/0074990 A1 3/2020 Kim et al.
2020/0075018 A1 3/2020 Chen
2020/0089469 A1 3/2020 Wilberding et al.
2020/0090647 A1 3/2020 Kurtz
2020/0092687 A1 3/2020 Devaraj et al.
2020/0098354 A1 3/2020 Lin et al.
2020/0098379 A1 3/2020 Tai et al.
2020/0105245 A1 4/2020 Gupta et al.
2020/0105256 A1 4/2020 Fainberg et al.
2020/0105264 A1 4/2020 Jang et al.
2020/0110571 A1 4/2020 Liu et al.
2020/0125162 A1 4/2020 D'Amato et al.
2020/0135194 A1 4/2020 Jeong
2020/0135224 A1 4/2020 Bromand et al.
2020/0152206 A1 5/2020 Shen et al.
2020/0167597 A1 5/2020 Nguyen et al.
2020/0175989 A1 6/2020 Lockhart et al.
2020/0184964 A1 6/2020 Myers et al.
2020/0184980 A1 6/2020 Wilberding
2020/0193973 A1 6/2020 Tolomei et al.
2020/0211539 A1 7/2020 Lee
2020/0211550 A1 7/2020 Pan et al.
2020/0211556 A1 7/2020 Mixter et al.
2020/0213729 A1 7/2020 Soto
2020/0216089 A1 7/2020 Garcia et al.
2020/0234709 A1 7/2020 Kunitake
2020/0244650 A1 7/2020 Burris et al.
2020/0251107 A1 8/2020 Wang et al.
2020/0265838 A1 8/2020 Lee et al.
2020/0265842 A1 8/2020 Singh
2020/0310751 A1 10/2020 Anand et al.
2020/0336846 A1 10/2020 Rohde et al.
2020/0342869 A1 10/2020 Lee et al.
2020/0364026 A1 11/2020 Lee et al.
2020/0366477 A1 11/2020 Brown et al.
2020/0395006 A1 12/2020 Smith et al.
2020/0395010 A1 12/2020 Smith et al.
2020/0395013 A1 12/2020 Smith et al.
2020/0409652 A1 12/2020 Wilberding et al.
2020/0409926 A1 12/2020 Srinivasan et al.
2021/0029452 A1 1/2021 Tsoi et al.
2021/0035561 A1 2/2021 D'Amato et al.
2021/0035572 A1 2/2021 D'Amato et al.
2021/0067867 A1 3/2021 Kagoshima
2021/0118429 A1 4/2021 Shan
2021/0118439 A1 4/2021 Schillmoeller et al.
2021/0157542 A1 5/2021 De Assis et al.
2021/0166680 A1 6/2021 Jung et al.
2021/0183366 A1 6/2021 Reinspach et al.
2021/0239831 A1 8/2021 Shin et al.
2021/0249004 A1 8/2021 Smith
2021/0280185 A1 9/2021 Tan et al.
2021/0295849 A1 9/2021 Van Der Ven et al.
2021/0358481 A1 11/2021 D'Amato et al.
2022/0035514 A1 2/2022 Shin et al.
2022/0036882 A1 2/2022 Ahn et al.
2022/0050585 A1 2/2022 Fettes et al.
2022/0083136 A1 3/2022 DeLeeuw
2022/0301561 A1 9/2022 Robert Jose et al.
2023/0019595 A1 1/2023 Smith
2023/0215433 A1 7/2023 Myers et al.
2023/0237998 A1 7/2023 Smith et al.
2023/0274738 A1 8/2023 Smith et al.
2023/0382349 A1 11/2023 Ham

FOREIGN PATENT DOCUMENTS

CN 1323435 A 11/2001
CN 1748250 A 3/2006
CN 1781291 A 5/2006
CN 101310558 A 11/2008
CN 101427154 A 5/2009
CN 101480039 A 7/2009
CN 101569093 A 10/2009
CN 101661753 A 3/2010
CN 101686282 A 3/2010
CN 101907983 A 12/2010
CN 102123188 A 7/2011
CN 102256098 A 11/2011
CN 102567468 A 7/2012
CN 102999161 A 3/2013
CN 103052001 A 4/2013
CN 103181192 A 6/2013
CN 103210663 A 7/2013
CN 103546616 A 1/2014
CN 103811007 A 5/2014
CN 104010251 A 8/2014
CN 104035743 A 9/2014
CN 104053088 A 9/2014
CN 104092936 A 10/2014
CN 104104769 A 10/2014
CN 104115224 A 10/2014
CN 104155938 A 11/2014
CN 104282305 A 1/2015
CN 104520927 A 4/2015
CN 104538030 A 4/2015
CN 104572009 A 4/2015
CN 104575504 A 4/2015
CN 104581510 A 4/2015
CN 104635539 A 5/2015
CN 104865550 A 8/2015
CN 104885406 A 9/2015
CN 104885438 A 9/2015
CN 105101083 A 11/2015
CN 105162886 A 12/2015
CN 105187907 A 12/2015
CN 105204357 A 12/2015
CN 105206281 A 12/2015
CN 105284076 A 1/2016
CN 105284168 A 1/2016
CN 105389099 A 3/2016

(56) References Cited

FOREIGN PATENT DOCUMENTS

| | | | |
|---|---|---|---|
| CN | 105427861 | A | 3/2016 |
| CN | 105453179 | A | 3/2016 |
| CN | 105472191 | A | 4/2016 |
| CN | 105493179 | A | 4/2016 |
| CN | 105493442 | A | 4/2016 |
| CN | 105632486 | A | 6/2016 |
| CN | 105679318 | A | 6/2016 |
| CN | 106028223 | A | 10/2016 |
| CN | 106030699 | A | 10/2016 |
| CN | 106375902 | A | 2/2017 |
| CN | 106531165 | A | 3/2017 |
| CN | 106708403 | A | 5/2017 |
| CN | 106796784 | A | 5/2017 |
| CN | 106910500 | A | 6/2017 |
| CN | 107004410 | A | 8/2017 |
| CN | 107122158 | A | 9/2017 |
| CN | 107465974 | A | 12/2017 |
| CN | 107644313 | A | 1/2018 |
| CN | 107767863 | A | 3/2018 |
| CN | 107832837 | A | 3/2018 |
| CN | 107919116 | A | 4/2018 |
| CN | 107919123 | A | 4/2018 |
| CN | 108028047 | A | 5/2018 |
| CN | 108028048 | A | 5/2018 |
| CN | 108198548 | A | 6/2018 |
| CN | 109712626 | A | 5/2019 |
| EP | 1349146 | A1 | 10/2003 |
| EP | 1389853 | A1 | 2/2004 |
| EP | 2051542 | A1 | 4/2009 |
| EP | 2166737 | A1 | 3/2010 |
| EP | 2683147 | A1 | 1/2014 |
| EP | 2986034 | A1 | 2/2016 |
| EP | 3128767 | A2 | 2/2017 |
| EP | 3133595 | A1 | 2/2017 |
| EP | 3142107 | A1 | 3/2017 |
| EP | 2351021 | B1 | 9/2017 |
| EP | 3270377 | A1 | 1/2018 |
| EP | 3285502 | A1 | 2/2018 |
| GB | 2501367 | A | 10/2013 |
| JP | S63301998 | A | 12/1988 |
| JP | H0883091 | A | 3/1996 |
| JP | 2001236093 | A | 8/2001 |
| JP | 2003223188 | A | 8/2003 |
| JP | 2004096520 | A | 3/2004 |
| JP | 2004109361 | A | 4/2004 |
| JP | 2004163590 | A | 6/2004 |
| JP | 2004347943 | A | 12/2004 |
| JP | 2004354721 | A | 12/2004 |
| JP | 2005242134 | A | 9/2005 |
| JP | 2005250867 | A | 9/2005 |
| JP | 2005284492 | A | 10/2005 |
| JP | 2006092482 | A | 4/2006 |
| JP | 2007013400 | A | 1/2007 |
| JP | 2007142595 | A | 6/2007 |
| JP | 2007235875 | A | 9/2007 |
| JP | 2008079256 | A | 4/2008 |
| JP | 2008158868 | A | 7/2008 |
| JP | 2008217444 | A | 9/2008 |
| JP | 2010141748 | A | 6/2010 |
| JP | 2013037148 | A | 2/2013 |
| JP | 2014071138 | A | 4/2014 |
| JP | 2014510481 | A | 4/2014 |
| JP | 2014137590 | A | 7/2014 |
| JP | 2015161551 | A | 9/2015 |
| JP | 2015527768 | A | 9/2015 |
| JP | 2016009193 | A | 1/2016 |
| JP | 2016095383 | A | 5/2016 |
| JP | 2017072857 | A | 4/2017 |
| JP | 2017129860 | A | 7/2017 |
| JP | 2017227912 | A | 12/2017 |
| JP | 2018055259 | A | 4/2018 |
| JP | 2019109510 | A | 7/2019 |
| KR | 20100036351 | A | 4/2010 |
| KR | 100966415 | B1 | 6/2010 |
| KR | 20100111071 | A | 10/2010 |
| KR | 20130050987 | A | 5/2013 |
| KR | 101284134 | B1 | 7/2013 |
| KR | 20140005410 | A | 1/2014 |
| KR | 20140035310 | A | 3/2014 |
| KR | 20140054643 | A | 5/2014 |
| KR | 20140111859 | A | 9/2014 |
| KR | 20140112900 | A | 9/2014 |
| TW | 201629950 | A | 8/2016 |
| WO | 9731437 | A1 | 8/1997 |
| WO | 200153994 | | 7/2001 |
| WO | 03054854 | A2 | 7/2003 |
| WO | 2003093950 | A2 | 11/2003 |
| WO | 2008048599 | A1 | 4/2008 |
| WO | 2008096414 | A1 | 8/2008 |
| WO | 2012166386 | A2 | 12/2012 |
| WO | 2013184792 | A1 | 12/2013 |
| WO | 2014064531 | A1 | 5/2014 |
| WO | 2014159581 | A1 | 10/2014 |
| WO | 2015017303 | A1 | 2/2015 |
| WO | 2015037396 | A1 | 3/2015 |
| WO | 2015105788 | A1 | 7/2015 |
| WO | 2015131024 | A1 | 9/2015 |
| WO | 2015133022 | A1 | 9/2015 |
| WO | 2015178950 | A1 | 11/2015 |
| WO | 2015195216 | A1 | 12/2015 |
| WO | 2016003509 | A1 | 1/2016 |
| WO | 2016014142 | A1 | 1/2016 |
| WO | 2016014686 | | 1/2016 |
| WO | 2016014686 | A1 | 1/2016 |
| WO | 2016022926 | A1 | 2/2016 |
| WO | 2016033364 | A1 | 3/2016 |
| WO | 2016057268 | A1 | 4/2016 |
| WO | 2016085775 | A2 | 6/2016 |
| WO | 2016136062 | A1 | 9/2016 |
| WO | 2016165067 | A1 | 10/2016 |
| WO | 2016171956 | A1 | 10/2016 |
| WO | 2016200593 | A1 | 12/2016 |
| WO | 2017039632 | A1 | 3/2017 |
| WO | 2017058654 | A1 | 4/2017 |
| WO | 2017138934 | A1 | 8/2017 |
| WO | 2017147075 | A1 | 8/2017 |
| WO | 2017147936 | A1 | 9/2017 |
| WO | 2018027142 | A1 | 2/2018 |
| WO | 2018064362 | A1 | 4/2018 |
| WO | 2018067404 | A1 | 4/2018 |
| WO | 2018140777 | A1 | 8/2018 |
| WO | 2019005772 | A1 | 1/2019 |
| WO | 2020061439 | A1 | 3/2020 |
| WO | 2020068795 | A1 | 4/2020 |
| WO | 2020132298 | A1 | 6/2020 |

OTHER PUBLICATIONS

Korean Patent Office, Korean Preliminary Rejection and Translation mailed on Dec. 26, 2023, issued in connection with Korean Application No. 10-2023-7031855, 4 pages.

Korean Patent Office, Korean Preliminary Rejection and Translation mailed on Dec. 5, 2023, issued in connection with Korean Application No. 10-2023-7032988, 11 pages.

Korean Patent Office, Office Action and Translation mailed on Feb. 27, 2023, issued in connection with Korean Application No. 10-2022-7021879, 5 pages.

Lei et al. Accurate and Compact Large Vocabulary Speech Recognition on Mobile Devices. Interspeech 2013, Aug. 25, 2013, 4 pages.

Lengerich et al. An End-to-End Architecture for Keyword Spotting and Voice Activity Detection, arXiv: 1611.09405v1, Nov. 28, 2016, 5 pages.

Louderback, Jim, “Affordable Audio Receiver Furnishes Homes With MP3,” TechTV Vault. Jun. 28, 2000 retrieved Jul. 10, 2014, 2 pages.

Maja Taseska and Emanual A.P. Habets, “MMSE-Based Blind Source Extraction in Diffuse Noise Fields Using a Complex Coherence-Based a Priori Sap Estimator.” International Workshop on Acoustic Signal Enhancement 2012, Sep. 4-6, 2012, 4pages.

Mathias Wolfel. Channel Selection by Class Separability Measures for Automatic Transcriptions on Distant Microphones, INTERSPEECH 2007 10.21437/Interspeech.2007-255, 4 pages.

(56) References Cited

OTHER PUBLICATIONS

Matrix—The Ultimate Development Board Sep. 14, 2019 Matrix—The Ultimate Development Board Sep. 14, 2019 https-//web.archive.org/web/20190914035838/https-//www.matrix.one/ , 1 page.
Mesaros et al. Detection and Classification of Acoustic Scenes and Events: Outcome of the DCASE 2016 Challenge. IEEE/ACM Transactions on Audio, Speech, and Language Processing. Feb. 2018, 16 pages.
Molina et al., "Maximum Entropy-Based Reinforcement Learning Using a Confidence Measure in Speech Recognition for Telephone Speech," in IEEE Transactions on Audio, Speech, and Language Processing, vol. 18, No. 5, pp. 1041-1052, Jul. 2010, doi: 10.1109/TASL.2009.2032618. [Retrieved online] URLhttps://ieeexplore.ieee.org/document/5247099?partnum=5247099&searchProductType=IEEE%20Journals%20Transactions.
Morales-Cordovilla et al. "Room Localization for Distant Speech Recognition," Proceedings of Interspeech 2014, Sep. 14, 2014, 4 pages.
Newman, Jared. "Chromecast Audio's multi-room support has arrived," Dec. 11, 2015, https://www.pcworld.com/ article/3014204/customer-electronic/chromcase-audio-s-multi-room-support-has ... , 1 page.
Ngo et al. "Incorporating the Conditional Speech Presence Probability in Multi-Channel Wiener Filter Based Noise Reduction in Hearing Aids." EURASIP Journal on Advances in Signal Processing vol. 2009, Jun. 2, 2009, 11 pages.
Non-Final Office Action mailed Jul. 12, 2021, issued in connection with U.S. Appl. No. 17/008,104, filed Aug. 31, 2020, 6 pages.
Non-Final Office Action mailed Jun. 18, 2021, issued in connection with U.S. Appl. No. 17/236,559, filed Apr. 21, 2021, 9 pages.
Non-Final Office Action mailed Apr. 21, 2021, issued in connection with U.S. Appl. No. 16/109,375, filed Aug. 22, 2018, 9 pages.
Non-Final Office Action mailed Dec. 21, 2020, issued in connection with U.S. Appl. No. 16/153,530, filed Oct. 5, 2018, 22 pages.
Non-Final Office Action mailed Jul. 22, 2021, issued in connection with U.S. Appl. No. 16/179,779, filed Nov. 2, 2018, 19 pages.
Non-Final Office Action mailed Apr. 23, 2021, issued in connection with U.S. Appl. No. 16/660,197, filed Oct. 22, 2019, 9 pages.
Non-Final Office Action mailed Jun. 25, 2021, issued in connection with U.S. Appl. No. 16/213,570, filed Dec. 7, 2018, 11 pages.
Non-Final Office Action mailed Jul. 8, 2021, issued in connection with U.S. Appl. No. 16/813,643, filed Mar. 9, 2020, 12 pages.
Non-Final Office Action mailed Dec. 9, 2020, issued in connection with U.S. Appl. No. 16/271,550, filed Feb. 8, 2019, 35 pages.
Non-Final Office Action mailed Jul. 9, 2021, issued in connection with U.S. Appl. No. 16/806,747, filed Mar. 2, 2020, 18 pages.
Non-Final Office Action mailed on Jun. 1, 2017, issued in connection with U.S. Appl. No. 15/223,218, filed Jul. 29, 2016, 7 pages.
Non-Final Office Action mailed on Feb. 2, 2023, issued in connection with U.S. Appl. No. 17/305,698, filed Jul. 13, 2021, 16 pages.
Non-Final Office Action mailed on Nov. 2, 2017, issued in connection with U.S. Appl. No. 15/584,782, filed May 2, 2017, 11 pages.
Non-Final Office Action mailed on Nov. 3, 2017, issued in connection with U.S. Appl. No. 15/438,741, filed Feb. 21, 2017, 11 pages.
Non-Final Office Action mailed on Nov. 4, 2019, issued in connection with U.S. Appl. No. 16/022,662, filed Jun. 28, 2018, 16 pages.
Non-Final Office Action mailed on Dec. 5, 2022, issued in connection with U.S. Appl. No. 17/662,302, filed May 6, 2022, 12 pages.
Non-Final Office Action mailed on Oct. 5, 2022, issued in connection with U.S. Appl. No. 17/449,926, filed Oct. 4, 2021, 11 pages.
Non-Final Office Action mailed on Sep. 5, 2019, issued in connection with U.S. Appl. No. 16/416,752, filed May 20, 2019, 14 pages.
Non-Final Office Action mailed on Feb. 7, 2017, issued in connection with U.S. Appl. No. 15/131,244, filed Apr. 18, 2016, 12 pages.
Non-Final Office Action mailed on Feb. 8, 2017, issued in connection with U.S. Appl. No. 15/098,892, filed Apr. 14, 2016, 17 pages.
Non-Final Office Action mailed on Mar. 9, 2017, issued in connection with U.S. Appl. No. 15/098,760, filed Apr. 14, 2016, 13 pages.
Non-Final Office Action mailed on Oct. 9, 2019, issued in connection with U.S. Appl. No. 15/936,177, filed Mar. 26, 2018, 16 pages.
Non-Final Office Action mailed on Feb. 1, 2024, issued in connection with U.S. Appl. No. 18/313,013, filed May 5, 2023, 47 pages.
Non-Final Office Action mailed on Jul. 1, 2020, issued in connection with U.S. Appl. No. 16/138,111, filed Sep. 21, 2018, 14 pages.
Non-Final Office Action mailed on May 1, 2024, issued in connection with U.S. Appl. No. 17/650,441, filed Feb. 9, 2022, 12 pages.
Non-Final Office Action mailed on Aug. 10, 2023, issued in connection with U.S. Appl. No. 18/070,024, filed Nov. 28, 2022, 4 pages.
Non-Final Office Action mailed on Jan. 10, 2018, issued in connection with U.S. Appl. No. 15/098,718, filed Apr. 14, 2016, 15 pages.
Non-Final Office Action mailed on Jan. 10, 2018, issued in connection with U.S. Appl. No. 15/229,868, filed Aug. 5, 2016, 13 pages.
Non-Final Office Action mailed on Jan. 10, 2018, issued in connection with U.S. Appl. No. 15/438,725, filed Feb. 21, 2017, 15 pages.
Non-Final Office Action mailed on Sep. 10, 2018, issued in connection with U.S. Appl. No. 15/670,361, filed Aug. 7, 2017, 17 pages.
Non-Final Office Action mailed on Aug. 11, 2021, issued in connection with U.S. Appl. No. 16/841,116, filed Apr. 6, 2020, 9 pages.
Non-Final Office Action mailed on Feb. 11, 2021, issued in connection with U.S. Appl. No. 16/876,493, filed May 18, 2020, 16 pages.
Non-Final Office Action mailed on Feb. 11, 2022, issued in connection with U.S. Appl. No. 17/145,667, filed Jan. 11, 2021, 9 pages.
Non-Final Office Action mailed on Mar. 11, 2021, issued in connection with U.S. Appl. No. 16/834,483, filed Mar. 30, 2020, 11 pages.
Non-Final Office Action mailed on Oct. 11, 2019, issued in connection with U.S. Appl. No. 16/177,185, filed Oct. 31, 2018, 14 pages.
Non-Final Office Action mailed on Sep. 11, 2020, issued in connection with U.S. Appl. No. 15/989,715, filed May 25, 2018, 8 pages.
Notice of Allowance mailed on Jun. 7, 2021, issued in connection with U.S. Appl. No. 16/528,224, filed Jul. 31, 2019, 9 pages.
Notice of Allowance mailed on Apr. 8, 2022, issued in connection with U.S. Appl. No. 16/813,643, filed Mar. 9, 2020, 7 pages.
Notice of Allowance mailed on Mar. 8, 2024, issued in connection with U.S. Appl. No. 17/135,173, filed Dec. 28, 2020, 9 pages.
Notice of Allowance mailed on Nov. 8, 2021, issued in connection with U.S. Appl. No. 17/008,104, filed Aug. 31, 2020, 9 pages.
Notice of Allowance mailed on Nov. 8, 2023, issued in connection with U.S. Appl. No. 18/066,093, filed Dec. 14, 2022, 11 pages.
Notice of Allowance mailed on Aug. 9, 2018, issued in connection with U.S. Appl. No. 15/229,868, filed Aug. 5, 2016, 11 pages.
Notice of Allowance mailed on Dec. 9, 2021, issued in connection with U.S. Appl. No. 16/845,946, filed Apr. 10, 2020, 10 pages.
Notice of Allowance mailed on Feb. 9, 2022, issued in connection with U.S. Appl. No. 17/247,736, filed Dec. 21, 2020, 8 pages.
Notice of Allowance mailed on Mar. 9, 2018, issued in connection with U.S. Appl. No. 15/584,782, filed May 2, 2017, 8 pages.
Oord et al. WaveNet: A Generative Model for Raw Audio. Arxiv.org, Cornell University Library, Sep. 12, 2016, 15 pages.
Optimizing Siri on HomePod in Far-Field Settings. Audio Software Engineering and Siri Speech Team, Machine Learning Journal vol. 1, Issue 12. https://machinelearning.apple.com/2018/12/03/optimizing-siri-on-homepod-in-far-field-settings.html. Dec. 2018, 18 pages.
Palm, Inc., "Handbook for the Palm VII Handheld," May 2000, 311 pages.
Parada et al. Contextual Information Improves OOV Detection in Speech. Proceedings of the 2010 Annual Conference of the North American Chapter of the Association for Computational Linguistics, Jun. 2, 2010, 9 pages.
Pre-Appeal Brief Decision mailed on Jan. 18, 2022, issued in connection with U.S. Appl. No. 16/806,747, filed Mar. 2, 2020, 2 pages.
Pre-Appeal Brief Decision mailed on Jun. 2, 2021, issued in connection with U.S. Appl. No. 16/213,570, filed Dec. 7, 2018, 2 pages.

(56) References Cited

OTHER PUBLICATIONS

Preinterview First Office Action mailed on Aug. 5, 2019, issued in connection with U.S. Appl. No. 16/434,426, filed Jun. 7, 2019, 4 pages.
Preinterview First Office Action mailed on Mar. 25, 2020, issued in connection with U.S. Appl. No. 16/109,375, filed Aug. 22, 2018, 6 pages.
Preinterview First Office Action mailed on Sep. 30, 2019, issued in connection with U.S. Appl. No. 15/989,715, filed May 25, 2018, 4 pages.
Preinterview First Office Action mailed on May 7, 2020, issued in connection with U.S. Appl. No. 16/213,570, filed Dec. 7, 2018, 5 pages.
Preinterview First Office Action mailed on Jan. 8, 2021, issued in connection with U.S. Appl. No. 16/798,967, filed Feb. 24, 2020, 4 pages.
Presentations at WinHEC 2000, May 2000, 138 pages.
Renato De Mori. Spoken Language Understanding: A Survey. Automatic Speech Recognition & Understanding, 2007. IEEE, Dec. 1, 2007, 56 pages.
Restriction Requirement mailed on Aug. 14, 2019, issued in connection with U.S. Appl. No. 16/214,711, filed Dec. 10, 2018, 5 pages.
Restriction Requirement mailed on Aug. 9, 2018, issued in connection with U.S. Appl. No. 15/717,621, filed Sep. 27, 2017, 8 pages.
Rottondi et al., "An Overview on Networked Music Performance Technologies," IEEE Access, vol. 4, pp. 8823-8843, 2016, DOI: 10.1109/ACCESS.2016.2628440, 21 pages.
Rybakov et al. Streaming keyword spotting on mobile devices, arXiv:2005.06720v2, Jul. 29, 2020, 5 pages.
Shan et al. Attention-based End-to-End Models for Small-Footprint Keyword Spotting, arXiv: 1803.10916v1, Mar. 29, 2018, 5 pages.
Simon Doclo et al. Combined Acoustic Echo and Noise Reduction Using GSVD-Based Optimal Filtering. In 2000 IEEE International Conference on Acoustics, Speech, and Signal Processing. Proceedings (Cat. No. 00CH37100), Aug. 6, 2002, 4 pages. [retrieved on Feb. 23, 2023], Retrieved from the Internet: URL: https://scholar.google.com/scholar?hl=en&as_sdt=0%2C14&q=COMBINED+ACOUSTIC+ECHO+AND+NOISE+REDUCTION+USING+GSVD-BASED+OPTIMAL+FILTERING&btnG =.
Snips: How to Snips—Assistant creation & Installation, Jun. 26, 2017, 6 pages.
Souden et al. "An Integrated Solution for Online Multichannel Noise Tracking and Reduction." IEEE Transactions on Audio, Speech, and Language Processing, vol. 19. No. 7, Sep. 7, 2011, 11 pages.
Souden et al. "Gaussian Model-Based Multichannel Speech Presence Probability" IEEE Transactions on Audio, Speech, and Language Processing, vol. 18, No. 5, Jul. 5, 2010, 6pages.
Souden et al. "On Optimal Frequency-Domain Multichannel Linear Filtering for Noise Reduction." IEEE Transactions on Audio, Speech, and Language Processing, vol. 18, No. 2, Feb. 2010, 17pages.
Speidel, Hans. Chatbot Training: How to use training data to provide fully automated customer support. Retrieved from the Internet: URL: https://www.crowdguru.de/wp-content/uploads/Case-Study-Chatbox-training-How-to-use-training-data-to-provide-fully-automated-customer-support.pdf. Jun. 29, 2017, 4 pages.
Stemmer et al. Speech Recognition and Understanding on Hardware-Accelerated DSP. Proceedings of Interspeech 2017: Show & Tell Contribution, Aug. 20, 2017, 2 pages.
Steven J. Nowlan and Geoffrey E. Hinton "Simplifying Neural Networks by Soft Weight-Sharing" Neural Computation 4, 1992, 21 pages.
Tsiami et al. "Experiments in acoustic source localization using sparse arrays in adverse indoors environments", 2014 22nd European Signal Processing Conference, Sep. 1, 2014, 5 pages.
Tsung-Hsien Wen et al: "A Network-based End-to-End Trainable Task-oriented Dialogue System", Corr (Arxiv), vol. 1604.04562v1, Apr. 15, 2016 (Apr. 15, 2016), pp. 1-11.
Tsung-Hsien Wen et al: "A Network-based End-to-End Trainable Task-oriented Dialogue System", Corr Arxiv, vol. 1604.04562v1, Apr. 15, 2016, pp. 1-11, XP055396370, Stroudsburg, PA, USA.
Tweet: "How to start using Google app voice commands to make your life easier Share This Story shop @Bullet", Jan. 21, 2016, https://bgr.com/2016/01/21/best-ok-google-voice-commands/, 3 page.
Ullrich et al. "Soft Weight-Sharing for Neural Network Compression." ICLR 2017, 16 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Vacher at al. "Recognition of voice commands by multisource ASR and noise cancellation in a smart home environment" Signal Processing Conference 2012 Proceedings of the 20th European, IEEE, Aug. 27, 2012, 5 pages.
Vacher et al. "Speech Recognition in a Smart Home: Some Experiments for Telemonitoring," 2009 Proceedings of the 5th Conference on Speech Technology and Human-Computer Dialogoue, Constant, 2009, 10 pages.
"S Voice or Google Now?"; https://web.archive.org/web/20160807040123/lowdown.carphonewarehouse.com/news/s-voice-or-google-now/ . . . , Apr. 28, 2015; 4 pages.
Wen et al. A Network-based End-to-End Trainable Task-oriented Dialogue System, Corr (Arxiv), Apr. 15, 2016, 11 pages.
Wikipedia. "The Wayback Machine", Speech recognition software for Linux, Sep. 22, 2016, 4 pages. [retrieved on Mar. 28, 2022], Retrieved from the Internet: URL: https://web.archive.org/web/20160922151304/https://en.wikipedia. org/wiki/Speech_recognition_software_for_Linux.
Wolf et al. On the potential of channel selection for recognition of reverberated speech with multiple microphones. Interspeech, Talp Research Center, Jan. 2010, 5 pages.
Wölfel et al. Multi-source far-distance microphone selection and combination for automatic transcription of lectures, Interspeech 2006—ICSLP, Jan. 2006, 5 pages.
International Bureau, International Preliminary Report on Patentability, mailed on Apr. 26, 2022, issued in connection with International Application No. PCT/US2020/056632, filed on Oct. 21, 2020, 7 pages.
International Bureau, International Preliminary Report on Patentability, mailed on Mar. 31, 2020, issued in connection with International Application No. PCT/US2018053123, filed on Sep. 27, 2018, 12 pages.
International Bureau, International Preliminary Report on Patentability, mailed on Mar. 31, 2020, issued in connection with International Application No. PCT/US2018053472, filed on Sep. 28, 2018, 8 pages.
International Bureau, International Preliminary Report on Patentability, mailed on Mar. 31, 2020, issued in connection with International Application No. PCT/US2018053517, filed on Sep. 28, 2018, 10 pages.
International Bureau, International Preliminary Report on Patentability, mailed on Sep. 7, 2018, issued in connection with International Application No. PCT/US2017/018728, filed on Feb. 21, 2017, 8 pages.
International Bureau, International Preliminary Report on Patentability, mailed on Sep. 7, 2018, issued in connection with International Application No. PCT/US2017/018739, filed on Feb. 21, 2017, 7 pages.
International Bureau, International Search Report and Written Opinion mailed on Nov. 10, 2020, issued in connection with International Application No. PCT/US2020/044250, filed on Jul. 30, 2020, 15 pages.
International Bureau, International Search Report and Written Opinion mailed on Dec. 11, 2019, issued in connection with International Application No. PCT/US2019/052129, filed on Sep. 20, 2019, 18 pages.

(56) References Cited

OTHER PUBLICATIONS

International Bureau, International Search Report and Written Opinion mailed on Nov. 13, 2018, issued in connection with International Application No. PCT/US2018/045397, filed on Aug. 6, 2018, 11 pages.
International Bureau, International Search Report and Written Opinion mailed on Jan. 14, 2019, issued in connection with International Application No. PCT/US2018053472, filed on Sep. 28, 2018, 10 pages.
International Bureau, International Search Report and Written Opinion mailed on Jul. 14, 2020, issued in connection with International Application No. PCT/US2020/017150, filed on Feb. 7, 2020, 27 pages.
International Bureau, International Search Report and Written Opinion mailed on Nov. 14, 2017, issued in connection with International Application No. PCT/US2017/045521, filed on Aug. 4, 2017, 10 pages.
International Bureau, International Search Report and Written Opinion mailed on Jul. 17, 2019, issued in connection with International Application No. PCT/US2019/032934, filed on May 17, 2019, 17 pages.
International Bureau, International Search Report and Written Opinion mailed on Nov. 18, 2019, issued in connection with International Application No. PCT/US2019/048558, filed on Aug. 28, 2019, 11 pages.
International Bureau, International Search Report and Written Opinion mailed on Nov. 18, 2019, issued in connection with International Application No. PCT/US2019052841, filed on Sep. 25, 2019, 12 pages.
International Bureau, International Search Report and Written Opinion mailed on Mar. 2, 2020, issued in connection with International Application No. PCT/US2019064907, filed on Dec. 6, 2019, 11 pages.
International Bureau, International Search Report and Written Opinion mailed on Mar. 2, 2020, issued in connection with International Application No. PCT/US2019/064907, filed on Dec. 6, 2019, 9 pages.
International Bureau, International Search Report and Written Opinion mailed on Dec. 20, 2019, issued in connection with International Application No. PCT/US2019052654, filed on Sep. 24, 2019, 11 pages.
International Bureau, International Search Report and Written Opinion mailed on Mar. 20, 2023, issued in connection with International Application No. PCT/US2022/045399, filed on Sep. 30, 2022, 25 pages.
International Bureau, International Search Report and Written Opinion mailed on Sep. 21, 2020, issued in connection with International Application No. PCT/US2020/037229, filed on Jun. 11, 2020, 17 pages.
International Bureau, International Search Report and Written Opinion mailed on Oct. 22, 2020, issued in connection with International Application No. PCT/US2020/044282, filed on Jul. 30, 2020, 15 pages.
International Bureau, International Search Report and Written Opinion mailed on Apr. 23, 2021, issued in connection with International Application No. PCT/US2021/070007, filed on Jan. 6, 2021, 11 pages.
International Bureau, International Search Report and Written Opinion mailed on Jul. 24, 2018, issued in connection with International Application No. PCT/US2018/019010, filed on Feb. 21, 2018, 12 pages.
International Bureau, International Search Report and Written Opinion, mailed on Feb. 27, 2019, issued in connection with International Application No. PCT/US2018/053123, filed on Sep. 27, 2018, 16 pages.
International Bureau, International Search Report and Written Opinion mailed on Sep. 27, 2019, issued in connection with International Application No. PCT/US2019/039828, filed on Jun. 28, 2019, 13 pages.
International Bureau, International Search Report and Written Opinion mailed on Nov. 29, 2019, issued in connection with International Application No. PCT/US2019/053253, filed on Sep. 29, 2019, 14 pages.
International Bureau, International Search Report and Written Opinion mailed on Sep. 4, 2019, issued in connection with International Application No. PCT/US2019/033945, filed on May 24, 2019, 8 pages.
International Bureau, International Search Report and Written Opinion mailed on Aug. 6, 2020, issued in connection with International Application No. PCT/FR2019/000081, filed on May 24, 2019, 12 pages.
International Bureau, International Search Report and Written Opinion mailed on Dec. 6, 2018, issued in connection with International Application No. PCT/US2018/050050, filed on Sep. 7, 2018, 9 pages.
International Bureau, International Search Report and Written Opinion mailed on Dec. 6, 2019, issued in connection with International Application No. PCT/US2019050852, filed on Sep. 12, 2019, 10 pages.
International Bureau, International Search Report and Written Opinion mailed on Oct. 6, 2017, issued in connection with International Application No. PCT/US2017/045551, filed on Aug. 4, 2017, 12 pages.
International Bureau, International Search Report and Written Opinion mailed on Apr. 8, 2020, issued in connection with International Application No. PCT/US2019/067576, filed on Dec. 19, 2019, 12 pages.
International Searching Authority, International Search Report and Written Opinion mailed on Feb. 8, 2021, issued in connection with International Application No. PCT/EP2020/082243, filed on Nov. 16, 2020, 10 pages.
International Searching Authority, International Search Report and Written Opinion mailed on Feb. 12, 2021, issued in connection with International Application No. PCT/US2020/056632, filed on Oct. 21, 2020, 10 pages.
International Searching Authority, International Search Report and Written Opinion mailed on Dec. 19, 2018, in connection with International Application No. PCT/US2018/053517, 13 pages.
International Searching Authority, International Search Report and Written Opinion mailed on Nov. 22, 2017, issued in connection with International Application No. PCT/US2017/054063, filed on Sep. 28, 2017, 11 pages.
International Searching Authority, International Search Report and Written Opinion mailed on Apr. 23, 2021, issued in connection with International Application No. PCT/US2020/066231, filed on Dec. 18, 2020, 9 pages.
International Searching Authority, International Search Report and Written Opinion mailed on Jan. 23, 2018, issued in connection with International Application No. PCT/US2017/57220, filed on Oct. 18, 2017, 8 pages.
International Searching Authority, International Search Report and Written Opinion mailed on May 23, 2017, issued in connection with International Application No. PCT/US2017/018739, Filed on Feb. 21, 2017, 10 pages.
International Searching Authority, International Search Report and Written Opinion mailed on Oct. 23, 2017, issued in connection with International Application No. PCT/US2017/042170, filed on Jul. 14, 2017, 15 pages.
International Searching Authority, International Search Report and Written Opinion mailed on Oct. 24, 2017, issued in connection with International Application No. PCT/US2017/042227, filed on Jul. 14, 2017, 16 pages.
International Searching Authority, International Search Report and Written Opinion mailed on May 30, 2017, issued in connection with International Application No. PCT/US2017/018728, Filed on Feb. 21, 2017, 11 pages.
International Searching Authority, Invitation to Pay Additional Fees on Jan. 27, 2023, issued in connection with International Application No. PCT/US2022/045399, filed on Sep. 30, 2022, 19 pages.
Japanese Patent Office, Decision of Refusal and Translation mailed on Oct. 4, 2022, issued in connection with Japanese Patent Application No. 2021-535871, 6 pages.

(56) References Cited

OTHER PUBLICATIONS

Japanese Patent Office, Decision of Refusal and Translation mailed on May 23, 2023, issued in connection with Japanese Patent Application No. 2021-163622, 13 pages.
Japanese Patent Office, Decision of Refusal and Translation mailed on Jul. 26, 2022, issued in connection with Japanese Patent Application No. 2020-513852, 10 pages.
Japanese Patent Office, Decision of Refusal and Translation mailed on Jun. 8, 2021, issued in connection with Japanese Patent Application No. 2019-073348, 5 pages.
Japanese Patent Office, English Translation of Office Action mailed on Nov. 17, 2020, issued in connection with Japanese Application No. 2019-145039, 5 pages.
Japanese Patent Office, English Translation of Office Action mailed on Aug. 27, 2020, issued in connection with Japanese Application No. 2019-073349, 6 pages.
Japanese Patent Office, English Translation of Office Action mailed on Jul. 30, 2020, issued in connection with Japanese Application No. 2019-517281, 26 pages.
Canadian Patent Office, Canadian Office Action mailed on Nov. 14, 2018, issued in connection with Canadian Application No. 3015491, 3 pages.
Chinese Patent Office, Chinese Office Action and Translation mailed on Jul. 2, 2021, issued in connection with Chinese Application No. 201880077216.4, 22 pages.
Chinese Patent Office, Chinese Office Action and Translation mailed on Mar. 30, 2021, issued in connection with Chinese Application No. 202010302650.7, 15 pages.
Chinese Patent Office, First Office Action and Translation mailed on Jun. 1, 2021, issued in connection with Chinese Application No. 201980089721.5, 21 pages.
Chinese Patent Office, First Office Action and Translation mailed on Feb. 9, 2023, issued in connection with Chinese Application No. 201880076788.0, 13 pages.
Chinese Patent Office, First Office Action and Translation mailed on Oct. 9, 2022, issued in connection with Chinese Application No. 201780056695.7, 10 pages.
Chinese Patent Office, First Office Action and Translation mailed on Dec. 1, 2021, issued in connection with Chinese Application No. 201780077204.7, 11 pages.
Chinese Patent Office, First Office Action and Translation mailed on Nov. 10, 2022, issued in connection with Chinese Application No. 201980070006.7, 15 pages.
Chinese Patent Office, First Office Action and Translation mailed on Jan. 19, 2023, issued in connection with Chinese Application No. 201880064916.X, 10 pages.
Chinese Patent Office, First Office Action and Translation mailed on Sep. 19, 2022, issued in connection with Chinese Application No. 201980056604.9, 13 pages.
Chinese Patent Office, First Office Action and Translation mailed on Dec. 20, 2021, issued in connection with Chinese Application No. 202010302650.7, 10 pages.
Chinese Patent Office, First Office Action and Translation mailed on Mar. 20, 2019, issued in connection with Chinese Application No. 201780025028.2, 18 pages.
Chinese Patent Office, First Office Action and Translation mailed on Apr. 23, 2024, issued in connection with Chinese Application No. 202110542908.5, 10 pages.
Chinese Patent Office, First Office Action and Translation mailed on Nov. 25, 2022, issued in connection with Chinese Application No. 201780056321.5, 8 pages.
Chinese Patent Office, First Office Action and Translation mailed on Feb. 27, 2023, issued in connection with Chinese Application No. 201980003798.6, 12 pages.
Chinese Patent Office, First Office Action and Translation mailed on Mar. 27, 2019, issued in connection with Chinese Application No. 201780025029.7, 9 pages.
Chinese Patent Office, First Office Action and Translation mailed on May 27, 2021, issued in connection with Chinese Application No. 201880026360.5, 15 pages.
Chinese Patent Office, First Office Action and Translation mailed on Dec. 28, 2020, issued in connection with Chinese Application No. 201880072203.8, 11 pages.
Chinese Patent Office, First Office Action and Translation mailed on Dec. 30, 2022, issued in connection with Chinese Application No. 201880076775.3, 10 pages.
Chinese Patent Office, First Office Action and Translation mailed on Nov. 5, 2019, issued in connection with Chinese Application No. 201780072651.3, 19 pages.
Chinese Patent Office, First Office Action and Translation mailed on Sep. 6, 2023, issued in connection with Chinese Application No. 202010179593.8, 14 pages.
Chinese Patent Office, First Office Action mailed on Feb. 28, 2020, issued in connection with Chinese Application No. 201780061543.6, 29 pages.
Chinese Patent Office, Second Office Action and Translation mailed on Mar. 3, 2022, issued in connection with Chinese Application No. 201880077216.4, 11 pages.
Chinese Patent Office, Second Office Action and Translation mailed on Apr. 1, 2023, issued in connection with Chinese Application No. 201980056604.9, 11 pages.
Chinese Patent Office, Second Office Action and Translation mailed on May 11, 2020, issued in connection with Chinese Application No. 201780061543.6, 17 pages.
Chinese Patent Office, Second Office Action and Translation mailed on Jul. 18, 2019, issued in connection with Chinese Application No. 201780025029.7, 14 pages.
Chinese Patent Office, Second Office Action and Translation mailed on Sep. 23, 2019, issued in connection with Chinese Application No. 201780025028.2, 15 pages.
Chinese Patent Office, Second Office Action and Translation mailed on Mar. 31, 2020, issued in connection with Chinese Application No. 201780072651.3, 17 pages.
Chinese Patent Office, Second Office Action mailed on Dec. 21, 2022, issued in connection with Chinese Application No. 201980089721.5, 12 pages.
Chinese Patent Office, Second Office Action mailed on May 30, 2023, issued in connection with Chinese Application No. 201980070006.7, 9 pages.
Chinese Patent Office, Third Office Action and Translation mailed on Sep. 16, 2019, issued in connection with Chinese Application No. 201780025029.7, 14 pages.
Chinese Patent Office, Third Office Action and Translation mailed on Aug. 5, 2020, issued in connection with Chinese Application No. 201780072651.3, 10 pages.
Chinese Patent Office, Translation of Office Action mailed on Jul. 18, 2019, issued in connection with Chinese Application No. 201780025029.7, 8 pages.
Chung et al. Empirical Evaluation of Gated Recurrent Neural Network on Sequence Modeling. Dec. 11, 2014, 9 pages.
Cipriani,. The complete list of OK, Google commands—CNET. Jul. 1, 2016, 5 pages. [online], [retrieved on Jan. 15, 2020]. Retrieved from the Internet: (URL:https://web.archive.org/web/20160803230926/https://www.cnet.com/ how-to/complete-list-of-ok-googl ··-commands/).
Corrected Notice of Allowability mailed on Mar. 8, 2017, issued in connection with U.S. Appl. No. 15/229,855, filed Aug. 5, 2016, 6 pages.
Couke et al. Efficient Keyword Spotting using Dilated Convolutions and Gating, arXiv: 1811.07684v2, Feb. 18, 2019, 5 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, Decision to Refuse European Patent Application mailed on May 30, 2022, issued in connection with European Application No. 17200837.7, 4 pages.
European Patent Office, European EPC Article 94.3 mailed on Jun. 5, 2023, issued in connection with European Application No. 20710649.3, 8 pages.
European Patent Office, European EPC Article 94.3 mailed on Feb. 10, 2023, issued in connection with European Application No. 19729968.8, 7 pages.

(56) References Cited

OTHER PUBLICATIONS

European Patent Office, European EPC Article 94.3 mailed on Jan. 10, 2024, issued in connection with European Application No. 20757152.2, 6 pages.
European Patent Office, European EPC Article 94.3 mailed on Mar. 11, 2022, issued in connection with European Application No. 19731415.6, 7 pages.
European Patent Office, European EPC Article 94.3 mailed on Nov. 11, 2021, issued in connection with European Application No. 19784172.9, 5 pages.
European Patent Office, European EPC Article 94.3 mailed on Oct. 12, 2023, issued in connection with European Application No. 20736489.4, 8 pages.
European Patent Office, European EPC Article 94.3 mailed on Dec. 18, 2023, issued in connection with European Application No. 21703134.3, 7 pages.
European Patent Office, European EPC Article 94.3 mailed on May 2, 2022, issued in connection with European Application No. 20185599.6, 7 pages.
European Patent Office, European EPC Article 94.3 mailed on Jun. 21, 2022, issued in connection with European Application No. 19780508.8, 5 pages.
European Patent Office, European EPC Article 94.3 mailed on Feb. 23, 2021, issued in connection with European Application No. 17200837.7, 8 pages.
European Patent Office, European EPC Article 94.3 mailed on Feb. 23, 2023, issued in connection with European Application No. 19839734.1, 8 pages.
European Patent Office, European EPC Article 94.3 mailed on Jan. 24, 2024, issued in connection with European Application No. 21180778.9, 8 pages.
European Patent Office, European EPC Article 94.3 mailed on Feb. 26, 2021, issued in connection with European Application No. 18789515.6, 8 pages.
European Patent Office, European EPC Article 94.3 mailed on Jun. 27, 2023, issued in connection with European Application No. 21195031.6, 4 pages.
European Patent Office, European EPC Article 94.3 mailed on Nov. 27, 2023, issued in connection with European Application No. 19780508.8, 7 pages.
European Patent Office, European EPC Article 94.3 mailed on Feb. 28, 2024, issued in connection with European Application No. 18306501, 7 pages.
European Patent Office, European EPC Article 94.3 mailed on Nov. 28, 2022, issued in connection with European Application No. 18789515.6, 7 pages.
European Patent Office, European EPC Article 94.3 mailed on Nov. 28, 2023, issued in connection with European Application No. 19731415.6, 9 pages.
European Patent Office, European EPC Article 94.3 mailed on Apr. 29, 2024, issued in connection with European Application No. 21195031.6, 4 pages.
European Patent Office, European EPC Article 94.3 mailed on Mar. 29, 2023, issued in connection with European Application No. 22182193.7, 4 pages.
European Patent Office, European EPC Article 94.3 mailed on Mar. 3, 2022, issued in connection with European Application No. 19740292.8, 10 pages.
European Patent Office, European EPC Article 94.3 mailed on Jun. 30, 2022, issued in connection with European Application No. 19765953.5, 4 pages.
European Patent Office, European EPC Article 94.3 mailed on Aug. 31, 2023, issued in connection with European Application No. 19773326.4, 5 pages.
European Patent Office, European EPC Article 94.3 mailed on Jul. 31, 2023, issued in connection with European Application No. 21164130.3, 5 pages.
European Patent Office, European EPC Article 94.3 mailed on Apr. 6, 2023, issued in connection with European Application No. 21193616.6, 7 pages.
European Patent Office, European EPC Article 94.3 mailed on Sep. 6, 2023, issued in connection with European Application No. 19197116.7, 4 pages.
European Patent Office, European EPC Article 94.3 mailed on Sep. 7, 2023, issued in connection with European Application No. 20185599.6, 6 pages.
European Patent Office, European Extended Search Report mailed on Oct. 7, 2021, issued in connection with European Application No. 21193616.6, 9 pages.
European Patent Office, European Extended Search Report mailed on Oct. 7, 2022, issued in connection with European Application No. 22182193.7, 8 pages.
European Patent Office, European Extended Search Report mailed on Jan. 2, 2024, issued in connection with European Application No. 23188226.7, 10 pages.
European Patent Office, European Extended Search Report mailed on Apr. 22, 2022, issued in connection with European Application No. 21195031.6, 14 pages.
European Patent Office, European Extended Search Report mailed on Jun. 23, 2022, issued in connection with European Application No. 22153180.9, 6 pages.
European Patent Office, European Extended Search Report mailed on Nov. 25, 2020, issued in connection with European Application No. 20185599.6, 9 pages.
European Patent Office, European Extended Search Report mailed on Feb. 3, 2020, issued in connection with European Application No. 19197116.7, 9 pages.
European Patent Office, European Extended Search Report mailed on Jan. 3, 2019, issued in connection with European Application No. 177570702, 8 pages.
European Patent Office, European Extended Search Report mailed on Jan. 3, 2019, issued in connection with European Application No. 17757075.1, 9 pages.
European Patent Office, European Extended Search Report mailed on Jun. 30, 2022, issued in connection with European Application No. 21212763.3, 9 pages.
European Patent Office, European Extended Search Report mailed on Oct. 30, 2017, issued in connection with EP Application No. 17174435.2, 11 pages.
European Patent Office, European Extended Search Report mailed on Aug. 6, 2020, issued in connection with European Application No. 20166332.5, 10 pages.
European Patent Office, European Extended Search Report mailed on Jul. 8, 2022, issued in connection with European Application No. 22153523.0, 9 pages.
European Patent Office, European Office Action mailed on Jul. 1, 2020, issued in connection with European Application No. 17757075.1, 7 pages.
European Patent Office, European Office Action mailed on Jan. 14, 2020, issued in connection with European Application No. 17757070.2, 7 pages.
European Patent Office, European Office Action mailed on Jan. 21, 2021, issued in connection with European Application No. 17792272.1, 7 pages.
European Patent Office, European Office Action mailed on Jan. 22, 2019, issued in connection with European Application No. 17174435.2, 9 pages.
European Patent Office, European Office Action mailed on Sep. 23, 2020, issued in connection with European Application No. 18788976.1, 7 pages.
European Patent Office, European Office Action mailed on Oct. 26, 2020, issued in connection with European Application No. 18760101.8, 4 pages.
European Patent Office, European Office Action mailed on Aug. 30, 2019, issued in connection with European Application No. 17781608.9, 6 pages.
European Patent Office, European Office Action mailed on Sep. 9, 2020, issued in connection with European Application No. 18792656.3, 10 pages.
European Patent Office, European Search Report mailed on Mar. 1, 2022, issued in connection with European Application No. 21180778.9, 9 pages.

(56) References Cited

OTHER PUBLICATIONS

European Patent Office, European Search Report mailed on Feb. 2, 2024, issued in connection with European Application No. 23200723.7, 5 pages.
European Patent Office, European Search Report mailed on Oct. 4, 2022, issued in connection with European Application No. 22180226.7, 6 pages.
European Patent Office, European Search Report mailed on Sep. 21, 2023, issued in connection with European Application No. 23172783.5, 8 pages.
European Patent Office, Examination Report mailed on Jul. 15, 2021, issued in connection with European Patent Application No. 19729968.8, 7 pages.
European Patent Office, Extended Search Report mailed on Aug. 13, 2021, issued in connection with European Patent Application No. 21164130.3, 11 pages.
European Patent Office, Extended Search Report mailed on May 16, 2018, issued in connection with European Patent Application No. 17200837.7, 11 pages.
European Patent Office, Extended Search Report mailed on Jul. 25, 2019, issued in connection with European Patent Application No. 18306501.0, 14 pages.
European Patent Office, Extended Search Report mailed on May 29, 2020, issued in connection with European Patent Application No. 19209389.6, 8 pages.
European Patent Office, Summons to Attend Oral Proceedings mailed on Jul. 15, 2022, issued in connection with European Application No. 17792272.1, 11 pages.
European Patent Office, Summons to Attend Oral Proceedings mailed on Dec. 20, 2019, issued in connection with European Application No. 17174435.2, 13 pages.
Notice of Allowance mailed on Apr. 13, 2022, issued in connection with U.S. Appl. No. 17/236,559, filed Apr. 21, 2021, 7 pages.
Notice of Allowance mailed on Dec. 13, 2017, issued in connection with U.S. Appl. No. 15/784,952, filed Oct. 16, 2017, 9 pages.
Notice of Allowance mailed on Dec. 13, 2021, issued in connection with U.S. Appl. No. 16/879,553, filed May 20, 2020, 15 pages.
Notice of Allowance mailed on Feb. 13, 2019, issued in connection with U.S. Appl. No. 15/959,907, filed Apr. 23, 2018, 10 pages.
Notice of Allowance mailed on Feb. 13, 2023, issued in connection with U.S. Appl. No. 18/045,360, filed Oct. 10, 2022, 9 pages.
Notice of Allowance mailed on Jan. 13, 2020, issued in connection with U.S. Appl. No. 16/192,126, filed Nov. 15, 2018, 6 pages.
Notice of Allowance mailed on Jan. 13, 2021, issued in connection with U.S. Appl. No. 16/539,843, filed Aug. 13, 2019, 5 pages.
Notice of Allowance mailed on Jul. 13, 2023, issued in connection with U.S. Appl. No. 18/145,501, filed Dec. 22, 2022, 9 pages.
Notice of Allowance mailed on Jun. 13, 2023, issued in connection with U.S. Appl. No. 17/249,776, filed Mar. 12, 2021, 10 pages.
Notice of Allowance mailed on Mar. 13, 2024, issued in connection with U.S. Appl. No. 18/449,254, filed Aug. 14, 2023, 10 pages.
Notice of Allowance mailed on Nov. 13, 2020, issued in connection with U.S. Appl. No. 16/131,409, filed Sep. 14, 2018, 11 pages.
Notice of Allowance mailed on Aug. 14, 2017, issued in connection with U.S. Appl. No. 15/098,867, filed Apr. 14, 2016, 10 pages.
Notice of Allowance mailed on Aug. 14, 2020, issued in connection with U.S. Appl. No. 16/598,125, filed Oct. 10, 2019, 5 pages.
Notice of Allowance mailed on Aug. 14, 2023, issued in connection with U.S. Appl. No. 17/549,034, filed Dec. 13, 2021, 9 pages.
Notice of Allowance mailed on Dec. 14, 2023, issued in connection with U.S. Appl. No. 17/722,661, filed Apr. 18, 2022, 12 pages.
Notice of Allowance mailed on Feb. 14, 2017, issued in connection with U.S. Appl. No. 15/229,855, filed Aug. 5, 2016, 11 pages.
Notice of Allowance mailed on Jan. 14, 2021, issued in connection with U.S. Appl. No. 17/087,423, filed Nov. 2, 2020, 8 pages.
Notice of Allowance mailed on Jan. 14, 2022, issued in connection with U.S. Appl. No. 16/966,397, filed Jul. 30, 2020, 5 pages.
Notice of Allowance mailed on Jun. 14, 2017, issued in connection with U.S. Appl. No. 15/282,554, filed Sep. 30, 2016, 11 pages.
Notice of Allowance mailed on Nov. 14, 2018, issued in connection with U.S. Appl. No. 15/297,627, filed Oct. 19, 2016, 5 pages.
Notice of Allowance mailed on Sep. 14, 2023, issued in connection with U.S. Appl. No. 18/061,579, filed Dec. 5, 2022, 7 pages.
Notice of Allowance mailed on Aug. 15, 2022, issued in connection with U.S. Appl. No. 17/101,949, filed Nov. 23, 2020, 11 pages.
Notice of Allowance mailed on Dec. 15, 2017, issued in connection with U.S. Appl. No. 15/223,218, filed Jul. 29, 2016, 7 pages.
Notice of Allowance mailed on Dec. 15, 2023, issued in connection with U.S. Appl. No. 18/157,937, filed Jan. 23, 2023, 8 pages.
Notice of Allowance mailed on Feb. 15, 2023, issued in connection with U.S. Appl. No. 17/659,613, filed Apr. 18, 2022, 21 pages.
Notice of Allowance mailed on Jan. 15, 2020, issued in connection with U.S. Appl. No. 16/439,009, filed Jun. 12, 2019, 9 pages.
Notice of Allowance mailed on Jun. 15, 2023, issued in connection with U.S. Appl. No. 17/305,698, filed Jul. 13, 2021, 8 pages.
Notice of Allowance mailed on Jun. 15, 2023, issued in connection with U.S. Appl. No. 17/305,920, filed Jul. 16, 2021, 8 pages.
Notice of Allowance mailed on Mar. 15, 2019, issued in connection with U.S. Appl. No. 15/804,776, filed Nov. 6, 2017, 9 pages.
Notice of Allowance mailed on Oct. 15, 2019, issued in connection with U.S. Appl. No. 16/437,437, filed Jun. 11, 2019, 9 pages.
Notice of Allowance mailed on Oct. 15, 2020, issued in connection with U.S. Appl. No. 16/715,713, filed Dec. 16, 2019, 9 pages.
Notice of Allowance mailed on Oct. 15, 2021, issued in connection with U.S. Appl. No. 16/213,570, filed Dec. 7, 2018, 8 pages.
Notice of Allowance mailed on Sep. 15, 2021, issued in connection with U.S. Appl. No. 16/685,135, filed Nov. 15, 2019, 10 pages.
Notice of Allowance mailed on Sep. 15, 2022, issued in connection with U.S. Appl. No. 16/736,725 , filed Jan. 1, 2020, 11 pages.
Notice of Allowance mailed on Apr. 16, 2021, issued in connection with U.S. Appl. No. 16/798,967, filed Feb. 24, 2020, 16 pages.
Notice of Allowance mailed on Aug. 16, 2017, issued in connection with U.S. Appl. No. 15/098,892, filed Apr. 14, 2016, 9 pages.
Notice of Allowance mailed on Aug. 16, 2023, issued in connection with U.S. Appl. No. 17/536,572, filed Nov. 29, 2021, 7 pages.
Notice of Allowance mailed on Apr. 17, 2024, issued in connection with U.S. Appl. No. 18/088,976, filed Dec. 27, 2022, 7 pages.
Notice of Allowance mailed on Apr. 17, 2024, issued in connection with U.S. Appl. No. 18/471,693, filed Sep. 21, 2023, 12 pages.
Notice of Allowance mailed on Aug. 17, 2017, issued in connection with U.S. Appl. No. 15/131,244, filed Apr. 18, 2016, 9 pages.
Notice of Allowance mailed on Aug. 17, 2022, issued in connection with U.S. Appl. No. 17/135,347, filed Dec. 28, 2020, 14 pages.
Notice of Allowance mailed on Feb. 17, 2021, issued in connection with U.S. Appl. No. 16/715,984, filed Dec. 16, 2019, 8 pages.
Notice of Allowance mailed on Jul. 17, 2019, issued in connection with U.S. Appl. No. 15/718,911, filed Sep. 28, 2017, 5 pages.
Notice of Allowance mailed on Jun. 17, 2020, issued in connection with U.S. Appl. No. 16/141,875, filed Sep. 25, 2018, 6 pages.
Notice of Allowance mailed on Nov. 17, 2022, issued in connection with U.S. Appl. No. 17/486,222, filed Sep. 27, 2021, 10 pages.
Notice of Allowance mailed on Sep. 17, 2018, issued in connection with U.S. Appl. No. 15/211,689, filed Jul. 15, 2016, 6 pages.
Notice of Allowance mailed on Apr. 18, 2019, issued in connection with U.S. Appl. No. 16/173,797, filed Oct. 29, 2018, 9 pages.
Notice of Allowance mailed on Dec. 18, 2019, issued in connection with U.S. Appl. No. 16/434,426, filed Jun. 7, 2019, 13 pages.
Notice of Allowance mailed on Feb. 18, 2020, issued in connection with U.S. Appl. No. 16/022,662, filed Jun. 28, 2018, 8 pages.
Notice of Allowance mailed on Jul. 18, 2019, issued in connection with U.S. Appl. No. 15/438,749, filed Feb. 21, 2017, 9 pages.
Advisory Action mailed on Nov. 7, 2022, issued in connection with U.S. Appl. No. 16/168,389, filed Oct. 23, 2018, 4 pages.
Advisory Action mailed on Jun. 10, 2020, issued in connection with U.S. Appl. No. 15/936,177, filed Mar. 26, 2018, 4 pages.
Advisory Action mailed on Aug. 13, 2021, issued in connection with U.S. Appl. No. 16/271,550, filed Feb. 8, 2019, 4 pages.
Advisory Action mailed on Dec. 13, 2023, issued in connection with U.S. Appl. No. 18/048,034, filed Oct. 20, 2022, 4 pages.
Advisory Action mailed on Apr. 23, 2021, issued in connection with U.S. Appl. No. 16/219,702, filed Dec. 13, 2018, 3 pages.

(56) References Cited

OTHER PUBLICATIONS

Advisory Action mailed on Apr. 24, 2020, issued in connection with U.S. Appl. No. 15/948,541, filed Apr. 9, 2018, 4 pages.
Advisory Action mailed on Feb. 26, 2024, issued in connection with U.S. Appl. No. 17/532,744, filed Nov. 22, 2021, 4 pages.
Advisory Action mailed on Feb. 28, 2022, issued in connection with U.S. Appl. No. 16/813,643, filed Mar. 9, 2020, 3 pages.
Advisory Action mailed on Jun. 28, 2018, issued in connection with U.S. Appl. No. 15/438,744, filed Feb. 21, 2017, 3 pages.
Advisory Action mailed on Dec. 31, 2018, issued in connection with U.S. Appl. No. 15/804,776, filed Nov. 6, 2017, 4 pages.
Advisory Action mailed on Sep. 8, 2021, issued in connection with U.S. Appl. No. 16/168,389, filed Oct. 23, 2018, 4 pages.
Advisory Action mailed on Jun. 9, 2020, issued in connection with U.S. Appl. No. 16/145,275, filed Sep. 28, 2018, 3 pages.
Andra et al. Contextual Keyword Spotting in Lecture Video With Deep Convolutional Neural Network. 2017 International Conference on Advanced Computer Science and Information Systems, IEEE, Oct. 28, 2017, 6 pages.
Anonymous,. S Voice or Google Now—The Lowdown. Apr. 28, 2015, 9 pages. [online], [retrieved on Nov. 29, 2017]. Retrieved from the Internet (URL: http://web.archive.org/web/20160807040123/http://lowdown.carphonewarehouse.com/news/s-voice-or-google-now/29958/).
Anonymous: "What are the function of 4 Microphones on iPhone 6S/6S+?", ETrade Supply, Dec. 24, 2015, XP055646381, Retrieved from the Internet: URL:https://www.etradesupply.com/blog/4-microphones-iphone-6s6s-for/ [retrieved on Nov. 26, 2019].
Audhkhasi Kartik et al. End-to-end ASR-free keyword search from speech. 2017 IEEE International Conference on Acoustics, Speech and Signal Processing, Mar. 5, 2017, 7 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Australian Patent Office, Australian Examination Report Action mailed on Nov. 10, 2022, issued in connection with Australian Application No. 2018312989, 2 pages.
Australian Patent Office, Australian Examination Report Action mailed on Jul. 11, 2023, issued in connection with Australian Application No. 2022246446, 2 pages.
Australian Patent Office, Australian Examination Report Action mailed on Apr. 14, 2020, issued in connection with Australian Application No. 2019202257, 3 pages.
Australian Patent Office, Australian Examination Report Action mailed on Jun. 14, 2023, issued in connection with Australian Application No. 2019299865, 2 pages.
Australian Patent Office, Australian Examination Report Action mailed on May 19, 2022, issued in connection with Australian Application No. 2021212112, 2 pages.
Australian Patent Office, Australian Examination Report Action mailed on Sep. 25, 2023, issued in connection with Australian Application No. 2018338812, 3 pages.
Australian Patent Office, Australian Examination Report Action mailed on Sep. 28, 2022, issued in connection with Australian Application No. 2018338812, 3 pages.
Australian Patent Office, Australian Examination Report Action mailed on Oct. 3, 2019, issued in connection with Australian Application No. 2018230932, 3 pages.
Australian Patent Office, Australian Examination Report Action mailed on Oct. 31, 2023, issued in connection with Australian Application No. 2023203687, 2 pages.
Australian Patent Office, Australian Examination Report Action mailed on Mar. 4, 2022, issued in connection with Australian Application No. 2021202786, 2 pages.
Australian Patent Office, Australian Examination Report Action mailed on Apr. 7, 2021, issued in connection with Australian Application No. 2019333058, 2 pages.
Australian Patent Office, Australian Examination Report Action mailed on Aug. 7, 2020, issued in connection with Australian Application No. 2019236722, 4 pages.
Australian Patent Office, Examination Report mailed on Jun. 28, 2021, issued in connection with Australian Patent Application No. 2019395022, 2 pages.
Australian Patent Office, Examination Report mailed on Oct. 30, 2018, issued in connection with Australian Application No. 2017222436, 3 pages.
"Automatic Parameter Tying in Neural Networks" ICLR 2018, 14 pages.
Bertrand et al. "Adaptive Distributed Noise Reduction for Speech Enhancement in Wireless Acoustic Sensor Networks" Jan. 2010, 4 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Canadian Patent Office, Canadian Examination Report mailed on Dec. 1, 2021, issued in connection with Canadian Application No. 3096442, 4 pages.
Canadian Patent Office, Canadian Examination Report mailed on Oct. 12, 2023, issued in connection with Canadian Application No. 3084279, 4 pages.
Canadian Patent Office, Canadian Examination Report mailed on Sep. 14, 2022, issued in connection with Canadian Application No. 3067776, 4 pages.
Canadian Patent Office, Canadian Examination Report mailed on Dec. 19, 2023, issued in connection with Canadian Application No. 3067776, 3 pages.
Canadian Patent Office, Canadian Examination Report mailed on Oct. 19, 2022, issued in connection with Canadian Application No. 3123601, 5 pages.
Canadian Patent Office, Canadian Examination Report mailed on Nov. 2, 2021, issued in connection with Canadian Application No. 3067776, 4 pages.
Canadian Patent Office, Canadian Examination Report mailed on Oct. 26, 2021, issued in connection with Canadian Application No. 3072492, 3 pages.
Canadian Patent Office, Canadian Examination Report mailed on Apr. 29, 2024, issued in connection with Canadian Application No. 3164558, 4 pages.
Canadian Patent Office, Canadian Examination Report mailed on Mar. 29, 2022, issued in connection with Canadian Application No. 3111322, 3 pages.
Canadian Patent Office, Canadian Examination Report mailed on Jan. 3, 2024, issued in connection with Canadian Application No. 3123601, 3 pages.
Canadian Patent Office, Canadian Examination Report mailed on Jun. 7, 2022, issued in connection with Canadian Application No. 3105494, 5 pages.
Canadian Patent Office, Canadian Examination Report mailed on May 8, 2024, issued in connection with Canadian Application No. 3146914, 5 pages.
Canadian Patent Office, Canadian Examination Report mailed on Mar. 9, 2021, issued in connection with Canadian Application No. 3067776, 5 pages.
European Patent Office, Summons to Attend Oral Proceedings mailed on Feb. 4, 2022, issued in connection with European Application No. 17757075.1, 10 pages.
European Patent Office, Summons to Attend Oral Proceedings mailed on Dec. 9, 2021, issued in connection with European Application No. 17200837.7, 10 pages.
Fadilpasic, "Cortana can now be the default PDA on your Android", IT Pro Portal: Accessed via WayBack Machine; http://web.archive.org/web/20171129124915/https://www.itproportal.com/2015/08/11/cortana-can-now-be- . . . , Aug. 11, 2015, 6 pages.
Final Office Action mailed Jul. 23, 2021, issued in connection with U.S. Appl. No. 16/439,046, filed Jun. 12, 2019, 12 pages.
Final Office Action mailed on Oct. 6, 2017, issued in connection with U.S. Appl. No. 15/098,760, filed Apr. 14, 2016, 25 pages.
Final Office Action mailed on Jun. 1, 2022, issued in connection with U.S. Appl. No. 16/806,747, filed Mar. 2, 2020, 20 pages.
Final Office Action mailed on Feb. 10, 2021, issued in connection with U.S. Appl. No. 16/219,702, filed Dec. 13, 2018, 9 pages.

(56) References Cited

OTHER PUBLICATIONS

Final Office Action mailed on Feb. 10, 2021, issued in connection with U.S. Appl. No. 16/402,617, filed May 3, 2019, 13 pages.
Final Office Action mailed on Nov. 10, 2020, issued in connection with U.S. Appl. No. 16/600,644, filed Oct. 14, 2019, 19 pages.
Final Office Action mailed on Apr. 11, 2019, issued in connection with U.S. Appl. No. 15/131,254, filed Apr. 18, 2016, 17 pages.
Final Office Action mailed on Aug. 11, 2017, issued in connection with U.S. Appl. No. 15/131,776, filed Apr. 18, 2016, 7 pages.
Final Office Action mailed on Dec. 11, 2019, issued in connection with U.S. Appl. No. 16/227,308, filed Dec. 20, 2018, 10 pages.
Final Office Action mailed on Sep. 11, 2019, issued in connection with U.S. Appl. No. 16/178,122, filed Nov. 1, 2018, 13 pages.
Final Office Action mailed on Apr. 13, 2018, issued in connection with U.S. Appl. No. 15/131,254, filed Apr. 18, 2016, 18 pages.
Final Office Action mailed on Apr. 13, 2018, issued in connection with U.S. Appl. No. 15/438,744, filed Feb. 21, 2017, 20 pages.
Final Office Action mailed on May 13, 2020, issued in connection with U.S. Appl. No. 16/153,530, filed Oct. 5, 2018, 20 pages.
Final Office Action mailed on Jul. 15, 2021, issued in connection with U.S. Appl. No. 16/153,530, filed Oct. 5, 2018, 22 pages.
Final Office Action mailed on Jun. 15, 2017, issued in connection with U.S. Appl. No. 15/098,718, filed Apr. 14, 2016, 15 pages.
Final Office Action mailed on Jun. 15, 2021, issued in connection with U.S. Appl. No. 16/819,755, filed Mar. 16, 2020, 12 pages.
Final Office Action mailed on Oct. 15, 2018, issued in connection with U.S. Appl. No. 15/804,776, filed Nov. 6, 2017, 18 pages.
Final Office Action mailed on Oct. 15, 2020, issued in connection with U.S. Appl. No. 16/109,375, filed Aug. 22, 2018, 9 pages.
Final Office Action mailed on Oct. 16, 2018, issued in connection with U.S. Appl. No. 15/438,725, filed Feb. 21, 2017, 10 pages.
Final Office Action mailed on Aug. 17, 2022, issued in connection with U.S. Appl. No. 16/179,779, filed Nov. 2, 2018, 26 pages.
Final Office Action mailed on Dec. 17, 2021, issued in connection with U.S. Appl. No. 16/813,643, filed Mar. 9, 2020, 12 pages.
Final Office Action mailed on May 17, 2023, issued in connection with U.S. Appl. No. 16/168,389, filed Oct. 23, 2018, 44 pages.
Final Office Action mailed on May 18, 2020, issued in connection with U.S. Appl. No. 16/177,185, filed Oct. 31, 2018, 16 pages.
Final Office Action mailed on Feb. 21, 2018, issued in connection with U.S. Appl. No. 15/297,627, filed Oct. 19, 2016, 12 pages.
Final Office Action mailed on Mar. 21, 2022, issued in connection with U.S. Appl. No. 16/153,530, filed Oct. 5, 2018, 23 pages.
Final Office Action mailed on May 21, 2020, issued in connection with U.S. Appl. No. 15/989,715, filed May 25, 2018, 21 pages.
Final Office Action mailed on Aug. 22, 2022, issued in connection with U.S. Appl. No. 16/168,389, filed Oct. 23, 2018, 37 pages.
Final Office Action mailed on Aug. 22, 2023, issued in connection with U.S. Appl. No. 18/061,570, filed Dec. 5, 2022, 12 pages.
Final Office Action mailed on Feb. 22, 2021, issued in connection with U.S. Appl. No. 15/936,177, filed Mar. 26, 2018, 20 pages.
Final Office Action mailed on Feb. 22, 2021, issued in connection with U.S. Appl. No. 16/213,570, filed Dec. 7, 2018, 12 pages.
Final Office Action mailed on Jun. 22, 2020, issued in connection with U.S. Appl. No. 16/179,779, filed Nov. 2, 2018, 16 pages.
Final Office Action mailed on Mar. 23, 2020, issued in connection with U.S. Appl. No. 16/145,275, filed Sep. 28, 2018, 11 pages.
Final Office Action mailed on Feb. 24, 2020, issued in connection with U.S. Appl. No. 15/936,177, filed Mar. 26, 2018, 20 pages.
Final Office Action mailed on Aug. 25, 2023, issued in connection with U.S. Appl. No. 16/989,350, filed Aug. 10, 2020, 21 pages.
Final Office Action mailed on Apr. 26, 2019, issued in connection with U.S. Appl. No. 15/721,141, filed Sep. 29, 2017, 20 pages.
Final Office Action mailed on Feb. 27, 2024, issued in connection with U.S. Appl. No. 17/340,590, filed Jun. 7, 2021, 28 pages.
Final Office Action mailed on Jul. 27, 2022, issued in connection with U.S. Appl. No. 16/989,350, filed Aug. 10, 2020, 15 pages.
Final Office Action mailed on Sep. 27, 2023, issued in connection with U.S. Appl. No. 18/048,034, filed Oct. 20, 2022, 9 pages.
Final Office Action mailed on Mar. 29, 2023, issued in connection with U.S. Appl. No. 17/549,034, filed Dec. 13, 2021, 21 pages.
Final Office Action mailed on Nov. 29, 2021, issued in connection with U.S. Appl. No. 17/236,559, filed Apr. 21, 2021, 11 pages.
Final Office Action mailed on Apr. 30, 2019, issued in connection with U.S. Appl. No. 15/098,760, filed Apr. 14, 2016, 6 pages.
Final Office Action mailed on Jun. 4, 2021, issued in connection with U.S. Appl. No. 16/168,389, filed Oct. 23, 2018, 38 pages.
Final Office Action mailed on Oct. 4, 2021, issued in connection with U.S. Appl. No. 16/806,747, filed Mar. 2, 2020, 17 pages.
Final Office Action mailed on Feb. 5, 2019, issued in connection with U.S. Appl. No. 15/438,749, filed Feb. 21, 2017, 17 pages.
Final Office Action mailed on Oct. 6, 2023, issued in connection with U.S. Appl. No. 17/532,744, filed Nov. 22, 2021, 21 pages.
Final Office Action mailed on Feb. 7, 2020, issued in connection with U.S. Appl. No. 15/948,541, filed Apr. 9, 2018, 8 pages.
Final Office Action mailed on Jun. 7, 2022, issued in connection with U.S. Appl. No. 16/736,725, filed Jan. 7, 2020, 14 pages.
Final Office Action mailed on Jun. 8, 2021, issued in connection with U.S. Appl. No. 16/271,550, filed Feb. 8, 2019, 41 pages.
Final Office Action mailed on Sep. 8, 2020, issued in connection with U.S. Appl. No. 16/213,570, filed Dec. 7, 2018, 12 pages.
Final Office Action mailed on Aug. 9, 2023, issued in connection with U.S. Appl. No. 17/493,430, filed Oct. 4, 2021, 19 pages.
Fiorenza Arisio et al. "Deliverable 1.1 User Study, analysis of requirements and definition of the application task," May 31, 2012, http://dirha.fbk.eu/sites/dirha.fbk.eu/files/docs/DIRHA_D1.1., 31 pages.
First Action Interview Office Action mailed on Mar. 8, 2021, issued in connection with U.S. Appl. No. 16/798,967, filed Feb. 24, 2020, 4 pages.
First Action Interview Office Action mailed on Aug. 14, 2019, issued in connection with U.S. Appl. No. 16/227,308, filed Dec. 20, 2018, 4 pages.
First Action Interview Office Action mailed on Jun. 15, 2020, issued in connection with U.S. Appl. No. 16/213,570, filed Dec. 7, 2018, 4 pages.
First Action Interview Office Action mailed on Jun. 2, 2020, issued in connection with U.S. Appl. No. 16/109,375, filed Aug. 22, 2018, 10 pages.
First Action Interview Office Action mailed on Jan. 22, 2020, issued in connection with U.S. Appl. No. 15/989,715, filed May 25, 2018, 3 pages.
First Action Interview Office Action mailed on Jul. 5, 2019, issued in connection with U.S. Appl. No. 16/227,308, filed Dec. 20, 2018, 4 pages.
Freiberger, Karl, "Development and Evaluation of Source Localization Algorithms for Coincident Microphone Arrays," Diploma Thesis, Apr. 1, 2010, 106 pages.
Giacobello et al. "A Sparse Nonuniformly Partitioned Multidelay Filter for Acoustic Echo Cancellation," 2013, IEEE Workshop on Applications of Signal Processing to Audio and Acoustics, Oct. 2013, New Paltz, NY, 4 pages.
Giacobello et al. "Tuning Methodology for Speech Enhancement Algorithms using a Simulated Conversational Database and Perceptual Objective Measures," 2014, 4th Joint Workshop on Hands-free Speech Communication and Microphone Arrays HSCMA, 2014, 5 pages.
*Google LLC* v. *Sonos, Inc.*, International Trade Commission Case No. 337-TA-1330, Order No. 25: Regarding Respondent Sonos, Inc.'s Omnibus Motion for Summary Determination; dated May 16, 2023, 7 pages.
*Google LLC* v. *Sonos, Inc.*, International Trade Commission Case No. 337-TA-1330, Order No. 28: Regarding Respondent Sonos, Inc.'s Omnibus Motion for Summary Determination; dated May 22, 2023, 3 pages.
*Google LLC* v. *Sonos, Inc.*, International Trade Commission Case No. 337-TA-1330, Order No. 37: Regarding Complainant Google LLC's Motions in Limine; dated Jul. 7, 2023, 10 pages.
*Google LLC* v. *Sonos, Inc.*, International Trade Commission Case No. 337-TA-1330, Respondent Sonos, Inc.'s Motion in Limine No. 4. Motion to Exclude Untimely Validity Arguments Regarding Claim 11 of U.S. Pat. No. 11,024,311; dated Jun. 13, 2023, 34 pages.

(56) References Cited

OTHER PUBLICATIONS

*Google LLC* v. *Sonos, Inc.*, International Trade Commission Case No. 337-TA-1330, Respondent Sonos, Inc.'s Response to Google's Motion in Limine No. 3 Preclude Sonos from Presenting Evidence or Argument that Claim 3 of the '748 Patent is Indefinite for Lack of Antecedent Basis; dated Jun. 12, 2023, 26 pages.
Han et al. "Deep Compression: Compressing Deep Neural Networks with Pruning, Trained Quantization and Huffman Coding." ICLR 2016, Feb. 15, 2016, 14 pages.
Hans Speidel: "Chatbot Training: How to use training data to provide fully automated customer support", Jun. 29, 2017, pp. 1-3, XP055473185, Retrieved from the Internet: URL:https://www.crowdguru.de/wp-content/uploads/Case-Study-Chatbot-training-How-to-use•training-data-to-provide-fully-automated-customer-support.pdf [retrieved on May 7, 2018].
Helwani et al "Source-domain adaptive filtering for MIMO systems with application to acoustic echo cancellation", Acoustics Speech and Signal Processing, 2010 IEEE International Conference, Mar. 14, 2010, 4 pages.
Helwani et al. Source-domain adaptive filtering for MIMO systems with application to acoustic echo cancellation. In 2010 IEEE International Conference on Acoustics, Speech and Signal Processing, Jun. 28, 2010, 4 pages. [retrieved on Feb. 23, 2023], Retrieved from the Internet: URL: https://scholar.google.com/scholar?hl=en&as_sdt=0%2C14&q=SOURCE-DOMAIN+ADAPTIVE+FILTERING+FOR+MIMO+SYSTEMS+WITH+APPLICATION+TO+ACOUSTIC+ECHO+CANCELLATION&btnG=.
Hirano et al. "A Noise-Robust Stochastic Gradient Algorithm with an Adaptive Step-Size Suitable for Mobile Hands-Free Telephones," 1995, International Conference on Acoustics, Speech, and Signal Processing, vol. 2, 4 pages.
Indian Patent Office, Examination Report mailed on May 24, 2021, issued in connection with Indian Patent Application No. 201847035595, 6 pages.
Indian Patent Office, Examination Report mailed on Feb. 25, 2021, issued in connection with Indian Patent Application No. 201847035625, 6 pages.
Indian Patent Office, Examination Report mailed on Feb. 28, 2024, issued in connection with Indian Patent Application No. 201847035625, 3 pages.
Indian Patent Office, Examination Report mailed on Dec. 5, 2023, issued in connection with Indian Patent Application No. 201847035625, 3 pages.
International Bureau, International Preliminary Report on Patentability and Written Opinion, mailed on Apr. 1, 2021, issued in connection with International Application No. PCT/US2019/052129, filed on Sep. 20, 2019, 13 pages.
International Bureau, International Preliminary Report on Patentability and Written Opinion, mailed on Jul. 1, 2021, issued in connection with International Application No. PCT/US2019/067576, filed on Dec. 19, 2019, 8 pages.
International Bureau, International Preliminary Report on Patentability and Written Opinion, mailed on Aug. 10, 2021, issued in connection with International Application No. PCT/US2020/017150, filed on Feb. 7, 2020, 20 pages.
International Bureau, International Preliminary Report on Patentability and Written Opinion, mailed on Dec. 10, 2020, issued in connection with International Application No. PCT/US2019/033945, filed on May 25, 2018, 7 pages.
International Bureau, International Preliminary Report on Patentability and Written Opinion, mailed on Mar. 10, 2020, issued in connection with International Application No. PCT/US2018/050050, filed on Sep. 7, 2018, 7 pages.
International Bureau, International Preliminary Report on Patentability and Written Opinion, mailed on Apr. 15, 2021, issued in connection with International Application No. PCT/US2019/054332, filed on Oct. 2, 2019, 9 pages.
International Bureau, International Preliminary Report on Patentability and Written Opinion, mailed on Jan. 15, 2019, issued in connection with International Application No. PCT/US2017/042170, filed on Jul. 14, 2017, 7 pages.
International Bureau, International Preliminary Report on Patentability and Written Opinion, mailed on Jan. 15, 2019, issued in connection with International Application No. PCT/US2017/042227, filed on Jul. 14, 2017, 7 pages.
International Bureau, International Preliminary Report on Patentability and Written Opinion, mailed on Mar. 25, 2021, issued in connection with International Application No. PCT/US2019/050852, filed on Sep. 12, 2019, 8 pages.
International Bureau, International Preliminary Report on Patentability and Written Opinion, mailed on Aug. 27, 2019, issued in connection with International Application No. PCT/US2018/019010, filed on Feb. 21, 2018, 9 pages.
International Bureau, International Preliminary Report on Patentability and Written Opinion, mailed on Mar. 31, 2020, issued in connection with International Application No. PCT/US2018/053517, filed on Sep. 28, 2018, 10 pages.
International Bureau, International Preliminary Report on Patentability and Written Opinion, mailed on Feb. 5, 2019, issued in connection with International Application No. PCT/US2017/045521, filed on Aug. 4, 2017, 7 pages.
International Bureau, International Preliminary Report on Patentability and Written Opinion, mailed on Feb. 5, 2019, issued in connection with International Application No. PCT/US2017/045551, filed on Aug. 4, 2017, 9 pages.
International Bureau, International Preliminary Report on Patentability and Written Opinion, mailed on Jan. 7, 2021, issued in connection with International Application No. PCT/US2019/039828, filed on Jun. 28, 2019, 11 pages.
International Bureau, International Preliminary Report on Patentability and Written Opinion, mailed on Apr. 8, 2021, issued in connection with International Application No. PCT/US2019/052654, filed on Sep. 24, 2019, 7 pages.
International Bureau, International Preliminary Report on Patentability and Written Opinion, mailed on Apr. 8, 2021, issued in connection with International Application No. PCT/US2019/052841, filed on Sep. 25, 2019, 8 pages.
International Bureau, International Preliminary Report on Patentability and Written Opinion, mailed on Apr. 8, 2021, issued in connection with International Application No. PCT/US2019/053253, filed on Sep. 26, 2019, 10 pages.
International Bureau, International Preliminary Report on Patentability, mailed on Apr. 11, 2019, issued in connection with International Application No. PCT/US2017/0054063, filed on Sep. 28, 2017, 9 pages.
International Bureau, International Preliminary Report on Patentability, mailed on Jun. 17, 2021, issued in connection with International Application No. PCT/US2019/064907, filed on Dec. 6, 2019, 8 pages.
International Bureau, International Preliminary Report on Patentability, mailed on Mar. 2, 2021, issued in connection with International Application No. PCT/US2019/048558, filed on Aug. 28, 2019, 8 pages.
International Bureau, International Preliminary Report on Patentability, mailed on Feb. 20, 2020, issued in connection with International Application No. PCT/US2018/045397, filed on Aug. 6, 2018, 8 pages.
International Bureau, International Preliminary Report on Patentability, mailed on Jul. 21, 2022, issued in connection with International Application No. PCT/US2021/070007, filed on Jan. 6, 2021, 8 pages.
International Bureau, International Preliminary Report on Patentability, mailed on Apr. 23, 2019, issued in connection with International Application No. PCT/US2017/057220, filed on Oct. 18, 2017, 7 pages.
Notice of Allowance mailed on Oct. 26, 2022, issued in connection with U.S. Appl. No. 17/486,574, filed Sep. 27, 2021, 11 pages.
Notice of Allowance mailed on Apr. 27, 2020, issued in connection with U.S. Appl. No. 16/700,607, filed Dec. 2, 2019, 10 pages.
Notice of Allowance mailed on Jun. 27, 2022, issued in connection with U.S. Appl. No. 16/812,758, filed Mar. 9, 2020, 16 pages.

(56) References Cited

OTHER PUBLICATIONS

Notice of Allowance mailed on Mar. 27, 2019, issued in connection with U.S. Appl. No. 16/214,666, filed Dec. 10, 2018, 6 pages.
Notice of Allowance mailed on Mar. 27, 2024, issued in connection with U.S. Appl. No. 18/061,570, filed Dec. 5, 2022, 8 pages.
Notice of Allowance mailed on Sep. 27, 2023, issued in connection with U.S. Appl. No. 17/656,794, filed Mar. 28, 2022, 11 pages.
Notice of Allowance mailed on Sep. 27, 2023, issued in connection with U.S. Appl. No. 18/048,945, filed Oct. 24, 2022, 9 pages.
Notice of Allowance mailed on Sep. 27, 2023, issued in connection with U.S. Appl. No. 18/061,243, filed Dec. 2, 2022, 8 pages.
Notice of Allowance mailed on Feb. 28, 2024, issued in connection with U.S. Appl. No. 16/989,350, filed Aug. 10, 2020, 9 pages.
Notice of Allowance mailed on Mar. 28, 2018, issued in connection with U.S. Appl. No. 15/699,982, filed Sep. 8, 2017, 17 pages.
Notice of Allowance mailed on Mar. 28, 2024, issued in connection with U.S. Appl. No. 18/316,400, filed May 12, 2023, 8 pages.
Notice of Allowance mailed on May 28, 2021, issued in connection with U.S. Appl. No. 16/524,306, filed Jul. 29, 2019, 9 pages.
Notice of Allowance mailed on Sep. 28, 2022, issued in connection with U.S. Appl. No. 17/444,043, filed Jul. 29, 2021, 17 pages.
Notice of Allowance mailed on Dec. 29, 2017, issued in connection with U.S. Appl. No. 15/131,776, filed Apr. 18, 2016, 13 pages.
Notice of Allowance mailed on Dec. 29, 2022, issued in connection with U.S. Appl. No. 17/327,911, filed May 24, 2021, 14 pages.
Notice of Allowance mailed on Jan. 29, 2021, issued in connection with U.S. Appl. No. 16/290,599, filed Mar. 1, 2019, 9 pages.
Notice of Allowance mailed on Jul. 29, 2022, issued in connection with U.S. Appl. No. 17/236,559, filed Apr. 21, 2021, 6 pages.
Notice of Allowance mailed on Jun. 29, 2020, issued in connection with U.S. Appl. No. 16/216,357, filed Dec. 11, 2018, 8 pages.
Notice of Allowance mailed on Mar. 29, 2021, issued in connection with U.S. Appl. No. 16/600,949, filed Oct. 14, 2019, 9 pages.
Notice of Allowance mailed on Mar. 29, 2023, issued in connection with U.S. Appl. No. 17/722,438, filed Apr. 18, 2022, 7 pages.
Notice of Allowance mailed on May 29, 2020, issued in connection with U.S. Appl. No. 16/148,879, filed Oct. 1, 2018, 6 pages.
Notice of Allowance mailed on Sep. 29, 2021, issued in connection with U.S. Appl. No. 16/876,493, filed May 18, 2020, 5 pages.
Notice of Allowance mailed on Sep. 29, 2023, issued in connection with U.S. Appl. No. 16/168,389, filed Oct. 23, 2018, 11 pages.
Notice of Allowance mailed on Apr. 3, 2019, issued in connection with U.S. Appl. No. 16/160,107, filed Oct. 15, 2018, 7 pages.
Notice of Allowance mailed on Jun. 3, 2021, issued in connection with U.S. Appl. No. 16/876,493, filed May 18, 2020, 7 pages.
Notice of Allowance mailed on Mar. 3, 2022, issued in connection with U.S. Appl. No. 16/679,538, filed Nov. 11, 2019, 7 pages.
Notice of Allowance mailed on May 3, 2024, issued in connection with U.S. Appl. No. 18/331,580, filed Jun. 8, 2023, 7 pages.
Notice of Allowance mailed on Jul. 30, 2018, issued in connection with U.S. Appl. No. 15/098,718, filed Apr. 14, 2016, 5 pages.
Notice of Allowance mailed on Jul. 30, 2019, issued in connection with U.S. Appl. No. 15/131,254, filed Apr. 18, 2016, 9 pages.
Notice of Allowance mailed on Jun. 30, 2023, issued in connection with U.S. Appl. No. 17/303,001, filed May 18, 2021, 8 pages.
Notice of Allowance mailed on Mar. 30, 2020, issued in connection with U.S. Appl. No. 15/973,413, filed May 7, 2018, 5 pages.
Notice of Allowance mailed on Mar. 30, 2023, issued in connection with U.S. Appl. No. 17/303,066, filed May 19, 2021, 7 pages.
Notice of Allowance mailed on Nov. 30, 2018, issued in connection with U.S. Appl. No. 15/438,725, filed Feb. 21, 2017, 5 pages.
Notice of Allowance mailed on Oct. 30, 2019, issued in connection with U.S. Appl. No. 16/131,392, filed Sep. 14, 2018, 9 pages.
Notice of Allowance mailed on Oct. 30, 2020, issued in connection with U.S. Appl. No. 16/528,016, filed Jul. 31, 2019, 10 pages.
Notice of Allowance mailed on Aug. 31, 2023, issued in connection with U.S. Appl. No. 18/145,520, filed Dec. 22, 2022, 2 pages.
Notice of Allowance mailed on Mar. 31, 2023, issued in connection with U.S. Appl. No. 17/303,735, filed Jun. 7, 2021, 19 pages.
Notice of Allowance mailed on May 31, 2019, issued in connection with U.S. Appl. No. 15/717,621, filed Sep. 27, 2017, 9 pages.
Notice of Allowance mailed on Aug. 4, 2023, issued in connection with U.S. Appl. No. 18/145,520, filed Dec. 22, 2022, 10 pages.
Notice of Allowance mailed on Jun. 4, 2021, issued in connection with U.S. Appl. No. 16/528,265, filed Jul. 31, 2019, 17 pages.
Notice of Allowance mailed on Mar. 4, 2020, issued in connection with U.S. Appl. No. 16/444,975, filed Jun. 18, 2019, 10 pages.
Notice of Allowance mailed on Apr. 5, 2023, issued in connection with U.S. Appl. No. 17/549,253, filed Dec. 13, 2021, 10 pages.
Notice of Allowance mailed on Feb. 5, 2020, issued in connection with U.S. Appl. No. 16/178,122, filed Nov. 1, 2018, 9 pages.
Notice of Allowance mailed on Oct. 5, 2018, issued in connection with U.S. Appl. No. 15/211,748, filed Jul. 15, 2018, 10 pages.
Notice of Allowance mailed on Feb. 6, 2019, issued in connection with U.S. Appl. No. 16/102,153, filed Aug. 13, 2018, 9 pages.
Notice of Allowance mailed on Feb. 6, 2020, issued in connection with U.S. Appl. No. 16/227,308, filed Dec. 20, 2018, 7 pages.
Notice of Allowance mailed on Mar. 6, 2023, issued in connection with U.S. Appl. No. 17/449,926, filed Oct. 4, 2021, 8 pages.
Notice of Allowance mailed on Apr. 7, 2020, issued in connection with U.S. Appl. No. 15/098,760, filed Apr. 14, 2016, 7 pages.
Notice of Allowance mailed on Apr. 7, 2020, issued in connection with U.S. Appl. No. 16/147,710, filed Sep. 29, 2018, 15 pages.
Notice of Allowance mailed on Jun. 7, 2019, issued in connection with U.S. Appl. No. 16/102,153, filed Aug. 13, 2018, 9 pages.
Notice of Allowance mailed on Jul. 18, 2019, issued in connection with U.S. Appl. No. 15/721,141, filed Sep. 29, 2017, 8 pages.
Notice of Allowance mailed on Jul. 18, 2022, issued in connection with U.S. Appl. No. 17/222,151, filed Apr. 5, 2021, 5 pages.
Notice of Allowance mailed on Mar. 18, 2021, issued in connection with U.S. Appl. No. 16/177,185, filed Oct. 31, 2018, 8 pages.
Notice of Allowance mailed on Aug. 19, 2020, issued in connection with U.S. Appl. No. 16/271,560, filed Feb. 8, 2019, 9 pages.
Notice of Allowance mailed on Dec. 19, 2018, issued in connection with U.S. Appl. No. 15/818,051, filed Nov. 20, 2017, 9 pages.
Notice of Allowance mailed on Jul. 19, 2018, issued in connection with U.S. Appl. No. 15/681,937, filed Aug. 21, 2017, 7 pages.
Notice of Allowance mailed on Mar. 19, 2021, issued in connection with U.S. Appl. No. 17/157,686, filed Jan. 25, 2021, 11 pages.
Notice of Allowance mailed on Aug. 2, 2019, issued in connection with U.S. Appl. No. 16/102,650, filed Aug. 13, 2018, 5 pages.
Notice of Allowance mailed on Dec. 2, 2020, issued in connection with U.S. Appl. No. 15/989,715, filed May 25, 2018, 11 pages.
Notice of Allowance mailed on Dec. 2, 2021, issued in connection with U.S. Appl. No. 16/841,116, filed Apr. 6, 2020, 5 pages.
Notice of Allowance mailed on Oct. 2, 2023, issued in connection with U.S. Appl. No. 17/810,533, filed Jul. 1, 2022, 8 pages.
Notice of Allowance mailed on Sep. 2, 2020, issued in connection with U.S. Appl. No. 16/214,711, filed Dec. 10, 2018, 9 pages.
Notice of Allowance mailed on Dec. 20, 2022, issued in connection with U.S. Appl. No. 16/806,747, filed Mar. 2, 2020, 5 pages.
Notice of Allowance mailed on Jan. 20, 2023, issued in connection with U.S. Appl. No. 16/915,234, filed Jun. 29, 2020, 6 pages.
Notice of Allowance mailed on Jul. 20, 2020, issued in connection with U.S. Appl. No. 15/984,073, filed May 18, 2018, 12 pages.
Notice of Allowance mailed on Jun. 20, 2022, issued in connection with U.S. Appl. No. 16/947,895, filed Aug. 24, 2020, 7 pages.
Notice of Allowance mailed on Mar. 20, 2018, issued in connection with U.S. Appl. No. 15/784,952, filed Oct. 16, 2017, 7 pages.
Notice of Allowance mailed on Mar. 20, 2023, issued in connection with U.S. Appl. No. 17/562,412, filed Dec. 27, 2021, 9 pages.
Notice of Allowance mailed on Oct. 20, 2021, issued in connection with U.S. Appl. No. 16/439,032, filed Jun. 12, 2019, 8 pages.
Notice of Allowance mailed on Sep. 20, 2018, issued in connection with U.S. Appl. No. 15/946,599, filed Apr. 5, 2018, 7 pages.
Notice of Allowance mailed on Apr. 21, 2021, issued in connection with U.S. Appl. No. 16/145,275, filed Sep. 28, 2018, 8 pages.
Notice of Allowance mailed on Aug. 21, 2023, issued in connection with U.S. Appl. No. 17/548,921, filed Dec. 13, 2021, 10 pages.
Notice of Allowance mailed on Dec. 21, 2021, issued in connection with U.S. Appl. No. 16/271,550, filed Feb. 8, 2019, 11 pages.

(56) References Cited

OTHER PUBLICATIONS

Notice of Allowance mailed on Feb. 21, 2020, issued in connection with U.S. Appl. No. 16/416,752, filed May 20, 2019, 6 pages.
Notice of Allowance mailed on Jan. 21, 2020, issued in connection with U.S. Appl. No. 16/672,764, filed Nov. 4, 2019, 10 pages.
Notice of Allowance mailed on Jan. 21, 2021, issued in connection with U.S. Appl. No. 16/600,644, filed Oct. 14, 2019, 7 pages.
Notice of Allowance mailed on Jul. 21, 2023, issued in connection with U.S. Appl. No. 17/986,241, filed Nov. 14, 2022, 12 pages.
Notice of Allowance mailed on Mar. 21, 2023, issued in connection with U.S. Appl. No. 17/353,254, filed Jun. 21, 2021, 8 pages.
Notice of Allowance mailed on Nov. 21, 2022, issued in connection with U.S. Appl. No. 17/454,676, filed Nov. 12, 2021, 8 pages.
Notice of Allowance mailed on Oct. 21, 2019, issued in connection with U.S. Appl. No. 15/946,585, filed Apr. 5, 2018, 5 pages.
Notice of Allowance mailed on Sep. 21, 2022, issued in connection with U.S. Appl. No. 17/128,949, filed Dec. 21, 2020, 8 pages.
Notice of Allowance mailed on Aug. 22, 2017, issued in connection with U.S. Appl. No. 15/273,679, filed Sep. 22, 2016, 5 pages.
Notice of Allowance mailed on Jan. 22, 2018, issued in connection with U.S. Appl. No. 15/178,180, filed Jun. 9, 2016, 9 pages.
Notice of Allowance mailed on Jul. 22, 2020, issued in connection with U.S. Appl. No. 16/131,409, filed Sep. 14, 2018, 13 pages.
Notice of Allowance mailed on Jul. 22, 2020, issued in connection with U.S. Appl. No. 16/790,621, filed Feb. 13, 2020, 10 pages.
Notice of Allowance mailed on Nov. 22, 2021, issued in connection with U.S. Appl. No. 16/834,483, filed Mar. 30, 2020, 10 pages.
Notice of Allowance mailed on Sep. 22, 2022, issued in connection with U.S. Appl. No. 17/163,506, filed Jan. 31, 2021, 13 pages.
Notice of Allowance mailed on Sep. 22, 2022, issued in connection with U.S. Appl. No. 17/248,427, filed Jan. 25, 2021, 9 pages.
Notice of Allowance mailed on Aug. 23, 2021, issued in connection with U.S. Appl. No. 16/109,375, filed Aug. 22, 2018, 10 pages.
Notice of Allowance mailed on Feb. 23, 2023, issued in connection with U.S. Appl. No. 17/532,674, filed Nov. 22, 2021, 10 pages.
Notice of Allowance mailed on Jun. 23, 2021, issued in connection with U.S. Appl. No. 16/814,844, filed Mar. 10, 2020, 8 pages.
Notice of Allowance mailed on Apr. 24, 2019, issued in connection with U.S. Appl. No. 16/154,469, filed Oct. 8, 2018, 5 pages.
Notice of Allowance mailed on Mar. 24, 2022, issued in connection with U.S. Appl. No. 16/378,516, filed Apr. 8, 2019, 7 pages.
Notice of Allowance mailed on Nov. 24, 2023, issued in connection with U.S. Appl. No. 18/070,024, filed Nov. 28, 2022, 7 pages.
Notice of Allowance mailed on Oct. 25, 2021, issued in connection with U.S. Appl. No. 16/723,909, filed Dec. 20, 2019, 11 pages.
Notice of Allowance mailed on Apr. 26, 2022, issued in connection with U.S. Appl. No. 17/896,129, filed Aug. 26, 2022, 8 pages.
Notice of Allowance mailed on Apr. 26, 2023, issued in connection with U.S. Appl. No. 17/658,717, filed Apr. 11, 2022, 11 pages.
Notice of Allowance mailed on Aug. 26, 2020, issued in connection with U.S. Appl. No. 15/948,541, filed Apr. 9, 2018, 9 pages.
Notice of Allowance mailed on Aug. 26, 2022, issued in connection with U.S. Appl. No. 17/145,667, filed Jan. 11, 2021, 8 pages.
Notice of Allowance mailed on May 26, 2021, issued in connection with U.S. Appl. No. 16/927,670, filed Jul. 13, 2020, 10 pages.
Non-Final Office Action mailed on Feb. 9, 2021, issued in connection with U.S. Appl. No. 16/806,747, filed Mar. 2, 2020, 16 pages.
Non-Final Office Action mailed on May 9, 2018, issued in connection with U.S. Appl. No. 15/818,051, filed Nov. 20, 2017, 22 pages.
Non-Final Office Action mailed on Sep. 9, 2020, issued in connection with U.S. Appl. No. 16/168,389, filed Oct. 23, 2018, 29 pages.
Notice of Allowance mailed Aug. 10, 2021, issued in connection with U.S. Appl. No. 17/157,686, filed Jan. 25, 2021, 9 pages.
Notice of Allowance mailed Aug. 2, 2021, issued in connection with U.S. Appl. No. 16/660,197, filed Oct. 22, 2019, 7 pages.
Notice of Allowance mailed Mar. 31, 2021, issued in connection with U.S. Appl. No. 16/813,643, filed Mar. 9, 2020, 11 pages.
Notice of Allowance mailed Aug. 4, 2021, issued in connection with U.S. Appl. No. 16/780,483, filed Feb. 3, 2020, 5 pages.
Notice of Allowance mailed on Dec. 2, 2019, issued in connection with U.S. Appl. No. 15/718,521, filed Sep. 28, 2017, 15 pages.
Notice of Allowance mailed on Nov. 2, 2022, issued in connection with U.S. Appl. No. 16/989,805, filed Aug. 10, 2020, 5 pages.
Notice of Allowance mailed on Nov. 3, 2022, issued in connection with U.S. Appl. No. 17/448,015, filed Sep. 17, 2021, 7 pages.
Notice of Allowance mailed on Dec. 4, 2017, issued in connection with U.S. Appl. No. 15/277,810, filed Sep. 27, 2016, 5 pages.
Notice of Allowance mailed on Jul. 5, 2018, issued in connection with U.S. Appl. No. 15/237,133, filed Aug. 15, 2016, 5 pages.
Notice of Allowance mailed on Feb. 6, 2023, issued in connection with U.S. Appl. No. 17/077,974, filed Oct. 22, 2020, 7 pages.
Notice of Allowance mailed on Jan. 6, 2023, issued in connection with U.S. Appl. No. 17/896,129, filed Aug. 26, 2022, 13 pages.
Notice of Allowance mailed on Dec. 7, 2022, issued in connection with U.S. Appl. No. 17/315,599, filed May 10, 2021, 11 pages.
Notice of Allowance mailed on Feb. 8, 2023, issued in connection with U.S. Appl. No. 17/446,690, filed Sep. 1, 2021, 8 pages.
Notice of Allowance mailed on Jan. 9, 2023, issued in connection with U.S. Appl. No. 17/247,507, filed Dec. 14, 2020, 8 pages.
Notice of Allowance mailed on Jul. 9, 2018, issued in connection with U.S. Appl. No. 15/438,741, filed Feb. 21, 2017, 5 pages.
Notice of Allowance mailed on Jun. 9, 2023, issued in connection with U.S. Appl. No. 17/532,674, filed Nov. 22, 2021, 13 pages.
Notice of Allowance mailed on Mar. 9, 2023, issued in connection with U.S. Appl. No. 17/662,302, filed May 6, 2022, 7 pages.
Notice of Allowance mailed on Nov. 9, 2022, issued in connection with U.S. Appl. No. 17/385,542, filed Jul. 26, 2021, 8 pages.
Notice of Allowance mailed on Apr. 1, 2019, issued in connection with U.S. Appl. No. 15/935,966, filed Mar. 26, 2018, 5 pages.
Notice of Allowance mailed on Aug. 1, 2018, issued in connection with U.S. Appl. No. 15/297,627, filed Oct. 19, 2016, 9 pages.
Notice of Allowance mailed on Feb. 1, 2022, issued in connection with U.S. Appl. No. 16/439,046, filed Jun. 12, 2019, 9 pages.
Notice of Allowance mailed on Jun. 1, 2021, issued in connection with U.S. Appl. No. 16/219,702, filed Dec. 13, 2018, 8 pages.
Notice of Allowance mailed on Jun. 1, 2021, issued in connection with U.S. Appl. No. 16/685,135, filed Nov. 15, 2019, 10 pages.
Notice of Allowance mailed on Mar. 1, 2022, issued in connection with U.S. Appl. No. 16/879,549, filed May 20, 2020, 9 pages.
Notice of Allowance mailed on Sep. 1, 2021, issued in connection with U.S. Appl. No. 15/936,177, filed Mar. 26, 2018, 22 pages.
Notice of Allowance mailed on Aug. 10, 2020, issued in connection with U.S. Appl. No. 16/424,825, filed May 29, 2019, 9 pages.
Notice of Allowance mailed on Feb. 10, 2021, issued in connection with U.S. Appl. No. 16/138,111, filed Sep. 21, 2018, 8 pages.
Notice of Allowance mailed on Jul. 10, 2023, issued in connection with U.S. Appl. No. 17/315,599, filed May 10, 2021, 2 pages.
Notice of Allowance mailed on Jun. 10, 2022, issued in connection with U.S. Appl. No. 16/879,549, filed May 20, 2020, 8 pages.
Notice of Allowance mailed on Apr. 11, 2018, issued in connection with U.S. Appl. No. 15/719,454, filed Sep. 28, 2017, 15 pages.
Notice of Allowance mailed on Aug. 11, 2023, issued in connection with U.S. Appl. No. 17/878,649, filed Aug. 1, 2022, 7 pages.
Notice of Allowance mailed on May 11, 2022, issued in connection with U.S. Appl. No. 17/135,123, filed Dec. 28, 2020, 8 pages.
Notice of Allowance mailed on May 11, 2022, issued in connection with U.S. Appl. No. 17/145,667, filed Jan. 11, 2021, 7 pages.
Notice of Allowance mailed on May 11, 2023, issued in connection with U.S. Appl. No. 18/061,638, filed Dec. 5, 2022, 15 pages.
Notice of Allowance mailed on Oct. 11, 2019, issued in connection with U.S. Appl. No. 16/437,476, filed Jun. 11, 2019, 9 pages.
Notice of Allowance mailed on Sep. 11, 2019, issued in connection with U.S. Appl. No. 16/154,071, filed Oct. 8, 2018, 5 pages.
Notice of Allowance mailed on Aug. 12, 2021, issued in connection with U.S. Appl. No. 16/819,755, filed Mar. 16, 2020, 6 pages.
Notice of Allowance mailed on Dec. 12, 2018, issued in connection with U.S. Appl. No. 15/811,468, filed Nov. 13, 2017, 9 pages.
Notice of Allowance mailed on Jul. 12, 2017, issued in connection with U.S. Appl. No. 15/098,805, filed Apr. 14, 2016, 8 pages.
Notice of Allowance mailed on Jul. 12, 2022, issued in connection with U.S. Appl. No. 16/907,953, filed Jun. 22, 2020, 8 pages.

(56) References Cited

OTHER PUBLICATIONS

Notice of Allowance mailed on Jul. 12, 2022, issued in connection with U.S. Appl. No. 17/391,404, filed Aug. 2, 2021, 13 pages.
Notice of Allowance mailed on Jul. 12, 2023, issued in connection with U.S. Appl. No. 18/151,619, filed Jan. 9, 2023, 13 pages.
Notice of Allowance mailed on Jun. 12, 2019, issued in connection with U.S. Appl. No. 15/670,361, filed Aug. 7, 2017, 7 pages.
Notice of Allowance mailed on Jun. 12, 2023, issued in connection with U.S. Appl. No. 17/453,632, filed Nov. 4, 2021, 9 pages.
Notice of Allowance mailed on May 12, 2021, issued in connection with U.S. Appl. No. 16/402,617, filed May 3, 2019, 8 pages.
Notice of Allowance mailed on Sep. 12, 2018, issued in connection with U.S. Appl. No. 15/438,744, filed Feb. 21, 2017, 15 pages.
Wu et al. End-to-End Recurrent Entity Network for Entity-Value Independent Goal-Oriented Dialog Learning. DSTC6—Dialog System Technology Challenges, Dec. 10, 2017, 5 pages.
Wung et al. "Robust Acoustic Echo Cancellation in the Short-Time Fourier Transform Domain Using Adaptive Crossband Filters" IEEE International Conference on Acoustic, Speech and Signal Processing ICASSP, 2014, p. 1300-1304.
Xiao et al. "A Learning-Based Approach to Direction of Arrival Estimation in Noisy and Reverberant Environments," 2015 IEEE International Conference on Acoustics, Speech and Signal Processing, Apr. 19, 2015, 5 pages.
Xiaoguang et al. "Robust Small-Footprint Keyword Spotting Using Sequence-To-Sequence Model with Connectionist Temporal Classifier", 2019 IEEE, Sep. 28, 2019, 5 pages.
Xu et al. An End-to-end Approach for Handling Unknown Slot Values in Dialogue State Tracking. ARXIV.org, Cornell University Library, May 3, 2018, 10 pages.
Yamaha DME 64 Owner's Manual; copyright 2004, 80 pages.
Yamaha DME Designer 3.0 Owner's Manual; Copyright 2008, 501 pages.
Yamaha DME Designer 3.5 setup manual guide; copyright 2004, 16 pages.
Yamaha DME Designer 3.5 User Manual; Copyright 2004, 507 pages.
Zaykovskiy, Dmitry. Survey of the Speech Recognition Techniques for Mobile Devices. Proceedings of Specom 2006, Jun. 25, 2006, 6 pages.
Zhang et al. Noise Robust Speech Recognition Using Multi-Channel Based Channel Selection And Channel Weighting. The Institute of Electronics, Information and Communication Engineers, arXiv: 1604.03276v1 [cs.SD] Jan. 1, 2010, 8 pages.
Non-Final Office Action mailed on Apr. 20, 2023, issued in connection with U.S. Appl. No. 18/061,570, filed Dec. 5, 2022, 12 pages.
Non-Final Office Action mailed on Feb. 20, 2018, issued in connection with U.S. Appl. No. 15/211,748, filed Jul. 15, 2016, 31 pages.
Non-Final Office Action mailed on Jun. 20, 2019, issued in connection with U.S. Appl. No. 15/946,585, filed Apr. 5, 2018, 10 pages.
Non-Final Office Action mailed on May 20, 2024, issued in connection with U.S. Appl. No. 18/600,044, filed Mar. 8, 2024, 24 pages.
Non-Final Office Action mailed on Oct. 20, 2022, issued in connection with U.S. Appl. No. 17/532,674, filed Nov. 22, 2021, 52 pages.
Non-Final Office Action mailed on Apr. 21, 2021, issued in connection with U.S. Appl. No. 16/109,375, filed Aug. 22, 2018, 9 pages.
Non-Final Office Action mailed on Aug. 21, 2019, issued in connection with U.S. Appl. No. 16/192,126, filed Nov. 15, 2018, 8 pages.
Non-Final Office Action mailed on Feb. 21, 2019, issued in connection with U.S. Appl. No. 16/214,666, filed Dec. 10, 2018, 12 pages.
Non-Final Office Action mailed on Jan. 21, 2020, issued in connection with U.S. Appl. No. 16/214,711, filed Dec. 10, 2018, 9 pages.
Non-Final Office Action mailed on Jan. 21, 2020, issued in connection with U.S. Appl. No. 16/598,125, filed Oct. 10, 2019, 25 pages.
Non-Final Office Action mailed on Nov. 21, 2023, issued in connection with U.S. Appl. No. 18/088,976, filed Dec. 27, 2022, 9 pages.
Non-Final Office Action mailed on Oct. 21, 2019, issued in connection with U.S. Appl. No. 15/973,413, filed May 7, 2018, 10 pages.
Non-Final Office Action mailed on Dec. 22, 2022, issued in connection with U.S. Appl. No. 16/168,389, filed Oct. 23, 2018, 39 pages.
Non-Final Office Action mailed on Jul. 22, 2020, issued in connection with U.S. Appl. No. 16/145,275, filed Sep. 28, 2018, 11 pages.
Non-Final Office Action mailed on May 22, 2018, issued in connection with U.S. Appl. No. 15/946,599, filed Apr. 5, 2018, 19 pages.
Non-Final Office Action mailed on Sep. 22, 2020, issued in connection with U.S. Appl. No. 16/539,843, filed Aug. 13, 2019, 7 pages.
Non-Final Office Action mailed on Jun. 23, 2021, issued in connection with U.S. Appl. No. 16/439,032, filed Jun. 12, 2019, 13 pages.
Non-Final Office Action mailed on Jun. 23, 2023, issued in connection with U.S. Appl. No. 18/048,945, filed Oct. 24, 2022, 10 pages.
Non-Final Office Action mailed on Mar. 23, 2022, issued in connection with U.S. Appl. No. 16/907,953, filed Jun. 22, 2020, 7 pages.
Non-Final Office Action mailed on May 23, 2019, issued in connection with U.S. Appl. No. 16/154,071, filed Oct. 8, 2018, 36 pages.
Non-Final Office Action mailed on Nov. 23, 2020, issued in connection with U.S. Appl. No. 16/524,306, filed Jul. 29, 2019, 14 pages.
Non-Final Office Action mailed on Oct. 23, 2023, issued in connection with U.S. Appl. No. 17/932,715, filed Sep. 16, 2022, 14 pages.
Non-Final Office Action mailed on Sep. 23, 2020, issued in connection with U.S. Appl. No. 16/177,185, filed Oct. 31, 2018, 17 pages.
Non-Final Office Action mailed on Sep. 23, 2022, issued in connection with U.S. Appl. No. 16/153,530, filed Oct. 5, 2018, 25 pages.
Non-Final Office Action mailed on Apr. 24, 2023, issued in connection with U.S. Appl. No. 17/532,744, filed Nov. 22, 2021, 18 pages.
Non-Final Office Action mailed on Apr. 24, 2024, issued in connection with U.S. Appl. No. 18/461,430, filed Sep. 5, 2023, 22 pages.
Non-Final Office Action mailed on Aug. 24, 2017, issued in connection with U.S. Appl. No. 15/297,627, filed Oct. 19, 2016, 13 pages.
Non-Final Office Action mailed on Jul. 24, 2019, issued in connection with U.S. Appl. No. 16/439,009, filed Jun. 12, 2019, 26 pages.
Non-Final Office Action mailed on May 24, 2022, issued in connection with U.S. Appl. No. 17/101,949, filed Nov. 23, 2020, 10 pages.
Non-Final Office Action mailed on Apr. 25, 2023, issued in connection with U.S. Appl. No. 17/536,572, filed Nov. 29, 2021, 8 pages.
Non-Final Office Action mailed on Apr. 25, 2023, issued in connection with U.S. Appl. No. 17/656,794, filed Mar. 28, 2022, 22 pages.
Non-Final Office Action mailed on Jul. 25, 2017, issued in connection with U.S. Appl. No. 15/273,679, filed Jul. 22, 2016, 11 pages.
Non-Final Office Action mailed on May 25, 2023, issued in connection with U.S. Appl. No. 18/157,937, filed Jan. 23, 2023, 9 pages.

(56) References Cited

OTHER PUBLICATIONS

Non-Final Office Action mailed on Oct. 25, 2022, issued in connection with U.S. Appl. No. 17/549,034, filed Dec. 13, 2021, 20 pages.
Non-Final Office Action mailed on Apr. 26, 2024, issued in connection with U.S. Appl. No. 18/310,025, filed May 1, 2023, 9 pages.
Non-Final Office Action mailed on Dec. 26, 2018, issued in connection with U.S. Appl. No. 16/154,469, filed Oct. 8, 2018, 7 pages.
Non-Final Office Action mailed on Jan. 26, 2017, issued in connection with U.S. Appl. No. 15/098,867, filed Apr. 14, 2016, 16 pages.
Non-Final Office Action mailed on Jan. 26, 2024, issued in connection with U.S. Appl. No. 17/450,925, filed Oct. 14, 2021, 9 pages.
Non-Final Office Action mailed on May 26, 2022, issued in connection with U.S. Appl. No. 16/989,805, filed Aug. 10, 2020, 14 pages.
Non-Final Office Action mailed on Oct. 26, 2017, issued in connection with U.S. Appl. No. 15/438,744, filed Feb. 21, 2017, 12 pages.
Non-Final Office Action mailed on Oct. 26, 2021, issued in connection with U.S. Appl. No. 16/736,725, filed Jan. 7, 2020, 12 pages.
Non-Final Office Action mailed on Feb. 27, 2023, issued in connection with U.S. Appl. No. 17/493,430, filed Oct. 4, 2021, 17 pages.
Non-Final Office Action mailed on Jun. 27, 2018, issued in connection with U.S. Appl. No. 15/438,749, filed Feb. 21, 2017, 16 pages.
Non-Final Office Action mailed on Jun. 27, 2019, issued in connection with U.S. Appl. No. 16/437,437, filed Jun. 11, 2019, 8 pages.
Non-Final Office Action mailed on Jun. 27, 2019, issued in connection with U.S. Appl. No. 16/437,476, filed Jun. 11, 2019, 8 pages.
Non-Final Office Action mailed on Mar. 27, 2020, issued in connection with U.S. Appl. No. 16/790,621, filed Feb. 13, 2020, 8 pages.
Non-Final Office Action mailed on May 27, 2020, issued in connection with U.S. Appl. No. 16/715,713, filed Dec. 16, 2019, 14 pages.
Non-Final Office Action mailed on Oct. 27, 2020, issued in connection with U.S. Appl. No. 16/213,570, filed Dec. 7, 2018, 13 pages.
Non-Final Office Action mailed on Oct. 27, 2020, issued in connection with U.S. Appl. No. 16/715,984, filed Dec. 16, 2019, 14 pages.
Non-Final Office Action mailed on Oct. 27, 2020, issued in connection with U.S. Appl. No. 16/819,755, filed Mar. 16, 2020, 8 pages.
Non-Final Office Action mailed on Aug. 28, 2023, issued in connection with U.S. Appl. No. 17/722,661, filed Apr. 18, 2022, 16 pages.
Non-Final Office Action mailed on Feb. 28, 2023, issued in connection with U.S. Appl. No. 17/548,921, filed Dec. 13, 2021, 12 pages.
Non-Final Office Action mailed on Mar. 28, 2022, issued in connection with U.S. Appl. No. 17/222,151, filed Apr. 5, 2021, 5 pages.
Non-Final Office Action mailed on Mar. 28, 2024, issued in connection with U.S. Appl. No. 18/192,452, filed Mar. 29, 2023, 7 pages.
Non-Final Office Action mailed on Oct. 28, 2019, issued in connection with U.S. Appl. No. 16/145,275, filed Sep. 28, 2018, 11 pages.
Non-Final Office Action mailed on Oct. 28, 2021, issued in connection with U.S. Appl. No. 16/378,516, filed Apr. 8, 2019, 10 pages.
Non-Final Office Action mailed on Oct. 28, 2021, issued in connection with U.S. Appl. No. 17/247,736, filed Dec. 21, 2020, 12 pages.
Non-Final Office Action mailed on Feb. 29, 2024, issued in connection with U.S. Appl. No. 18/449,244, filed Aug. 14, 2023, 15 pages.
Non-Final Office Action mailed on Mar. 29, 2019, issued in connection with U.S. Appl. No. 16/102,650, filed Aug. 13, 2018, 11 pages.
Non-Final Office Action mailed on Mar. 29, 2021, issued in connection with U.S. Appl. No. 16/528,265, filed Jul. 31, 2019, 18 pages.
Non-Final Office Action mailed on Nov. 29, 2021, issued in connection with U.S. Appl. No. 16/989,350, filed Aug. 10, 2020, 15 pages.
Non-Final Office Action mailed on Sep. 29, 2020, issued in connection with U.S. Appl. No. 16/402,617, filed May 3, 2019, 12 pages.
Non-Final Office Action mailed on Dec. 3, 2020, issued in connection with U.S. Appl. No. 16/145,275, filed Sep. 28, 2018, 11 pages.
Non-Final Office Action mailed on Jul. 3, 2019, issued in connection with U.S. Appl. No. 15/948,541, filed Apr. 9, 2018, 7 pages.
Non-Final Office Action mailed on Jul. 3, 2023, issued in connection with U.S. Appl. No. 17/135,173, filed Dec. 28, 2020, 22 pages.
Non-Final Office Action mailed on May 3, 2019, issued in connection with U.S. Appl. No. 16/178,122, filed Nov. 1, 2018, 14 pages.
Non-Final Office Action mailed on Oct. 3, 2018, issued in connection with U.S. Appl. No. 16/102,153, filed Aug. 13, 2018, 20 pages.
Non-Final Office Action mailed on Apr. 30, 2019, issued in connection with U.S. Appl. No. 15/718,521, filed Sep. 28, 2017, 39 pages.
Non-Final Office Action mailed on Jun. 30, 2017, issued in connection with U.S. Appl. No. 15/277,810, filed Sep. 27, 2016, 13 pages.
Non-Final Office Action mailed on Sep. 30, 2022, issued in connection with U.S. Appl. No. 17/353,254, filed Jun. 21, 2021, 22 pages.
Non-Final Office Action mailed on Apr. 4, 2019, issued in connection with U.S. Appl. No. 15/718,911, filed Sep. 28, 2017, 21 pages.
Non-Final Office Action mailed on Aug. 4, 2020, issued in connection with U.S. Appl. No. 16/600,644, filed Oct. 14, 2019, 30 pages.
Non-Final Office Action mailed on Jan. 4, 2019, issued in connection with U.S. Appl. No. 15/948,541, filed Apr. 9, 2018, 6 pages.
Non-Final Office Action mailed on Jan. 4, 2022, issued in connection with U.S. Appl. No. 16/879,549, filed May 20, 2020, 14 pages.
Non-Final Office Action mailed on Nov. 4, 2022, issued in connection with U.S. Appl. No. 17/445,272, filed Aug. 17, 2021, 22 pages.
Non-Final Office Action mailed on Oct. 4, 2022, issued in connection with U.S. Appl. No. 16/915,234, filed Jun. 29, 2020, 16 pages.
Non-Final Office Action mailed on Apr. 5, 2023, issued in connection with U.S. Appl. No. 18/145,501, filed Dec. 22, 2022, 6 pages.
Non-Final Office Action mailed on Jul. 5, 2023, issued in connection with U.S. Appl. No. 18/061,579, filed Dec. 5, 2022, 11 pages.
Non-Final Office Action mailed on Nov. 5, 2021, issued in connection with U.S. Appl. No. 16/153,530, filed Oct. 5, 2018, 21 pages.
Non-Final Office Action mailed on Apr. 6, 2020, issued in connection with U.S. Appl. No. 16/424,825, filed May 29, 2019, 22 pages.
Non-Final Office Action mailed on Feb. 6, 2018, issued in connection with U.S. Appl. No. 15/211,689, filed Jul. 15, 2016, 32 pages.
Non-Final Office Action mailed on Feb. 6, 2018, issued in connection with U.S. Appl. No. 15/237,133, filed Aug. 15, 2016, 6 pages.
Non-Final Office Action mailed on Jan. 6, 2021, issued in connection with U.S. Appl. No. 16/439,046, filed Jun. 12, 2019, 13 pages.
Non-Final Office Action mailed on Mar. 6, 2020, issued in connection with U.S. Appl. No. 16/141,875, filed Sep. 25, 2018, 8 pages.
Non-Final Office Action mailed on Oct. 6, 2023, issued in connection with U.S. Appl. No. 17/222,950, filed Apr. 5, 2021, 9 pages.
Non-Final Office Action mailed on Sep. 6, 2017, issued in connection with U.S. Appl. No. 15/131,254, filed Apr. 18, 2016, 13 pages.
Non-Final Office Action mailed on Sep. 6, 2018, issued in connection with U.S. Appl. No. 15/098,760, filed Apr. 14, 2016, 29 pages.
Non-Final Office Action mailed on Dec. 7, 2021, issued in connection with U.S. Appl. No. 16/168,389, filed Oct. 23, 2018, 36 pages.
Non-Final Office Action mailed on Feb. 7, 2023, issued in connection with U.S. Appl. No. 17/303,001, filed May 18, 2021, 8 pages.

(56) References Cited

OTHER PUBLICATIONS

Non-Final Office Action mailed on Jan. 7, 2022, issued in connection with U.S. Appl. No. 17/135,123, filed Dec. 28, 2020, 16 pages.
Non-Final Office Action mailed on Jun. 7, 2023, issued in connection with U.S. Appl. No. 16/179,779, filed Nov. 2, 2018, 29 pages.
Non-Final Office Action mailed on Mar. 7, 2022, issued in connection with U.S. Appl. No. 16/812,758, filed Mar. 9, 2020, 18 pages.
Non-Final Office Action mailed on Sep. 7, 2023, issued in connection with U.S. Appl. No. 17/340,590, filed Jun. 7, 2021, 18 pages.
Non-Final Office Action mailed on Feb. 8, 2022, issued in connection with U.S. Appl. No. 16/806,747, filed Mar. 2, 2020, 17 pages.
Non-Final Office Action mailed on Jun. 8, 2023, issued in connection with U.S. Appl. No. 18/048,034, filed Oct. 20, 2022, 8 pages.
Non-Final Office Action mailed on Jun. 8, 2023, issued in connection with U.S. Appl. No. 18/061,243, filed Dec. 2, 2022, 10 pages.
Non-Final Office Action mailed on Sep. 8, 2020, issued in connection with U.S. Appl. No. 15/936,177, filed Mar. 26, 2018, 19 pages.
Non-Final Office Action mailed on Apr. 9, 2018, issued in connection with U.S. Appl. No. 15/804,776, filed Nov. 6, 2017, 18 pages.
Non-Final Office Action mailed on Apr. 9, 2021, issued in connection with U.S. Appl. No. 16/780,483, filed Feb. 3, 2020, 45 pages.
Japanese Patent Office, Non-Final Office Action and Translation mailed on Nov. 5, 2019, issued in connection with Japanese Patent Application No. 2019-517281, 6 pages.
Japanese Patent Office, Non-Final Office Action mailed on Apr. 4, 2023, issued in connection with Japanese Patent Application No. 2021-573944, 5 pages.
Japanese Patent Office, Notice of Reasons for Refusal and Translation mailed on Sep. 13, 2022, issued in connection with Japanese Patent Application No. 2021-163622, 12 pages.
Japanese Patent Office, Notice of Reasons for Refusal and Translation mailed on Jun. 22, 2021, issued in connection with Japanese Patent Application No. 2020-517935, 4 pages.
Japanese Patent Office, Notice of Reasons for Refusal and Translation mailed on Nov. 28, 2021, issued in connection with Japanese Patent Application No. 2020-550102, 9 pages.
Japanese Patent Office, Notice of Reasons for Refusal and Translation mailed on Aug. 8, 2023, issued in connection with Japanese Patent Application No. 2022-101346, 6 pages.
Japanese Patent Office, Office Action and Translation mailed on Nov. 15, 2022, issued in connection with Japanese Patent Application No. 2021-146144, 9 pages.
Japanese Patent Office, Office Action and Translation mailed on Mar. 16, 2021, issued in connection with Japanese Patent Application No. 2020-506725, 7 pages.
Japanese Patent Office, Office Action and Translation mailed on Nov. 17, 2020, issued in connection with Japanese Patent Application No. 2019-145039, 7 pages.
Japanese Patent Office, Office Action and Translation mailed on Apr. 20, 2021, issued in connection with Japanese Patent Application No. 2020-513852, 9 pages.
Japanese Patent Office, Office Action and Translation mailed on Feb. 24, 2021, issued in connection with Japanese Patent Application No. 2019-517281, 4 pages.
Japanese Patent Office, Office Action and Translation mailed on Apr. 27, 2021, issued in connection with Japanese Patent Application No. 2020-518400, 10 pages.
Japanese Patent Office, Office Action and Translation mailed on Aug. 27, 2020, issued in connection with Japanese Patent Application No. 2019-073349, 6 pages.
Japanese Patent Office, Office Action and Translation mailed on Jul. 30, 2020, issued in connection with Japanese Patent Application No. 2019-517281, 6 pages.
Japanese Patent Office, Office Action and Translation mailed on Jul. 6, 2020, issued in connection with Japanese Patent Application No. 2019-073348, 10 pages.
Japanese Patent Office, Office Action and Translation mailed on Jul. 6, 2021, issued in connection with Japanese Patent Application No. 2019-073349, 6 pages.
Japanese Patent Office, Office Action and Translation mailed on Oct. 8, 2019, issued in connection with Japanese Patent Application No. 2019-521032, 5 pages.
Japanese Patent Office, Office Action mailed on Dec. 7, 2021, issued in connection with Japanese Patent Application No. 2020-513852, 6 pages.
Japanese Patent Office, Office Action mailed on Nov. 29, 2022, issued in connection with Japanese Patent Application No. 2021-181224, 6 pages.
Japanese Patent Office, Office Action Translation mailed on Nov. 5, 2019, issued in connection with Japanese Patent Application No. 2019-517281, 2 pages.
Japanese Patent Office, Office Action Translation mailed on Oct. 8, 2019, issued in connection with Japanese Patent Application No. 2019-521032, 8 pages.
Jo et al., "Synchronized One-to-many Media Streaming with Adaptive Playout Control," Proceedings of SPIE, 2002, pp. 71-82, vol. 4861.
Johnson, "Implementing Neural Networks into Modern Technology," IJCNN'99. International Joint Conference on Neural Networks. Proceedings [Cat. No. 99CH36339], Washington, DC, USA, 1999, pp. 1028-1032, vol. 2, doi: 10.1109/IJCNN.1999.831096. [retrieved on Jun. 22, 2020].
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Jose Alvarez and Mathieu Salzmann "Compression-aware Training of Deep Networks" 31st Conference on Neural Information Processing Systems, Nov. 13, 2017, 12pages.
Joseph Szurley et al., "Efficient computation of microphone utility in a wireless acoustic sensor network with multi-channel Wiener filter based noise reduction", 2012 IEEE International Conference on Acoustics, Speech and Signal Processing, Kyoto, Japan, Mar. 25-30, 2012, pp. 2657-2660, XP032227701, DOI: 10.1109/ICASSP.2012.6288463 ISBN: 978-1-4673-0045-2.
Katsamanis et al. Robust far-field spoken command recognition for home automation combining adaptation and multichannel processing. ICASSP, IEEE International Conference on Acoustics, Speech and Signal Processing—Proceedings, May 2014, pp. 5547-5551.
Ketabdar et al. Detection of Out-of-Vocabulary Words in Posterior Based ASR. Proceedings of Interspeech 2007, Aug. 27, 2007, 4 pages.
Kim et al. Character-Aware Neural Language Models. Retrieved from the Internet: URL: https://arxiv.org/pdf/1508.06615v3.pdf, Oct. 16, 2015, 9 pages.
Korean Patent Office, Korean Examination Report and Translation mailed on Apr. 10, 2023, issued in connection with Korean Application No. 10-2022-7024007, 8 pages.
Korean Patent Office, Korean Examination Report and Translation mailed on Oct. 13, 2022, issued in connection with Korean Application No. 10-2021-7030939, 4 pages.
Korean Patent Office, Korean Examination Report and Translation mailed on Apr. 19, 2022, issued in connection with Korean Application No. 10-2021-7008937, 14 pages.
Korean Patent Office, Korean Examination Report and Translation mailed on Jul. 19, 2023, issued in connection with Korean Application No. 10-2022-7024007, 9 pages.
Korean Patent Office, Korean Examination Report and Translation mailed on Nov. 25, 2021, issued in connection with Korean Application No. 10-2021-7008937, 14 pages.
Korean Patent Office, Korean Examination Report and Translation mailed on Apr. 26, 2021, issued in connection with Korean Application No. 10-2021-7008937, 15 pages.
Korean Patent Office, Korean Examination Report and Translation mailed on Jul. 26, 2022, issued in connection with Korean Application No. 10-2022-7016656, 17 pages.
Korean Patent Office, Korean Examination Report and Translation mailed on Dec. 27, 2021, issued in connection with Korean Application No. 10-2021-7008937, 22 pages.
Korean Patent Office, Korean Examination Report and Translation mailed on Mar. 31, 2023, issued in connection with Korean Application No. 10-2022-7016656, 7 pages.

(56) References Cited

OTHER PUBLICATIONS

Korean Patent Office, Korean Examination Report and Translation mailed on Oct. 31, 2021, issued in connection with Korean Application No. 10-2022-7024007, 10 pages.
Korean Patent Office, Korean Office Action and Translation mailed on Oct. 14, 2021, issued in connection with Korean Application No. 10-2020-7011843, 29 pages.
Korean Patent Office, Korean Office Action and Translation mailed on Aug. 16, 2019, issued in connection with Korean Application No. 10-2018-7027452, 14 pages.
Korean Patent Office, Korean Office Action and Translation mailed on Apr. 2, 2020, issued in connection with Korean Application No. 10-2020-7008486, 12 pages.
Korean Patent Office, Korean Office Action and Translation mailed on Mar. 25, 2020, issued in connection with Korean Application No. 10-2019-7012192, 14 pages.
Korean Patent Office, Korean Office Action and Translation mailed on Aug. 26, 2020, issued in connection with Korean Application No. 10-2019-7027640, 16 pages.
Korean Patent Office, Korean Office Action and Translation mailed on Mar. 30, 2020, issued in connection with Korean Application No. 10-2020-7004425, 5 pages.
Korean Patent Office, Korean Office Action and Translation mailed on Jan. 4, 2021, issued in connection with Korean Application No. 10-2020-7034425, 14 pages.
Korean Patent Office, Korean Office Action and Translation mailed on Sep. 9, 2019, issued in connection with Korean Application No. 10-2018-7027451, 21 pages.
Korean Patent Office, Korean Office Action mailed on May 8, 2019, issued in connection with Korean Application No. 10-2018-7027451, 7 pages.
Korean Patent Office, Korean Office Action mailed on May 8, 2019, issued in connection with Korean Application No. 10-2018-7027452, 5 pages.
Non-Final Office Action mailed on Sep. 11, 2020, issued in connection with U.S. Appl. No. 16/219,702, filed Dec. 13, 2018, 9 pages.
Non-Final Office Action mailed on Apr. 12, 2021, issued in connection with U.S. Appl. No. 16/528,224, filed Jul. 31, 2019, 9 pages.
Non-Final Office Action mailed on Apr. 12, 2023, issued in connection with U.S. Appl. No. 17/878,649, filed Aug. 1, 2022, 16 pages.
Non-Final Office Action mailed on Dec. 12, 2016, issued in connection with U.S. Appl. No. 15/098,718, filed Apr. 14, 2016, 11 pages.
Non-Final Office Action mailed on Feb. 12, 2019, issued in connection with U.S. Appl. No. 15/670,361, filed Aug. 7, 2017, 13 pages.
Non-Final Office Action mailed on Dec. 13, 2023, issued in connection with U.S. Appl. No. 18/316,400, filed May 12, 2023, 6 pages.
Non-Final Office Action mailed on Dec. 13, 2023, issued in connection with U.S. Appl. No. 18/316,434, filed May 12, 2023, 29 pages.
Non-Final Office Action mailed on Jan. 13, 2017, issued in connection with U.S. Appl. No. 15/098,805, filed Apr. 14, 2016, 11 pages.
Non-Final Office Action mailed on Mar. 13, 2024, issued in connection with U.S. Appl. No. 18/309,939, filed May 1, 2023, 15 pages.
Non-Final Office Action mailed on Nov. 13, 2018, issued in connection with U.S. Appl. No. 15/717,621, filed Sep. 27, 2017, 23 pages.
Non-Final Office Action mailed on Nov. 13, 2018, issued in connection with U.S. Appl. No. 16/160,107, filed Oct. 15, 2018, 8 pages.
Non-Final Office Action mailed on Nov. 13, 2019, issued in connection with U.S. Appl. No. 15/984,073, filed May 18, 2018, 18 pages.
Non-Final Office Action mailed on Oct. 13, 2021, issued in connection with U.S. Appl. No. 16/679,538, filed Nov. 11, 2019, 8 pages.
Non-Final Office Action mailed on May 14, 2020, issued in connection with U.S. Appl. No. 15/948,541, filed Apr. 9, 2018, 8 pages.
Non-Final Office Action mailed on Nov. 14, 2022, issued in connection with U.S. Appl. No. 17/077,974, filed Oct. 22, 2020, 6 pages.
Non-Final Office Action mailed on Sep. 14, 2017, issued in connection with U.S. Appl. No. 15/178,180, filed Jun. 9, 2016, 16 pages.
Non-Final Office Action mailed on Sep. 14, 2018, issued in connection with U.S. Appl. No. 15/959,907, filed Apr. 23, 2018, 15 pages.
Non-Final Office Action mailed on Sep. 14, 2022, issued in connection with U.S. Appl. No. 17/446,690, filed Sep. 1, 2021, 10 pages.
Non-Final Office Action mailed on Sep. 14, 2023, issued in connection with U.S. Appl. No. 17/528,843, filed Nov. 17, 2021, 20 pages.
Non-Final Office Action mailed on Apr. 15, 2020, issued in connection with U.S. Appl. No. 16/138,111, filed Sep. 21, 2018, 15 pages.
Non-Final Office Action mailed on Aug. 15, 2022, issued in connection with U.S. Appl. No. 17/448,015, filed Sep. 17, 2021, 12 pages.
Non-Final Office Action mailed on Dec. 15, 2020, issued in connection with U.S. Appl. No. 17/087,423, filed Nov. 2, 2020, 7 pages.
Non-Final Office Action mailed on Dec. 15, 2022, issued in connection with U.S. Appl. No. 17/549,253, filed Dec. 13, 2021, 10 pages.
Non-Final Office Action mailed on Feb. 15, 2023, issued in connection with U.S. Appl. No. 17/453,632, filed Nov. 4, 2021, 12 pages.
Non-Final Office Action mailed on Jan. 15, 2019, issued in connection with U.S. Appl. No. 16/173,797, filed Oct. 29, 2018, 6 pages.
Non-Final Office Action mailed on Nov. 15, 2019, issued in connection with U.S. Appl. No. 16/153,530, filed Oct. 5, 2018, 17 pages.
Non-Final Office Action mailed on Sep. 15, 2022, issued in connection with U.S. Appl. No. 17/247,507, filed Dec. 14, 2020, 9 pages.
Non-Final Office Action mailed on Sep. 15, 2022, issued in connection with U.S. Appl. No. 17/327,911, filed May 24, 2021, 44 pages.
Non-Final Office Action mailed on Feb. 16, 2023, issued in connection with U.S. Appl. No. 17/305,920, filed Jul. 16, 2021, 12 pages.
Non-Final Office Action mailed on Mar. 16, 2018, issued in connection with U.S. Appl. No. 15/681,937, filed Aug. 21, 2017, 5 pages.
Non-Final Office Action mailed on Oct. 16, 2018, issued in connection with U.S. Appl. No. 15/131,254, filed Apr. 18, 2016, 16 pages.
Non-Final Office Action mailed on Sep. 16, 2021, issued in connection with U.S. Appl. No. 16/879,553, filed May 20, 2020, 24 pages.
Non-Final Office Action mailed on Aug. 17, 2021, issued in connection with U.S. Appl. No. 17/236,559, filed Apr. 21, 2021, 10 pages.
Non-Final Office Action mailed on Sep. 17, 2020, issued in connection with U.S. Appl. No. 16/600,949, filed Oct. 14, 2019, 29 pages.
Non-Final Office Action mailed on Apr. 18, 2018, issued in connection with U.S. Appl. No. 15/811,468, filed Nov. 13, 2017, 14 pages.
Non-Final Office Action mailed on Aug. 18, 2021, issued in connection with U.S. Appl. No. 16/845,946, filed Apr. 10, 2020, 14 pages.
Non-Final Office Action mailed on Jan. 18, 2019, issued in connection with U.S. Appl. No. 15/721,141, filed Sep. 29, 2017, 18 pages.

(56) References Cited

OTHER PUBLICATIONS

Non-Final Office Action mailed on Jan. 18, 2024, issued in connection with U.S. Appl. No. 18/048,034, filed Oct. 20, 2022, 10 pages.
Non-Final Office Action mailed on Jul. 18, 2023, issued in connection with U.S. Appl. No. 18/066,093, filed Dec. 14, 2022, 12 pages.
Non-Final Office Action mailed on Mar. 18, 2024, issued in connection with U.S. Appl. No. 17/532,744, filed Nov. 22, 2021, 20 pages.
Non-Final Office Action mailed on Oct. 18, 2019, issued in connection with U.S. Appl. No. 15/098,760, filed Apr. 14, 2016, 27 pages.
Non-Final Office Action mailed on Oct. 18, 2022, issued in connection with U.S. Appl. No. 16/949,973, filed Nov. 23, 2020, 31 pages.
Non-Final Office Action mailed on Sep. 18, 2019, issued in connection with U.S. Appl. No. 16/179,779, filed Nov. 2, 2018, 14 pages.
Non-Final Office Action mailed on Apr. 19, 2017, issued in connection with U.S. Appl. No. 15/131,776, filed Apr. 18, 2016, 12 pages.
Non-Final Office Action mailed on Dec. 19, 2019, issued in connection with U.S. Appl. No. 16/147,710, filed Sep. 29, 2018, 10 pages.
Non-Final Office Action mailed on Feb. 19, 2020, issued in connection with U.S. Appl. No. 16/148,879, filed Oct. 1, 2018, 15 pages.
Non-Final Office Action mailed on Jan. 19, 2024, issued in connection with U.S. Appl. No. 18/331,580, filed Jun. 8, 2023, 11 pages.
Non-Final Office Action mailed on Sep. 19, 2022, issued in connection with U.S. Appl. No. 17/385,542, filed Jul. 26, 2021, 9 pages.
Non-Final Office Action mailed on Sep. 2, 2020, issued in connection with U.S. Appl. No. 16/290,599, filed Mar. 1, 2019, 17 pages.
Non-Final Office Action mailed on Sep. 2, 2021, issued in connection with U.S. Appl. No. 16/947,895, filed Aug. 24, 2020, 16 pages.

* cited by examiner

NETWORKED MICROPHONE DEVICES, SYSTEMS, AND METHODS OF LOCALIZED ARBITRATION

CROSS-REFERENCE TO RELATED APPLICATIONS

This application claims the benefit of priority under 35 U.S.C. § 120 as a continuation of U.S. application Ser. No. 18/145,520 filed on Dec. 22, 2022, and titled "NETWORKED MICROPHONE DEVICES, SYSTEMS, & METHODS OF LOCALIZED ARBITRATION," which is a continuation of U.S. application Ser. No. 17/486,574 filed on Sep. 27, 2021, issued as U.S. Pat. No. 11,538,460, and titled "NETWORKED MICROPHONE DEVICES, SYSTEMS, & METHODS OF LOCALIZED ARBITRATION," which is a continuation of U.S. application Ser. No. 16/219,702 filed on Dec. 13, 2018, issued as U.S. Pat. No. 11,132,989, and titled "NETWORKED MICROPHONE DEVICES, SYSTEMS, & METHODS OF LOCALIZED ARBITRATION," the contents of each of which are incorporated herein by reference in their entirety.

TECHNICAL FIELD

The present technology relates to consumer goods and, more particularly, to methods, systems, products, features, services, and other elements directed to voice-assisted control of media playback systems or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The SONOS Wireless HiFi System enables people to experience music from many sources via one or more networked playback devices. Through a software control application installed on a smartphone, tablet, or computer, one can play what he or she wants in any room that has a networked playback device. Additionally, using a controller, for example, different songs can be streamed to each room that has a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1A:
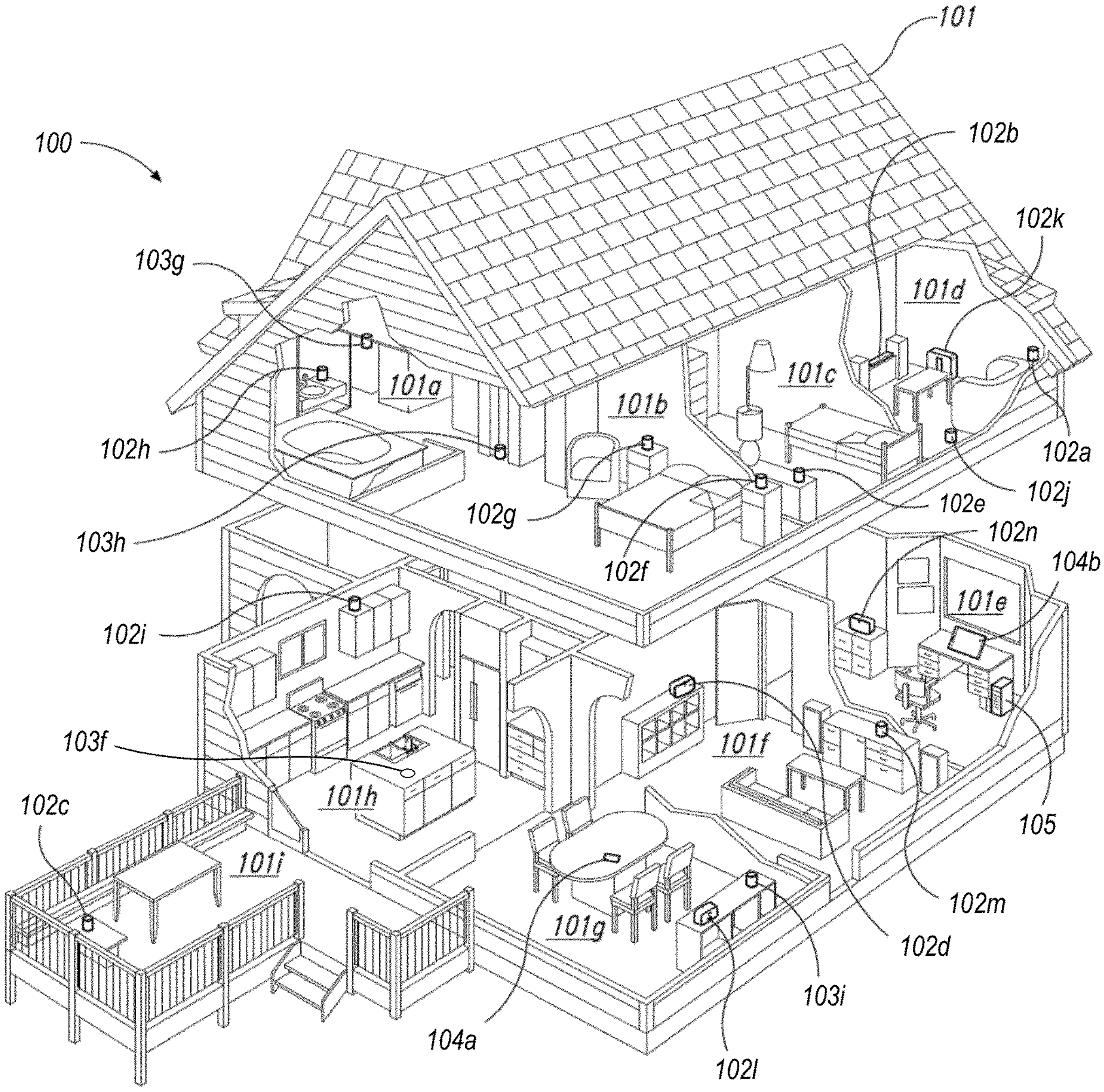
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103*a* is first introduced and discussed with reference to FIG. 1A.

DETAILED DESCRIPTION

I. Overview

Voice control can be beneficial in a "smart" home that includes smart appliances and devices that are connected to a communication network, such as wireless audio playback devices, illumination devices, and home-automation devices (e.g., thermostats, door locks, etc.). A network microphone device (NMD) may be used to control smart home devices. In various implementations described in greater detail below, an NMD may be implemented to control a playback device (which may include an NMD-equipped playback device), such as to adjust volume, change playback state (e.g., pause/play), select a song, and/or perform myriad other operations.

An NMD is a networked computing device that typically includes an arrangement of microphones, such as a microphone array, that is configured to detect sounds present in the NMD's environment. The detected sound may include a person's speech mixed with background noise (e.g., music being output by a playback device or other ambient noise). In practice, an NMD typically filters detected sound to remove the background noise from the person's speech to facilitate identifying whether the speech contains a voice input indicative of voice control. If so, the NMD may take action based on such a voice input.

A voice input will typically include a wake word followed by an utterance comprising a user request. A wake word is typically a predetermined word or phrase used to "wake up" an NMD and cause it to invoke a particular voice assistant service ("VAS") to interpret the intent of the voice input. In practice, an NMD will typically transmit the voice input, or at least a portion thereof (e.g., the utterance portion), to the VAS corresponding to the particular wake word contained in the voice input. For example, a user might speak the wake word "Alexa" to invoke the AMAZON VAS, "Ok, Google" to invoke the GOOGLE VAS, "Hey, Siri" to invoke the APPLE VAS, or "Hey, Sonos" to invoke a VAS offered by SONOS, among other examples. In practice, a wake word may also be referred to as, for example, an activation-, trigger-, wakeup-word or -phrase, and may take the form of any suitable word, combination of words (e.g., a particular phrase), and/or some other audio cue.

An NMD often employs a wake-word engine, which is typically onboard the NMD, to identify whether sound detected by the NMD contains a voice input that includes a particular wake word. The wake-word engine may be configured to identify (i.e., "spot") a particular wake word using one or more identification algorithms. This wake-word identification process is commonly referred to as "keyword spotting." In practice, to help facilitate keyword spotting, the NMD may buffer sound detected by a microphone of the NMD and then use the wake-word engine to process that buffered sound to determine whether a wake word is present.

When a wake-word engine spots a wake word in detected sound, the NMD may determine that a wake-word event (i.e., a "wake-word trigger") has occurred, which indicates that the NMD has detected sound that includes a potential voice input. The occurrence of the wake-word event typically causes the NMD to perform additional processes involving the detected sound. In some implementations, these additional processes may include outputting an alert (e.g., an audible chime and/or a light indicator) indicating that a wake word has been identified and extracting detected-sound data from a buffer, among other possible additional processes. Extracting the detected sound may include reading out and packaging a stream of the detected-sound data according to a particular format and transmitting the packaged detected-sound data to an appropriate VAS for interpretation.

In turn, the VAS corresponding to the wake word that was identified by the wake-word engine receives the transmitted sound data from the NMD over a communication network. A VAS traditionally takes the form of a remote service implemented using one or more cloud servers configured to process voice inputs (e.g., AMAZON's ALEXA, APPLE's SIRI, MICROSOFT's CORTANA, GOOGLE'S ASSISTANT, etc.). In some instances, certain components and functionality of the VAS may be distributed across local and remote devices. Additionally, or alternatively, a VAS may take the form of a local service implemented at an NMD or a media playback system comprising the NMD such that a voice input or certain types of voice input (e.g., rudimentary commands) are processed locally without intervention from a remote VAS.

In any case, when a VAS receives detected-sound data, the VAS will typically process this data, which involves identifying the voice input and determining an intent of words captured in the voice input. The VAS may then provide a response back to the NMD with some instruction according to the determined intent. Based on that instruction, the NMD may cause one or more smart devices to perform an action.

In operation, the action that the VAS instructs the NMD to take based on identifying a voice input can take a variety of forms. For example, the instruction may take the form of VAS response data that is indicative of a given VAS response corresponding to the voice input for the NMD to play back. The VAS response may generally involve the NMD outputting various types of audio and/or visual indications. For instance, a VAS response may comprise playing back chimes, spoken words, audible tones, and/or various other forms of audio played back in response to a voice input. Some of these VAS responses may indicate whether the VAS and/or the NMD will perform a given action (e.g., begin music playback, output requested information, etc.) specified by the voice utterance of the voice input. VAS responses may take various other forms as well.

In some implementations, an NMD may form part of a system comprising multiple NMDs. Indeed, a growing number of environments today have multiple NMDs. For instance, a household may include multiple NMD-equipped playback devices to fill more areas and/or rooms of a home with music and/or to provide more areas with voice-enabled services.

In environments having multiple NMDs, some or all of the NMDs may identify a same wake word. For example, when multiple NMDs in a given environment are configured to identify the same ALEXA wake word, and more than one of the NMDs identify the same wake word, each identifying NMD may trigger its respective internal voice capture components to extract detected-sound data for evaluation by a VAS. When more than one NMD identifies a common wake word, a VAS, which may be located in the cloud, may typically determine which of the NMDs identified the wake word with a highest confidence level. The VAS will then select a given NMD that identified the wake word with the highest confidence level, and after selecting the given NMD that identified the wake word with the highest measure of confidence, may cause the selected NMD to take one or more actions, which may take the form of one or more outputs, as some examples.

The non-selected NMDs may enter an idle state after determining that they have not been selected to perform extraction of detected-sound data. The selected NMD will also return to an idle state after extracting detected-sound data and/or generating any outputs. Once an NMD enters and idle state, an NMD may remain in the idle state until the NMD identifies another wake word.

When a user speaks the same wake word a subsequent time, and more than one NMD again identifies the same wake word, the VAS repeats the process of selecting a given one of the NMDs that identified the wake word with the highest confidence level. The NMD selected for the next interaction may be the previously-selected NMD if the previously-selected NMD identified the wake word with the highest confidence level or may be another NMD if an NMD other than the previously-selected NMD identified the wake word with the highest confidence level. The process of selecting a given NMD to extract sound-data that may contain a voice input from multiple NMDs that have identified a particular wake word may be referred to herein as "arbitration."

Typically, the NMD that the VAS designates to perform extraction as part of performing the arbitration process is also designated to output the VAS response and to take one or more actions instructed by the VAS, for example to control audio playback, etc. However, there may be issues that arise from designating the same NMD that is selected to perform extraction to also output the VAS response and/or to take one or more instructed actions. Namely, the NMD that the VAS ultimately designates to perform extraction may not be the NMD that the user expected to output the VAS response or to take the one or more actions instructed by the VAS.

For instance, an NMD located in a different room than the user may identify a wake word with a greater confidence level than an NMD located in the same room as the user. As an example, the NMD in the different room may identify the wake word with a greater confidence level than the NMD in the same room as the user due to the way sound is reflected and absorbed by objects and surfaces in the two rooms. In any case, the selected NMD located in the different room may then output a VAS response. However, the user may have expected the NMD located in the same room to output the VAS response rather than the NMD located in the different room.

When an NMD other than the one a user expects outputs a VAS response in response to an identified wake word, this unexpected VAS response may cause user frustration. For example, a user located in a living room of a home may have wanted an NMD to take an action instructed by the VAS in the form of playing back audio in the living room. However, due to the acoustics in the user's home, the NMD in the bedroom may identify a spoken wake word with a higher confidence level than the NMD in the living room. As a result, the NMD in the bedroom may output a VAS response and may begin playing back audio in the bedroom. As a result of the NMD located in the bedroom playing back audio, the user may have user may have walk to the bedroom to stop the audio playback by speaking or otherwise issuing a command to stop the bedroom NMD's playback.

In some cases, the particular NMD that generates an output in response to identifying a wake word at a given time may appear to be arbitrarily chosen and may change seemingly without explanation, a phenomenon referred to herein as "ping-ponging." Indeed, the NMDs that output VAS responses and/or take one or more actions instructed by the VAS in response to voice multiple inputs may appear to ping pong from one NMD to another NMD, which is seemingly arbitrary and also disorientating to a user. As an example, a user may speak a first wake word followed by a first voice input. In response to identifying the first wake word with a highest confidence level and being selected by a VAS, a first NMD of two or more NMDs may generate an output. Thereafter, the user who may be located in the same location as when speaking the first wake word and voice input, may speak a second wake word followed by a second voice input. In response to identifying the second wake word, a second NMD of the two or more NMDs may generate an output. Thus, the output generated by the first and second NMDs ping-pong's due to the outputting NMD changing between the first and second NMDs in response to successively identified wake words.

In addition to occurring between NMDs located in different rooms, ping-ponging can also occur between NMDs situated in the same room. For example, in response to a user speaking a first wake word followed by a voice utterance, a first NMD located near the user on one side of a room may identify the first wake word with a higher confidence level than a second NMD located on another side of a room. In response to the first NMD identifying the first wake word with the higher confidence level, the first NMD may output a VAS response. After the speaking the first wake word, the user may then turn to face the second NMD across the room and may speak a second wake word followed by a second voice utterance expecting the second NMD to identify the wake word with a higher confidence level, only to have the first NMD again identify the first wake word with a higher confidence level and respond to the user by outputting a VAS response.

Additionally, in the implementations described above, each NMD that identifies a given wake word followed by a voice utterance may transmit data associated with the voice utterance and/or wake word to the VAS, which is typically located in the cloud. The overall amount of bandwidth utilized by a media playback system having multiple NMDs that each send data for arbitration do a cloud-based VAS may be relatively high given that each NMD sends data associated with a wake word and/or a voice utterance to the VAS.

Example devices, systems, and methods disclosed herein address these and other technical problems that arise in the context of multiple NMDs. More specifically, this disclosure describes in various embodiments NMDs are configured to locally arbitrate between one another (i.e., rather than using remote cloud servers to perform arbitration). In one aspect of this disclosure, a single NMD within a set of NMDs is selected as the local arbitrator, or "arbitrator NMD." Further, performing local arbitration as described herein may be advantageous over remote arbitration because of the bandwidth savings achieved by avoiding sending the data of multiple redundant wake words and/or voice inputs from each NMD to the VAS for remote arbitration. Local arbitration may be advantageous for a variety of other reasons as well.

In a related aspect, the arbitrator NMD may also be designated for outputting VAS responses, which may provide a behavior that more closely aligns with a user's expectations and reduces or eliminates the aforementioned unexpected behaviors, such as ping-ponging. While the arbitrator NMD is described as being the same NMD that is designated for outputting VAS responses, it should be understood that an NMD other than the arbitrator may be designated for outputting a VAS response as well.

In example embodiments, a network media playback system includes two or more NMDs, each of which is configured to detect sound that may comprise a voice input. At least one of these NMDs may be designated as the arbitrator NMD, which may be responsible for selecting which NMD is to be the default NMD for outputting a VAS response among a set of NMDs that have identified a same wake word. In various embodiments, the local arbitrator may also determine the NMD among the set of NMDs that is to extract detected-sound data for evaluation by a VAS in response to multiple NMDs in the set identifying a same wake word. In some embodiments, an NMD other than the arbitrator may be selected to extract detected-sound data to a remote VAS.

In some implementations, a device that may be designated to output a VAS response, which may comprise the arbitrator NMD, may be assigned during the configuration of the media playback system that includes the two or more NMDs. In some cases, the arbitrator responsibilities may be assigned to a given NMD in the set based on the NMD's role or hardware resources.

In addition, or alternatively, the arbitrator responsibilities may be assigned to a given NMD based on other considerations. For instance, the arbitrator responsibilities may be assigned to an NMD that has already been assigned other responsibilities within the media playback system. As one example, an NMD designated as the "group coordinator" that is responsible for facilitating synchronous playback of audio among the two or more NMDs may be assigned the arbitrator responsibilities as well. As another example, an NMD designated as the "primary" device that is responsible for playing back a given audio channel, such as the center channel of a home theatre setup or either the left channel of a stereo pair setup, may also be assigned the arbitrator responsibilities. However, in other instances, the arbitrator NMD may not be assigned any of the aforementioned other responsibilities.

In any case, in accordance with example embodiments provided herein, local arbitration may generally involve two or more NMDs of the media playback system identifying a particular wake word, the arbitrator NMD selecting one of the NMDs to extract detected-sound data that may include a voice input for evaluation by the VAS, and after evaluation of the voice input by the VAS, the arbitrator NMD playing back a VAS response generated by the VAS.

More specifically, in an example implementation, each non-arbitrator NMD that identifies a particular wake word may transmit to the arbitrator NMD a notification that a wake word was identified. In some examples, a given notification may include a confidence level that the given non-arbitrator NMD identified the particular wake word correctly. In the case that an identifying NMD is the arbitrator NMD, the arbitrator NMD may not transmit a message that includes a confidence level but instead may generate an internal notification, which may include a confidence level that the arbitrator NMD identified the wake word correctly.

In practice, a confidence level may take various forms. For example, the confidence level may be a metric calculated based on audio properties of the received wake word. Examples of some such metrics that may be used to calculate the confidence level may include a signal-to-noise ratio (SnR), a frequency spectrum of the identified wake word, a direction of the identified wake word, an amplitude (e.g., decibel level) of the identified wake word, etc. A confidence level may take various other forms as well.

In turn, the arbitrator NMD receives each of the notifications. Based on these notifications, the arbitrator NMD may determine that more than one of the NMDs has identified the wake word at the same time. In response to this determination, the arbitrator NMD may next select which of the identifying NMDs is to extract the detected-sound data for evaluation by the VAS. The arbitrator NMD may make this selection in various manners.

As one example, if the notifications include respective confidence levels, the arbitrator NMD may select the NMD having the highest confidence level. As another example, if the NMDs have differing roles, the arbitrator NMD may use these roles as a basis for selecting the NMD. Other examples of selecting the extraction NMD are also possible.

After selecting an NMD to extract the voice input, the arbitrator NMD may cause the selected NMD to extract detected-sound data that may include a voice input for evaluation by the VAS. In this respect, it should be understood that the extraction NMD may differ from, or be the same as, the arbitrator NMD that is designated to output a voice output. The process of causing the selected NMD to extract the detected-sound data that may include a voice input may take various forms.

As one example, if the arbitrator NMD selects a non-arbitrator NMD, then the arbitrator NMD may send an instruction to the non-arbitrator NMD to extract the detected-sound data for evaluation by the appropriate VAS. As another example, if the arbitrator NMD selects itself, then the arbitrator NMD may trigger its internal voice capture components to extract the detected-sound data that may include a voice input for evaluation by the VAS.

After extracting the voice input, the selected NMD may format the detected-sound data into a sound-data stream and transmit the sound-data stream containing at least the detected-sound data that may include a voice input (and perhaps also the wake word) to the VAS either directly via a communication network that couples the VAS and the media playback system or indirectly via the arbitrator NMD. In this respect, only one NMD transmits a sound-data stream to the VAS, which consumes significantly less bandwidth than when multiple NMDs make such transmission.

Based on the received the sound-data stream, the VAS may identify a voice input comprising a voice utterance and may determine an intent of the voice utterance. In this regard, the VAS advantageously only has to process a sound-data stream from the media playback system and does not need to perform analyses related to remote arbitration, which may help to conserve the VAS's compute resources.

Thereafter, the VAS may determine the identity of the arbitrator NMD and send to the arbitrator NMD a message including VAS response data that is indicative of a given VAS response via the communication network.

The VAS may determine the identity of the arbitrator of the NMD in various different manners. According to an embodiment, the VAS may identify the arbitrator NMD via UPnP (Universal Plug 'n Play). As one example, UPnP eventing may be used to set the value of a state indicator that specifies the identity of the arbitrator NMD to the VAS. In practice, the group coordinator of a set of NMDs may be the arbitrator NMD. The VAS may determine the identity of the arbitrator NMD in various other manners as well.

After receiving the VAS response data that is indicative of a given VAS response, the arbitrator NMD outputs the VAS response. In this way, the media playback system exhibits a more predictable behavior that aligns with users' expectations.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

II. Example Operating Environment

Figure 1B:
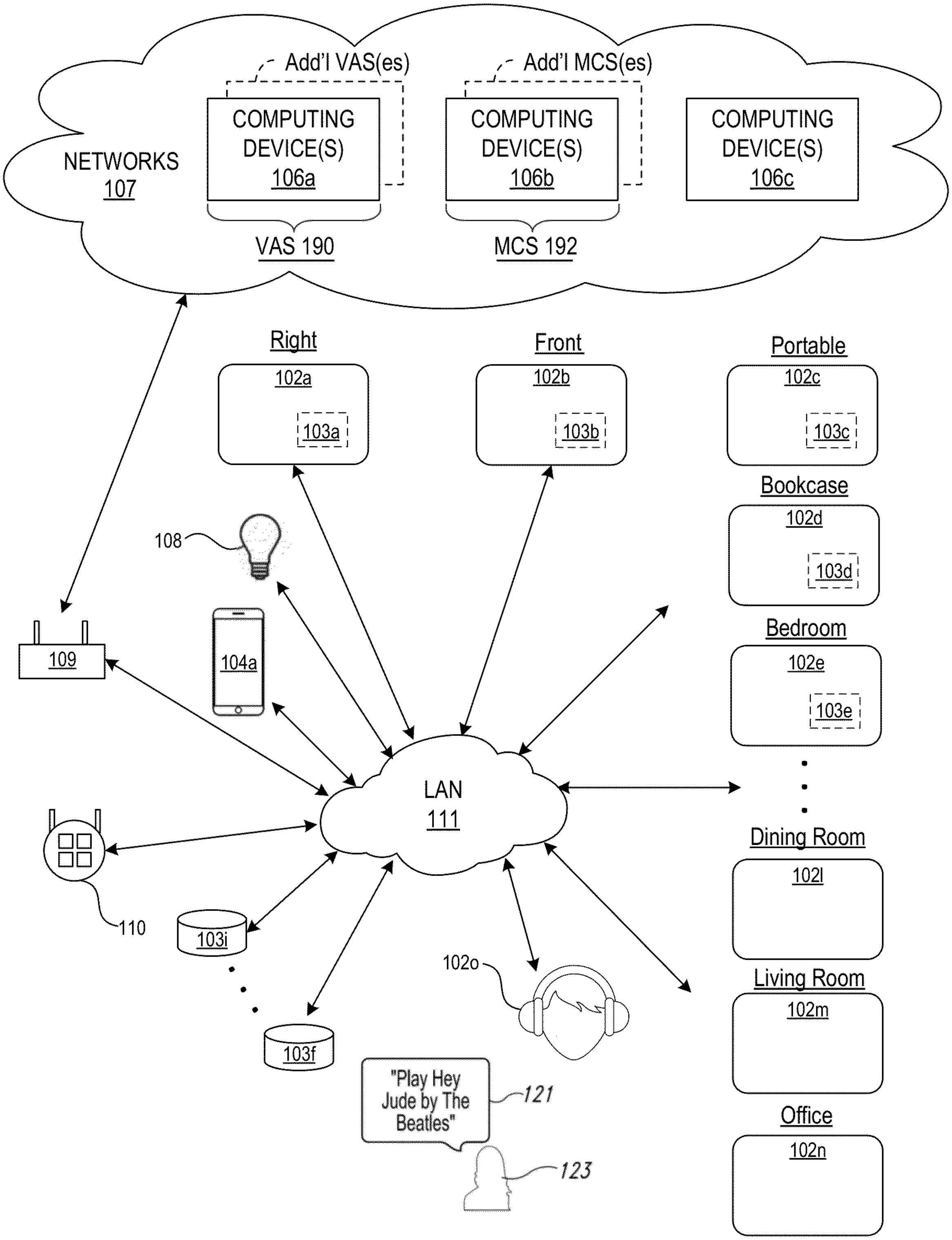
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101*a*, a master bedroom 101*b* (referred to herein as "Nick's Room"), a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102*a*-102*o*), network microphone devices 103 (identified individually as "NMDs" 103*a*-102*i*), and controller devices 104*a* and 104*b* (collectively "controller devices 104"). Referring to FIG. 1B, the home environment may include additional and/or other computing devices, including local network devices, such as one or more smart illumination devices 108 (FIG. 1B), a smart thermostat 100, and a local computing device 105 (FIG. 1A). In embodiments described below, one or more of the various playback devices 102 may be configured as portable playback devices, while others may be configured as stationary playback devices. For example, the headphones 102*o* (FIG. 1B) are a portable playback device, while the playback device 102*d* on the bookcase may be a stationary device. As another example, the playback device 102*c* on the patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102-104 and/or other network devices of the MPS 100 may be coupled to one another via point-to-point connections and/or over other connections, which may be wired and/or wireless, via a LAN 101 including a network router 109. For example, the playback device 102*j* in the Den 101*d* (FIG. 1A), which may be designated as the "Left" device, may have a point-to-point connection with the playback device 102*a*, which is also in the Den 101*d* and may be designated as the "Right" device. In a related embodiment, the Left playback device 102*j* may communicate with other network devices, such as the playback device 102*b*, which may be designated as the "Front" device, via a point-to-point connection and/or other connections via the LAN 101.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices 106*a* are associated with a VAS 190 and remote computing devices 106*b* are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106*c* configured to perform certain operations, such as remotely facilitating media playback functions, managing device and system status information, directing communications between the devices of the MPS 100 and one or multiple VASes and/or MCSes, among other operations. In one example, the remote computing devices 106*c* provide cloud servers for one or more SONOS Wireless HiFi Systems.

In various implementations, one or more of the playback devices 102 may take the form of or include an on-board (e.g., integrated) network microphone device. For example, the playback devices 102*a*—e include or are otherwise equipped with corresponding NMDs 103*a*— e, respectively. A playback device that includes or is equipped with an NMD may be referred to herein interchangeably as a playback device or an NMD unless indicated otherwise in the description.

In some cases, one or more of the NMDs 103 may be a stand-alone device. For example, the NMDs 103*f* and 103*g* may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102*d* because it is physically situated on a bookcase. Similarly, the NMD 103*f* may be assigned the named "Island" because it is physically situated on an island countertop in the Kitchen 101*h* (FIG. 1A). Some playback devices may be assigned names according to a zone or room, such as the playback devices 102*e*, 102*l*, 102*m*, and 102*n*, which are named "Bedroom," "Dining Room," "Living Room," and "Office," respectively. Further, certain playback devices may have functionally descriptive names. For example, the playback devices 102*a* and 102*b* are assigned the names "Right" and "Front," respectively, because these two devices are configured to provide specific audio channels during media playback in the zone of the Den 101*d* (FIG. 1A). The playback device 102*c* in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the LAN 101 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106*c* of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the media playback system 100 may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102*d* in the environment 101 (FIG. 1A) is in relatively close proximity to the NMD-equipped Living Room playback device 102*m*, and both devices 102*d* and 102*m* may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749.

In certain implementations, an NMD may be assigned to, or otherwise associated with, a designated or default playback device that may not include an NMD. For example, the Island NMD 103*f* in the Kitchen 101*h* (FIG. 1A) may be assigned to the Dining Room playback device 102*l*, which is in relatively close proximity to the Island NMD 103*f*. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. patent application Ser. No. 15/438,749.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the LAN 101 (FIG. 1B) may be eliminated and the single playback device 102 and/or the single NMD 103 may communicate directly with the remote computing devices 106*a*—d. In some embodiments, a telecommunication network (e.g., an LTE network, a 5G network, etc.) may communicate with the various playback, network microphone, and/or controller devices 102-104 independent of a LAN.

a. Example Playback & Network Microphone Devices

Figure 2A:
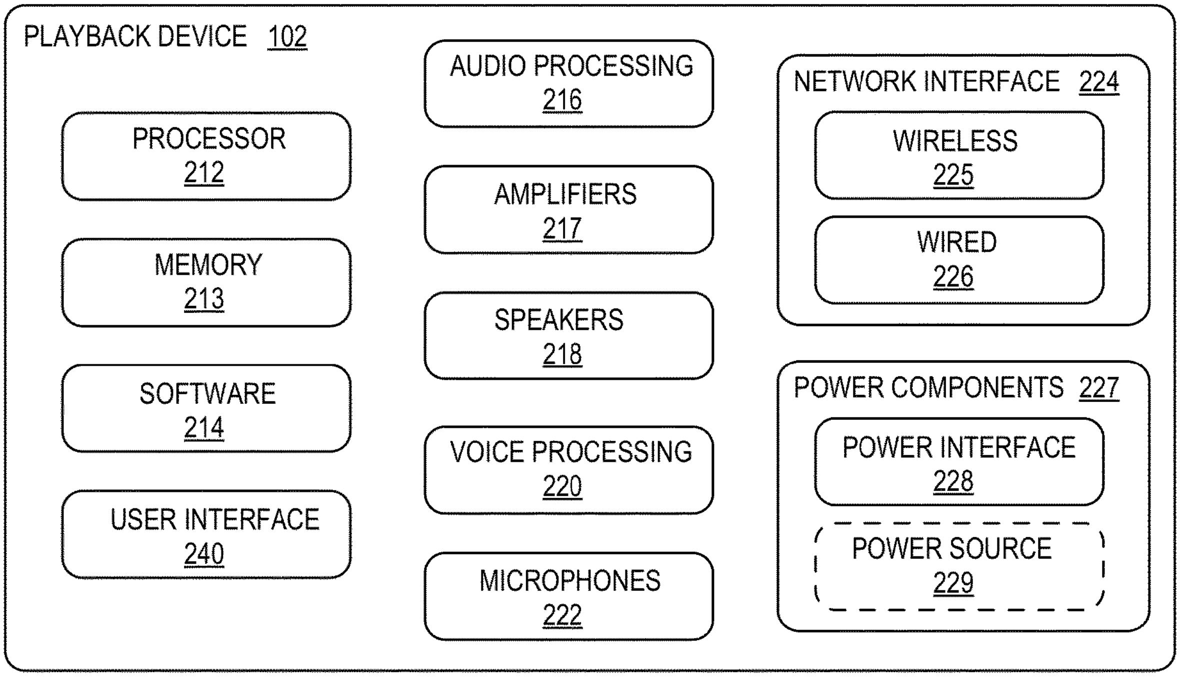
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 1002.11a, 1002.11b, 1002.11g, 1002.11n, 1002.11ac, 1002.15, 4G mobile communication standard, and so on). A wired interface may provide network interface functions for the playback device 102 to communicate over a wired connection with other devices in accordance with a communication protocol (e.g., IEEE 1002.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

In some implementations, the voice-processing components 220 may detect and store a user's voice profile, which may be associated with a user account of the MPS 100. For example, voice profiles may be stored as and/or compared to variables stored in a set of command information or data table. The voice profile may include aspects of the tone or frequency of a user's voice and/or other unique aspects of the user's voice, such as those described in previously-referenced U.S. patent application Ser. No. 15/438,749.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
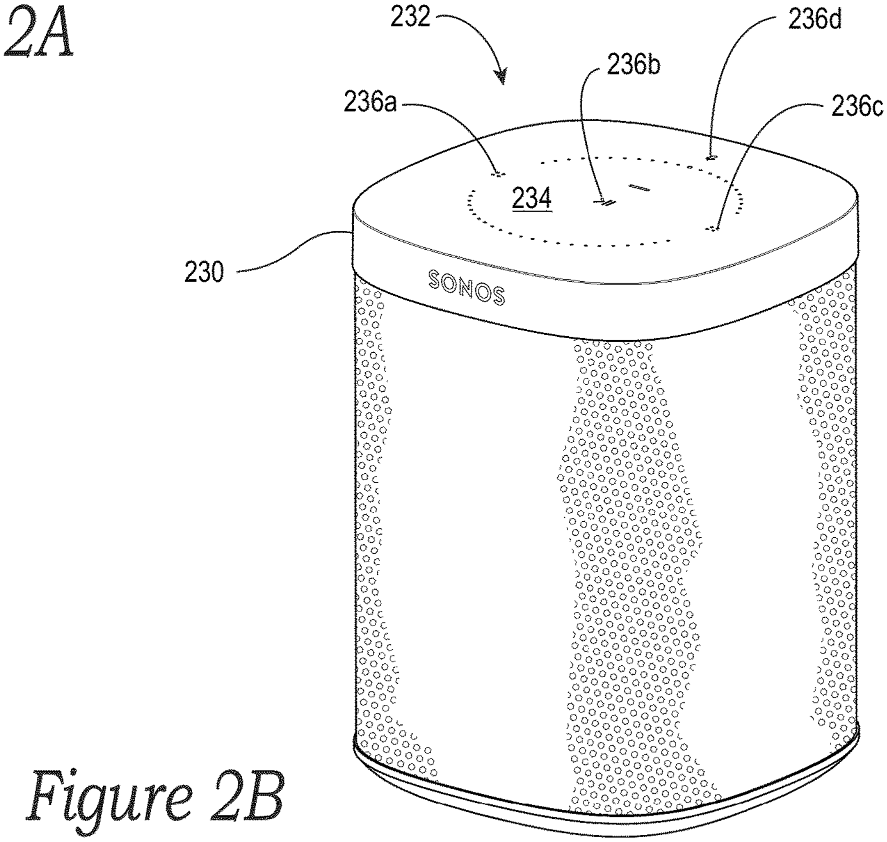
FIG. 2B is an isometric diagram of an example playback device that includes a network microphone device.

As an illustrative example, FIG. 2B shows an example housing 230 of the playback device 102 that includes a user interface in the form of a control area 232 at a top portion 234 of the housing 230. The control area 232 includes buttons 236*a-c* for controlling audio playback, volume level, and other functions. The control area 232 also includes a button 236*d* for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

By way of illustration, SONOS, Inc. presently offers (or has offered) for sale certain playback devices that may implement certain of the embodiments disclosed herein, including a "PLAY:1," "PLAY:3," "PLAY:5," "PLAYBAR," "CONNECT:AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the media playback system 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

b. Example Playback Device Configurations

Figure 3B:
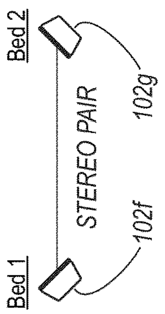
FIGS. 3A-3E are diagrams showing example playback device configurations in accordance with aspects of the disclosure.
Figure 3C:
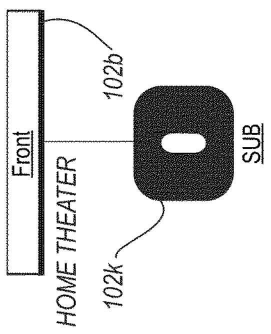
Figure 3D:
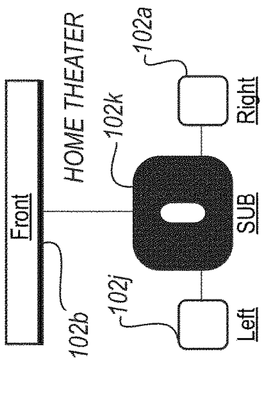
Figure 3E:
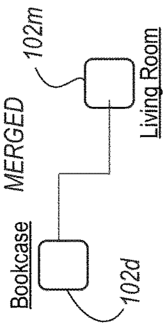
Figure 3A:
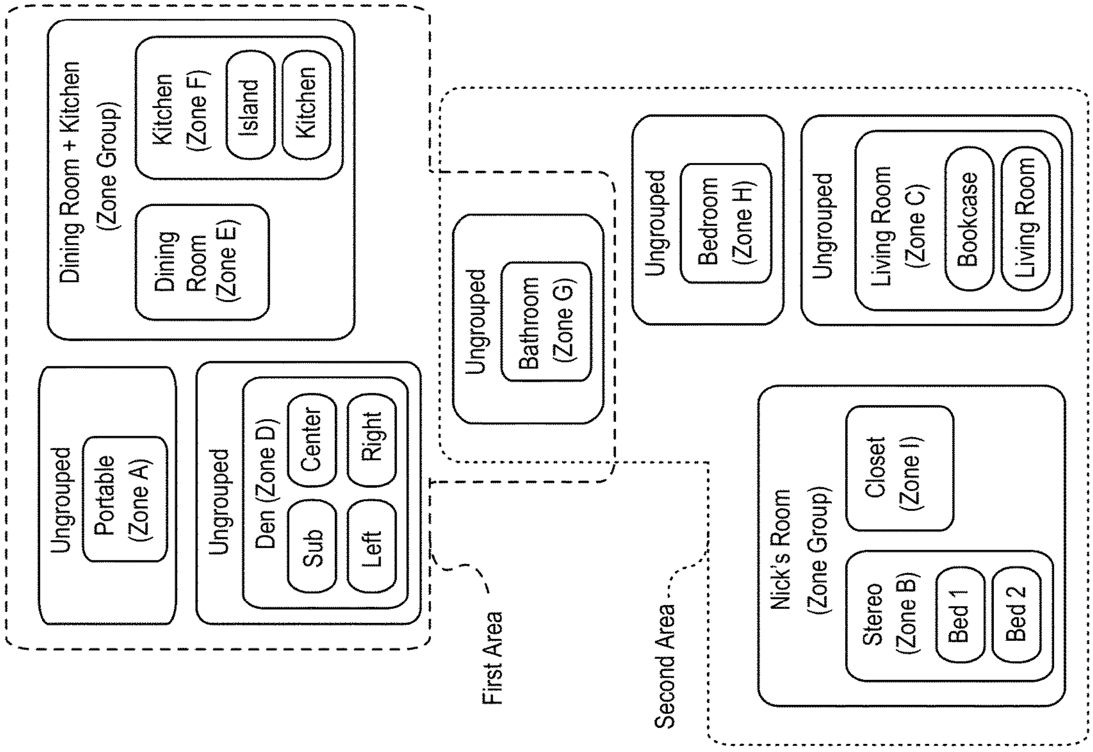

FIGS. 3A-3E show example configurations of playback devices. Referring first to FIG. 3A, in some example instances, a single playback device may belong to a zone. For example, the playback device 102*c* (FIG. 1A) on the Patio may belong to Zone A. In some implementations described below, multiple playback devices may be "bonded" to form a "bonded pair" which together form a single zone. For example, the playback device 102*f* (FIG. 1A) named "Bed 1" in FIG. 3A may be bonded to the playback device 102*g* (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102*d* named "Bookcase" may be merged with the playback device 102*m* named "Living Room" to form a single Zone C. The merged playback devices 102*d* and 102*m* may not be specifically assigned different playback responsibilities. That is, the merged playback devices 102*d* and 102*m* may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102*m* (as shown). In another example, Zone C may instead take on the name of the Bookcase device 102*d*. In a further example, Zone C may take on a name that is some combination of the Bookcase device 102*d* and Living Room device 102*m*. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102*f* in the master bedroom 101*h* (FIG. 1A) and the Bed 2 device may be the playback device 102*g* also in the master bedroom 101*h* (FIG. 1A).

As noted above, playback devices that are bonded may have different playback responsibilities, such as playback responsibilities for certain audio channels. For example, as shown in FIG. 3B, the Bed 1 and Bed 2 devices 102*f* and 102*g* may be bonded so as to produce or enhance a stereo effect of audio content. In this example, the Bed 1 playback device 102*f* may be configured to play a left channel audio component, while the Bed 2 playback device 102*g* may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102*b* named "Front" may be bonded with the playback device 102*k* named "SUB." The Front device 102*b* may render a range of mid to high frequencies, and the SUB device 102*k* may render low frequencies as, for example, a subwoofer. When unbonded, the Front device 102*b* may be configured to render a full range of frequencies. As another example, FIG. 3D shows the Front and SUB devices 102*b* and 102*k* further bonded with Right and Left playback devices 102*a* and 102*j*, respectively. In some implementations, the Right and Left devices 102*a* and 102*j* may form surround or "satellite" channels of a home theater system. The bonded playback devices 102*a*, 102*b*, 102*j*, and 102*k* may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102*d* and 102*m* in the Living Room merged, which would result in these devices being represented by the single UI entity of Zone C. In one embodiment, the playback devices 102*d* and 102*m* may playback audio in synchrony, during which each outputs the full range of audio content that each respective playback device 102*d* and 102*m* is capable of rendering.

In some embodiments, a stand-alone NMD may be in a zone by itself. For example, the NMD 103*h* from FIG. 1A is named "Closet" and forms Zone I in FIG. 3A. An NMD may also be bonded or merged with another device so as to form a zone. For example, the NMD device 103*f* named "Island" may be bonded with the playback device 102*i* Kitchen, which together form Zone F, which is also named "Kitchen." Additional details regarding assigning NMDs and playback devices as designated or default devices may be found, for example, in previously referenced U.S. patent application Ser. No. 15/438,749. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the media playback system 100, which may be shared from time to time among the devices so that one or more of the devices have the most recent data associated with the system.

In some embodiments, the memory 213 of the playback device 202 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102*a*, 102*b*, 102*j*, and 102*k*. Identifiers associated with the Dining Room may indicate that the Dining Room is part of Dining Room+Kitchen group and that devices 103*f* and 102*i* are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs.

During operation, one or more playback zones in the environment of FIG. 1A may each be playing different audio content. For instance, the user may be grilling in the Patio zone and listening to hip hop music being played by the playback device 102*c* while another user may be preparing food in the Kitchen zone and listening to classical music being played by the playback device 102*i*. In another example, a playback zone may play the same audio content in synchrony with another playback zone. For instance, the user may be in the Office zone where the playback device 102*n* is playing the same hip-hop music that is being playing by playback device 102*c* in the Patio zone. In such a case, playback devices 102*c* and 102*n* may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102*c* from the Patio zone to the Office zone, the Office zone may now include both the playback devices 102*c* and 102*n*. In some cases, the user may pair or group the moved playback device 102*c* with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102*i* and 102*l* may render audio content in synchrony. As another example, bonded playback devices in the Den zone may be split into (i) a television zone and (ii) a separate listening zone. The television zone may include the Front playback device 102*b*. The listening zone may include the Right, Left, and SUB playback devices 102*a*, 102*j*, and 102*k*, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103*a* or 103*b* (FIG. 1B) to control the Den zone before it is separated into the television zone and the listening zone. Once separated, the listening zone may be controlled, for example, by a user in the vicinity of the NMD 103*a*, and the television zone may be controlled, for example, by a user in the vicinity of the NMD 103*b*. As described above, however, any of the NMDs 103 may be configured to control the various playback and other devices of the MPS 100.

c. Example Controller Devices

Figure 4A:
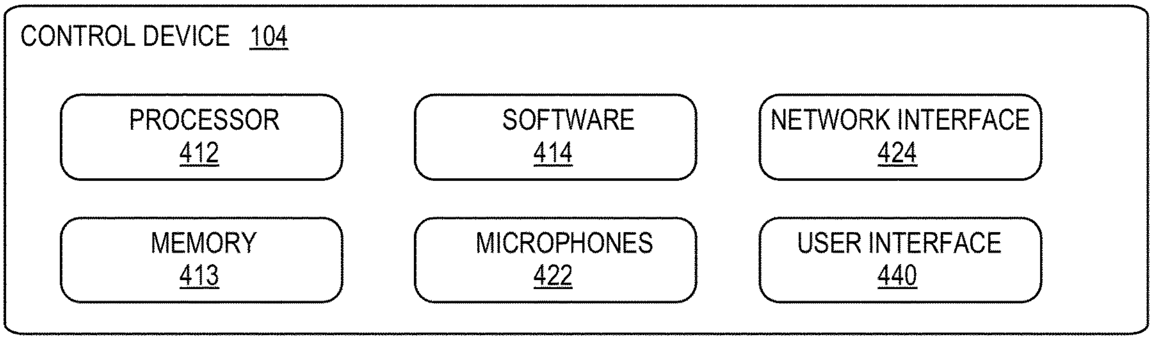
FIG. 4A is a functional block diagram of an example controller device in accordance with aspects of the disclosure.

FIG. 4A is a functional block diagram illustrating certain aspects of a selected one of the controller devices 104 of the MPS 100 of FIG. 1A. Such controller devices may also be referred to herein as a "control device" or "controller." The controller device shown in FIG. 4A may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

Figure 4B:
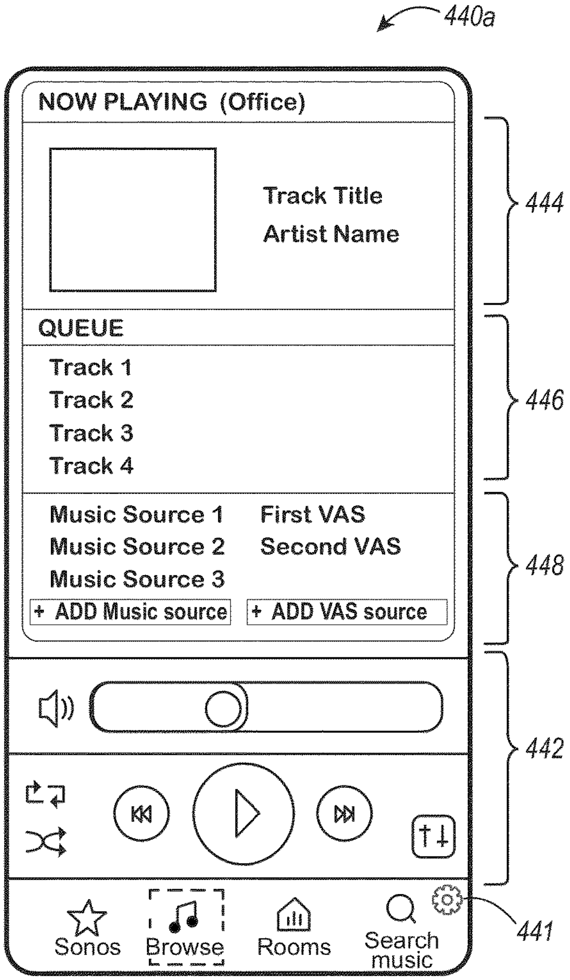
FIGS. 4B and 4C are controller interfaces in accordance with aspects of the disclosure.
Figure 4C:
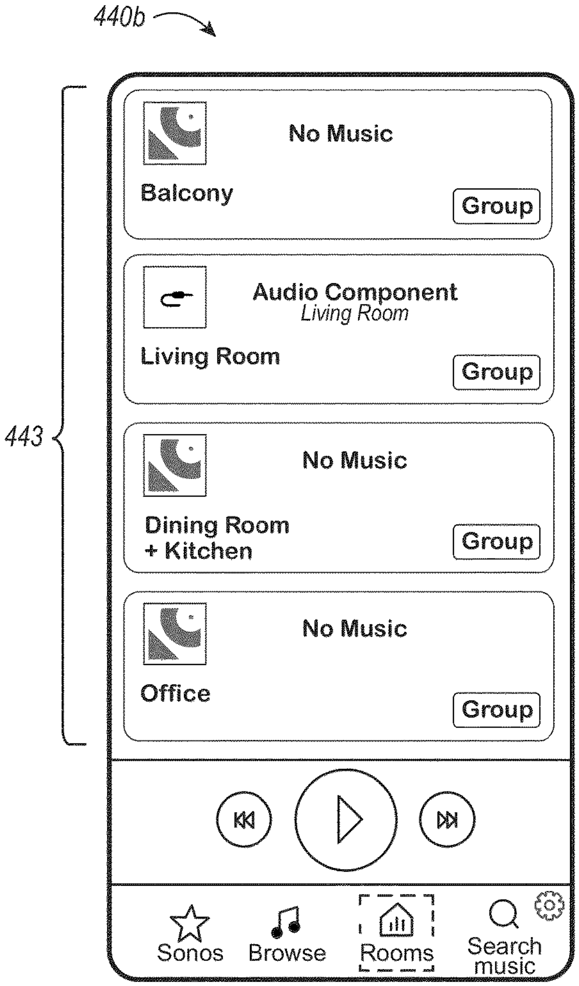

As shown in FIG. 4A, the controller device 104 also includes a user interface 440 that is generally configured to facilitate user access and control of the MPS 100. The user interface 440 may include a touch-screen display or other physical interface configured to provide various graphical controller interfaces, such as the controller interfaces 440*a* and 440*b* shown in FIGS. 4B and 4C. Referring to FIGS. 4B and 4C together, the controller interfaces 440*a* and 440*b* includes a playback control region 442, a playback zone region 443, a playback status region 444, a playback queue region 446, and a sources region 448. The user interface as shown is just one example of an interface that may be provided on a network device, such as the controller device shown in FIG. 4A, and accessed by users to control a media playback system, such as the MPS 100. Other user interfaces of varying formats, styles, and interactive sequences may alternatively be implemented on one or more network devices to provide comparable control access to a media playback system.

The playback control region 442 (FIG. 4B) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 442 may also include selectable icons that, when selected, modify equalization settings and/or playback volume, among other possibilities.

The playback zone region 443 (FIG. 4C) may include representations of playback zones within the MPS 100. The playback zones regions 443 may also include a representation of zone groups, such as the Dining Room+Kitchen zone group, as shown. In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 443 (FIG. 4C) may be dynamically updated as playback zone or zone group configurations are modified.

The playback status region 444 (FIG. 4B) may include graphical representations of audio content that is presently being played, previously played, or scheduled to play next in the selected playback zone or zone group. The selected playback zone or zone group may be visually distinguished on a controller interface, such as within the playback zone region 443 and/or the playback status region 444. The graphical representations may include track title, artist name, album name, album year, track length, and/or other relevant information that may be useful for the user to know when controlling the MPS 100 via the controller interface.

The playback queue region 446 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 4B and 4C, the graphical representations of audio content in the playback queue region 446 (FIG. 4B) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102*a* and 102*b* in the Living Room shown in FIG. 1A, and a second VAS to the NMD 103*f* in the Kitchen. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

e. Example Network Microphone Devices

Figure 5:
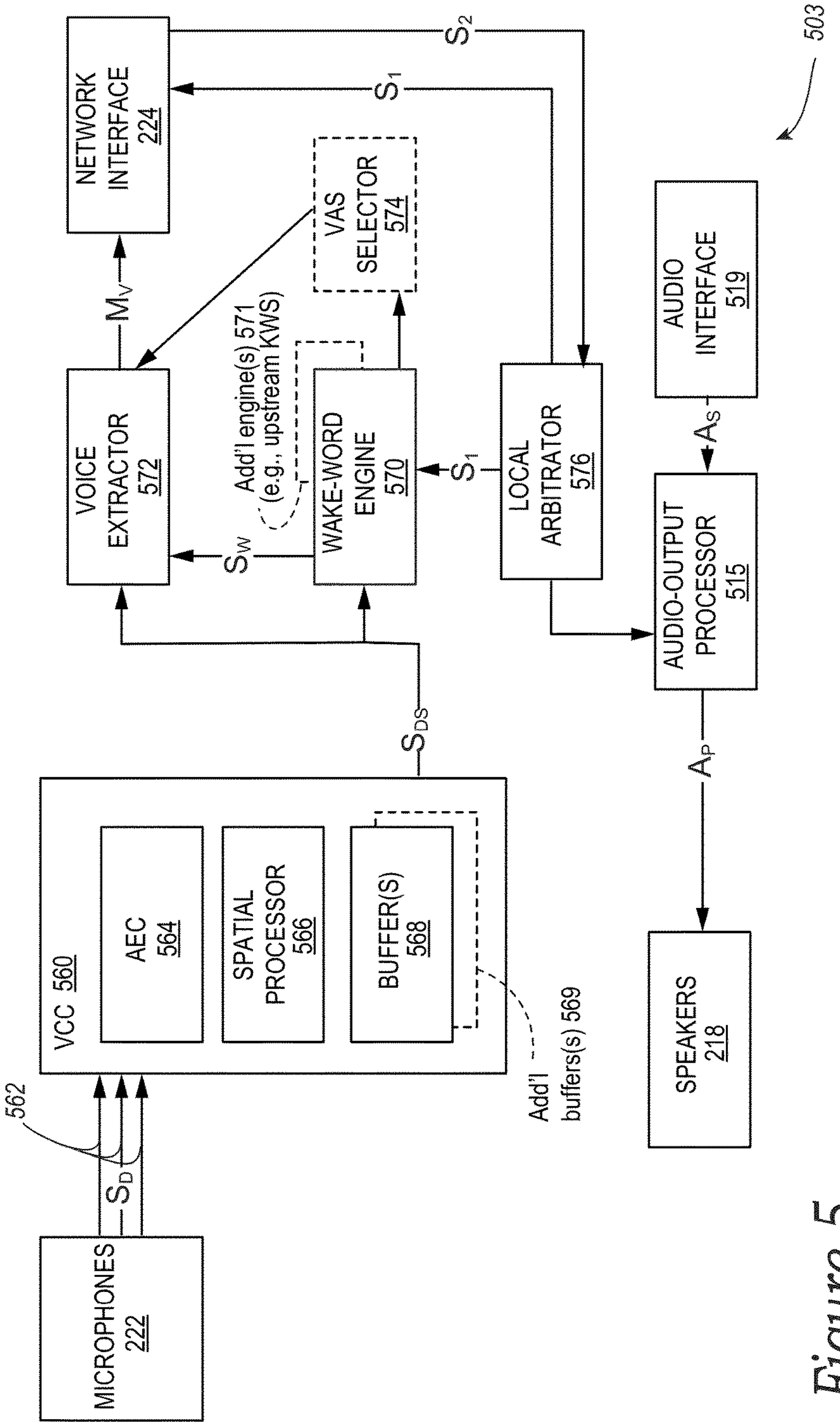
FIG. 5 is a functional block diagram of certain components of an example network microphone device in accordance with aspects of the disclosure.

FIG. 5 is a functional block diagram showing an NMD 503 configured in accordance with embodiments of the disclosure. The NMD 503 includes voice capture components ("VCC") 560; at least one wake-word engine 570 and at least one voice extractor 572, each of which is operably coupled to the VCC 560; and a local arbitrator 576, audio output processing components 515 operably coupled to the local arbitrator 576, and at least one audio input interface 519 operably coupled to the audio output processing components 515, both of which may form a portion of the audio processing components 216 discussed above. The NMD 503 further includes the microphones 222 and the at least one network interface 224 described above and may also include other components, such as audio amplifiers, speakers, a user interface, etc., which are not shown in FIG. 5 for purposes of clarity.

The microphones 222 of the NMD 503 are configured to provide detected sound, $S_D$, from the environment of the NMD 503 to the VCC 560. The detected sound $S_D$ may take the form of one or more analog or digital signals. In example implementations, the detected sound $S_D$ may be composed of a plurality signals associated with respective channels 562 that are fed to the VCC 560.

Each channel 562 may correspond to a particular microphone 222. For example, an NMD having six microphones may have six corresponding channels. Each channel of the detected sound $S_D$ may bear certain similarities to the other channels but may differ in certain regards, which may be due to the position of the given channel's corresponding microphone relative to the microphones of other channels. For example, one or more of the channels of the detected sound $S_D$ may have a greater signal to noise ratio ("SNR") of speech to background noise than other channels.

As further shown in FIG. 5, the VCC 560 includes an AEC 564, a spatial processor 566, and one or more buffers 568. In operation, the AEC 564 receives the detected sound $S_D$ and filters or otherwise processes the sound to suppress echoes and/or to otherwise improve the quality of the detected sound $S_D$. That processed sound may then be passed to the spatial processor 566.

The spatial processor 566 is typically configured to analyze the detected sound $S_D$ and identify certain characteristics, such as a sound's amplitude (e.g., decibel level), frequency spectrum, directionality, etc. In one respect, the spatial processor 566 may help filter or suppress ambient noise in the detected sound $S_D$ from potential user speech based on similarities and differences in the constituent channels 562 of the detected sound $S_D$, as discussed above. As one possibility, the spatial processor 566 may monitor metrics that distinguish speech from other sounds. Such metrics can include, for example, energy within the speech band relative to background noise and entropy within the speech band—a measure of spectral structure—which is typically lower in speech than in most common background noise. In some implementations, the spatial processor 566 may be configured to determine a speech presence probability, examples of such functionality are disclosed in U.S. patent application Ser. No. 15/984,073, filed May 18, 2018, titled "Linear Filtering for Noise-Suppressed Speech Detection," which is incorporated herein by reference in its entirety.

In operation, the one or more buffers 568—one or more of which may be part of or separate from the memory 213 (FIG. 2A)—capture data corresponding to the detected sound $S_D$. More specifically, the one or more buffers 568 capture detected-sound data that was processed by the upstream AEC 564 and spatial processor 566. In some implementations, the NMD 503 may include an additional buffer 569 (shown in dashed lines) that stores information (e.g., metadata or the like) regarding the detected sound $S_D$ that was processed by the upstream AEC 564 and spatial processor 566. This other buffer 569 may be referred to as a "sound metadata buffer." When the wake-word engine 570 identifies a wake-word trigger (discussed below), the sound metadata buffer 569 may pass to the network interface 224 sound characteristic information corresponding to the wake-word trigger (e.g., spectral and/or gain information of the environment of the NMD and/or the voice input comprising the wake word). The network interface 224 may then provide this information to a remote server that may be associated, e.g., with the MPS 100. In one aspect, the information stored in the additional buffer 569 does not reveal the content of any speech but instead is indicative of certain unique features of the detected sound itself. In a related aspect, the metadata may be communicated between computing devices, such as the various computing devices of the MPS 100 without implicating privacy concerns. In practice, the MPS 100 can use the data to adapt and fine-tune voice processing algorithms, including sensitivity tuning as discussed below.

In any event, the detected-sound data form a digital representation (i.e., sound-data stream), $S_{DS}$, of the sound detected by the microphones 222. In practice, the sound-data stream Sips may take a variety of forms. As one possibility, the sound-data stream $S_{DS}$ may be composed of frames, each of which may include one or more sound samples. The frames may be streamed (i.e., read out) from the one or more buffers 568 for further processing by downstream components, such as the wake-word engine 570 and the voice extractor 572 of the NMD 503.

In some implementations, at least one buffer 568 captures detected-sound data utilizing a sliding window approach in which a given amount (i.e., a given window) of the most recently captured detected-sound data is retained in the at least one buffer 568 while older detected-sound data are overwritten when they fall outside of the window. For example, at least one buffer 568 may temporarily retain 20 frames of a sound specimen at given time, discard the oldest frame after an expiration time, and then capture a new frame, which is added to the 19 prior frames of the sound specimen.

In practice, when the sound-data stream $S_{DS}$ is composed of frames, the frames may take a variety of forms having a variety of characteristics. As one possibility, the frames may take the form of audio frames that have a certain resolution (e.g., 16 bits of resolution), which may be based on a sampling rate (e.g., 44,100 Hz). Additionally, or alternatively, the frames may include information corresponding to a given sound specimen that the frames define, such as metadata that indicates frequency response, power input level, SNR, microphone channel identification, and/or other information of the given sound specimen, among other examples. Thus, in some embodiments, a frame may include a portion of sound (e.g., one or more samples of a given sound specimen) and metadata regarding the portion of sound. In other embodiments, a frame may only include a portion of sound (e.g., one or more samples of a given sound specimen) or metadata regarding a portion of sound.

In any case, downstream components of the NMD 503 may process the sound-data stream $S_{DS}$. For instance, the wake-word engine 570 is configured to apply or more identification algorithms to the sound-data stream $S_{DS}$ (e.g., streamed sound frames) to spot potential wake words in the detected-sound $S_D$. When the wake-word engine 570 spots a potential wake word, the work-word engine 570 provides an indication of a "wake-word event" (also referred to as a "wake-word trigger"). In the illustrated example of FIG. 5, the wake-word engine 570 outputs a signal, $S_W$, that indicates the occurrence of a wake-word event to the voice extractor 572.

In multi-VAS implementations, the NMD 503 may include a VAS selector 574 (shown in dashed lines) that is generally configured to direct the voice extractor's extraction and transmission of the sound-data stream $S_{DS}$ to the appropriate VAS when a given wake-word is identified by a particular wake-word engine (and a corresponding wake-word trigger), such as the wake-word engine 570 and at least one additional wake-word engine 571 (shown in dashed lines). In such implementations, the NMD 503 may include multiple, different wake-word engines and/or voice extractors, each supported by a particular VAS Similar to the discussion above, each wake-word engine may be configured to receive as input the sound-data stream $S_{DS}$ from the one or more buffers 568 and apply identification algorithms to cause a wake-word trigger for the appropriate VAS. Thus, as one example, the wake-word engine 570 may be configured to identify the wake word "Alexa" and cause the NMD 503 to invoke the AMAZON VAS when "Alexa" is spotted. As another example, the wake-word engine 571 may be configured to identify the wake word "Ok, Google" and cause the NMD 503 to invoke the GOOGLE VAS when "Ok, Google" is spotted. In single-VAS implementations, the VAS selector 574 may be omitted.

In response to the wake-word event (e.g., in response to the signal $S_W$ indicating the wake-word event), the voice extractor 572 is configured to receive and format (e.g., packetize) the sound-data stream $S_{DS}$. For instance, the voice extractor 572 packetizes the frames of the sound-data stream $S_{DS}$ into messages.

After the voice extractor 572 packetizes the frames of the sound-data stream Sips into messages, the NMD 503 may perform some form of extraction. The extraction may take various forms which will now be described.

According to one implementation, referred to as "extraction" (and as opposed to "local extraction"), the voice extractor 572 transmits or streams these messages, $M_V$, that may contain voice input in real time or near real time to a remote VAS, such as the VAS 190 (FIG. 1B), via the network interface 224. The VAS 190 may receive the messages of the sound-data stream from NMD 503 and any other NMDs that have identified a same wake word based on a detected sound.

According to the local extraction implementation, the voice extractor 572 transmits or streams these messages, $M_V$, that may contain voice input in real time or near real time to local (e.g., playback or network microphone) device on the same local area network as NMD 503 via the network interface 224. The local device receives messages of the sound-data stream from NMD 503 and any other NMDs that have identified a same wake word based and performs arbitration by selecting the NMD that identified the given wake word with the highest confidence level.

Figure 6:
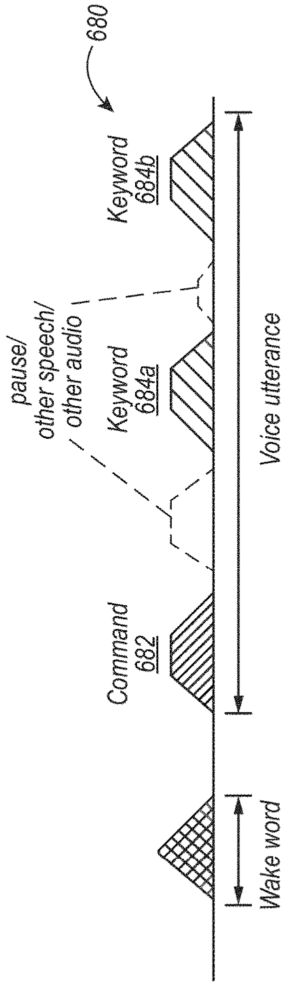
FIG. 6 is a diagram of an example voice input in accordance with aspects of the disclosure.

In any case, The VAS is configured to process the sound-data stream $S_{DS}$ contained in the messages $M_V$ sent from the NMD 503. More specifically, the VAS is configured to identify voice input based on the sound-data stream $S_{DS}$. Referring to FIG. 6, a voice input 680 may include a wake word portion 680*a* and a voice utterance portion 680*b*. The wake word portion 680*a* corresponds to detected sound that caused the wake-word event. For instance, the wake word portion 680*a* corresponds to detected sound that caused the wake-word engine 570 to output the wake word event signal $S_W$ to the voice extractor 572. The voice utterance portion 680*b* corresponds to detected sound that potentially comprises a user request following the wake-word portion 680*a*.

In the standard extraction implementation, the VAS may first process the wake word portion 680*a* within the sound-data stream Sips to verify the presence of the wake word. In some instances, the VAS may determine that the wake word portion 680*a* comprises a false wake word (e.g., the word "Election" when the word "Alexa" is the target wake word). In such an occurrence, the VAS may send a response to the NMD 503 (FIG. 5) with an indication for the NMD 503 to cease extraction of sound data, which may cause the voice extractor 572 to cease further streaming of the detected-sound data to the VAS. The wake-word engine 570 may resume or continue monitoring sound specimens until it spots another potential wake word, leading to another wake-word event. In some implementations, the VAS may not process or receive the wake word portion 680*a* but instead processes only the voice utterance portion 680*b*.

In any case, the VAS processes the voice utterance portion 680*b* to identify the presence of any words in the detected-sound data and to determine an underlying intent from these words. The words may correspond to a certain command and certain keywords 684 (identified individually in FIG. 6 as a first keyword 684*a* and a second keyword 684*b*). A keyword may be, for example, a word in the voice input 680 identifying a particular device or group in the MPS 100. For instance, in the illustrated example, the keywords 684 may be one or more words identifying one or more zones in which the music is to be played, such as the Living Room and the Dining Room (FIG. 1A). Command criteria may be based on the inclusion of certain keywords within the voice input, among other possibilities. Additionally, or alternately, command criteria for commands may involve identification of one or more control-state and/or zone-state variables in conjunction with identification of one or more particular commands. Control-state variables may include, for example, indicators identifying a level of volume, a queue associated with one or more devices, and playback state, such as whether devices are playing a queue, paused, etc. Zone-state variables may include, for example, indicators identifying which, if any, zone players are grouped.

To determine the intent of the words, the VAS is typically in communication with one or more databases associated with the VAS (not shown) and/or one or more databases (not shown) of the MPS 100. Such databases may store various user data, analytics, catalogs, and other information for natural language processing and/or other processing. In some implementations, such databases may be updated for adaptive learning and feedback for a neural network based on voice-input processing. In some cases, the voice utterance portion 680*b* may include additional information, such as detected pauses (e.g., periods of non-speech) between words spoken by a user, as shown in FIG. 6. The pauses may demarcate the locations of separate commands, keywords, or other information spoke by the user within the voice utterance portion 680*b*.

After processing the voice input, the VAS may send a response to the MPS 100 with an instruction to perform one or more actions based on an intent it determined from the voice input. For example, based on the voice input, the VAS may direct the MPS 100 to initiate playback on one or more of the playback devices 102, control one or more of these devices (e.g., raise/lower volume, group/ungroup devices, etc.), turn on/off certain smart devices, among other actions. After receiving the response from the VAS, the wake-word engine 570 of the NMD 503 (FIG. 5) may resume or continue to monitor the sound-data stream Sips until it spots another potential wake-word, as discussed above.

NMD 503 may also include a local arbitrator 576. Local arbitrator 576 may configure the NMD 503 to take various roles, such an arbitrator-related role. In an implementation, local arbitrator 576 may configure an NMD to be either an arbitrator or a non-arbitrator. If the NMD is configured to be an arbitrator, the NMD may perform some or all arbitration functions related to selecting a particular NMD amongst multiple NMDs (including itself) as the device from which VAS responses will be output and the source device from which sound data will be extracted, for instance based on determining that the particular NMD identified a given wake word with the highest confidence level. If the NMD is not configured to be a non-arbitrator, the NMD may be configured not to perform the function of arbitration, and to defer the function of performing arbitration to a local device that is designated as an arbitrator and/or to a remote network device, such as a VAS that is configured to perform arbitration. Local arbitrator 576 may designate an NMD as an arbitrator or non-arbitrator in various manners, for instance based on the NMD's role, based on a selection by a user, etc.

Local arbitrator 576 may determine whether to designate an NMD as an arbitrator or non-arbitrator based on receiving one or more messages, such as UPnP eventing messages, as one example. Local arbitrator 576 may determine whether to designate an NMD as an arbitrator or non-arbitrator in various other manners as well.

Returning to FIG. 5, in general, the one or more identification algorithms that a particular wake-word engine, such as the wake-word engine 570, applies are configured to analyze certain characteristics of the detected sound stream $S_{DS}$ and compare those characteristics to corresponding characteristics of the particular wake-word engine's one or more particular wake words. For example, a particular wake-word engine 570 may apply one or more identification algorithms to spot spectral characteristics in the detected sound stream $S_{DS}$ that match the spectral characteristics of the engine's one or more wake words, and thereby determine that the detected sound $S_D$ comprises a voice input including a particular wake word.

In some implementations, the one or more identification algorithms may be third-party identification algorithms (i.e., developed by a company other than the company that provides the NMD 103). For instance, operators of a voice service (e.g., AMAZON) may make their respective algorithms (e.g., identification algorithms corresponding to AMAZON's ALEXA) available for use in third-party devices (e.g., NMDs 103), which are then trained to identify one or more wake words for the particular voice service. Additionally, or alternatively, the one or more identification algorithms may be first-party identification algorithms that are developed and trained to identify certain wake words that may not be particular to a given voice service. Other possibilities also exist.

In practice, a wake-word engine may include a sensitivity level setting that is modifiable. The sensitivity level may define a degree of similarity between a word identified in the detected sound stream $S_{DS}$ and the wake-word engine 570's one or more particular wake words that is considered to be a match (i.e., that triggers the NMD 103 to invoke the corresponding VAS). In other words, the sensitivity level defines how closely, as one example, the spectral characteristics in the detected sound stream $S_{DS}$ must match the spectral characteristics of the engine's one or more wake words to be a wake-word trigger.

In this respect, the sensitivity level generally controls how many false positives that the wake-word engine 570 identifies. For example, if a wake-word engine 570 is configured to identify the wake-word "Alexa" with a relatively high sensitivity, then false wake words of "Election" or "Lexus" would cause the wake-word engine 570 to flag the presence of the wake-word "Alexa." On the other hand, if this example wake-word engine 570 is configured with a relatively low sensitivity, then the false wake words of "Election" or "Lexus" would not cause the wake-word engine 570 to flag the presence of the wake-word "Alexa."

In practice, a sensitivity level may take a variety of forms. In example implementations, a sensitivity level takes the form of a confidence threshold that defines a minimum confidence (i.e., probability) level for a wake-word engine that serves as a dividing line between triggering or not triggering a wake-word event when the wake-word engine is analyzing detected sound for its particular wake word. In this regard, a higher sensitivity level corresponds to a lower confidence threshold (and more false positives), whereas a lower sensitivity level corresponds to a higher confidence threshold (and fewer false positives). For example, lowering a wake-word engine's confidence threshold configures it to trigger a wake-word event when it identifies words that have a lower likelihood that they are the actual particular wake word, whereas raising the confidence threshold configures the engine to trigger a wake-word event when it identifies words that have a higher likelihood that they are the actual particular wake word. Other examples of sensitivity levels are also possible.

In example implementations, sensitivity level parameters (e.g., the range of sensitivities) for a particular wake-word engine can be updated, which may occur in a variety of manners. As one possibility, a VAS or other third-party provider of a given wake-word engine may provide to the NMD 503 a wake-word engine update that modifies one or more sensitivity level parameters for the given wake-word engine.

As another possibility, a remote server associated with the MPS 100 may update (or define in the first instance) sensitivity level parameters for a given wake-word engine, which it may do periodically or aperiodically. In some such cases, the remote server may define or otherwise update sensitivity level parameters for wake-word engines based on data regarding characteristics of detected sound (e.g., spectral and/or gain characteristics) associated with past occurrences of wake-word triggers (i.e., identifications of the respective particular wake-words for the given engines). In practice, the remote server may receive such data from NMDs when wake-word triggers occur or from another source of wake-word related sound data (e.g., Internet databases or the like). In any case, the remote server may be configured to perform operations based on such data (e.g., train predictive models and/or run simulations) to determine sensitivity parameters for a given wake-word engine to balance false positives and true identifications of the particular wake word.

In example embodiments, a wake-word engine 570 may take a variety of forms. For example, a wake-word 570 may take the form of one or more modules that are stored in memory of the NMD 503 (e.g., the memory 213; FIG. 2A). As another example, a wake-word engine 570 may take the form of a general-purpose or special-purpose processor, or a module thereof. In this respect, multiple wake-word engines 570 may be part of the same component of the NMD 103 or each wake-word engine may take the form of a component that is dedicated for the particular wake-word engine. Other possibilities also exist. If a wake-word engine 570 identifies the presence of a wake word in the detected sound stream $S_D$, the wake-word trigger signal $S_W$ may be passed to the voice extractor 572 to begin extraction for processing voice input, as discussed above.

With reference still to FIG. 5, an NMD may be configured as a playback device that includes the at least one audio interface 519, as discussed above. The audio interface 519 is generally configured to receive audio in a variety of forms from a variety of sources (e.g., an analog music signal or digital data of an Internet podcast). In this regard, the audio interface 519 may take the form of an analog and/or digital line-in receptacle that physically connects the NMD 503 to an audio source and/or may take the form of, or otherwise leverage, the network interface 224, that receive audio data via a communication network. In any case, the audio interface 519 provides an audio stream, $A_S$, to the audio output processing components 515, which in turn process the audio stream $A_S$ prior to the NMD 103 outputting processed audio, $A_P$, via the speakers 218. In this respect, the audio output processing components 515 may be the same or similar to the audio processing components 218 discussed above.

In some embodiments, one or more of the components described above can operate in conjunction with the microphones 222 to detect and store a user's voice profile, which may be associated with a user account of the MPS 100. In some embodiments, voice profiles may be stored as and/or compared to variables stored in a set of command information or data table. The voice profile may include aspects of the tone or frequency of a user's voice and/or other unique aspects of the user, such as those described in previously-referenced U.S. patent application Ser. No. 15/438,749.

In some embodiments, one or more of the components described above can operate in conjunction with the microphones 222 to determine the location of a user in the home environment and/or relative to a location of one or more of the NMDs 103. Techniques for determining the location or proximity of a user may include one or more techniques disclosed in previously-referenced U.S. patent application Ser. No. 15/438,749, U.S. Pat. No. 9,084,058 filed Dec. 29, 2011, and titled "Sound Field Calibration Using Listener Localization," and U.S. Pat. No. 8,965,033 filed Aug. 31, 2012, and titled "Acoustic Optimization." Each of these applications is herein incorporated by reference in its entirety.

In some embodiments, the MPS 100 is configured to temporarily reduce the volume of audio content that it is playing while identifying the wake word portion 610 of a voice input. For instance, the MPS 100 may restore the volume after processing the voice input 600. Such a process can be referred to as ducking, examples of which are disclosed in previously-referenced U.S. patent application Ser. No. 15/438,749.

III. Example Local Arbitration and Designation of VAS Response Playback

Further examples of local arbitration and designation of a playback device to output a VAS response with will now be described in detail. As discussed above, multiple playback or NMDs devices may combined in various manners. For example, NMD-equipped playback devices 102 may be bonded to form a "bonded set." In a bonded set, a playback device may have a different playback responsibility than another playback device in the set. For instance, a first playback device of a bonded set may be responsible for audio playback of a left audio channel, and a second playback device may be responsible for playback of a right audio channel. An example of such a bonded set is shown and described above in connection with FIG. 3B. As another example of a bonded set, a third playback device of a bonded set may be responsible for playback of a center audio channel, such as the front playback device 102*b*, such as shown and described above in connection with FIGS. 3C and 3D. In some implementations, a left channel device (or alternatively a right channel device) in a stereo pair may be selected as the arbitrator NMD. In a similar fashion, one of a left, right, or center channel device may be selected as an arbitrator NMD in a home theater implementation.

In various implementations, implementing an arbitrator NMD in a bonded set may prevent the ping-pong effect. Further, an arbitrator NMD may conserve bandwidth by reducing the number of NMDs that communicate with a VAS when multiple NMDs identify a same wake word. In addition, or alternatively, an NMD may also be designated as the arbitrator NMD for a set of NMD-equipped playback devices comprising a group of playback devices in which none or only some of the playback devices are assigned a playback responsibility.

Turning to the example illustrated in FIG. 3D, front playback device 102*b* is bonded with SUB playback device 102*k*, and right and left playback devices 102*a* and 102*j*, respectively. In the examples now described, the playback devices 102*a*, 102*b*, and 102*j* are NMD-equipped playback devices and are referred to as playback devices for purposes of the following discussion. Also, while specific reference is made to FIG. 3D for the purpose of illustrating examples of arbitration and VAS response playback in the context bonded set, it should be understood that any of the techniques described herein may describe any configuration of bonded NMDs, playback zones comprised of multiple NMDs, or other media playback system configurations.

In the context of FIG. 3D, each of the NMD-equipped playback devices 102 in FIG. 3D may be configured to detect sound (i.e. audio waves) comprising ambient and/or background noise and which may also comprise speech intended to be processed by any of NMDs 102*a*, 102*b*, or 102*j*. The detected sound may be input into a voice capturing module, such as VCC 510 where the audio may undergo various types of pre-processing, spatial processing, etc., before buffers, such as buffers 568, and 569 capture data corresponding to the detected sound.

In example embodiments, at least one of the playback devices 102 may comprise a device, such as the arbitrator NMD, which may be the default NMD for outputting VAS responses in a set of NMDs. While the arbitrator NMD is described according to various examples as the default NMD for outputting VAS responses, it should be understood that devices other than the arbitrator NMD may also be designated as the default device for outputting VAS responses.

The arbitrator NMD may also be responsible for selecting which of NMDs 102 that is to extract detected-sound data for evaluation by a VAS. In some examples, the arbitrator NMD may be an NMD that has a greater amount of computational resources (e.g., processing power, memory, storage, etc.). In some examples, a device other than the arbitrator NMD may be configured to extract the detected-sound data.

For example, in some implementations, the arbitrator NMD may be assigned during the configuration of the media playback system that includes the two or more NMDs, which may be arranged as a bonded set. According to an implementation, UPnP eventing may be used to set the value of a state indicator that specifies the identity of the arbitrator NMD to a VAS and/or to other playback devices on a same network as the arbitrator NMD. A user may also manually specify the arbitrator NMD during the configuration of the media playback system. In some cases, the arbitrator responsibilities may be assigned to a given NMD in the set based on the NMD's role or hardware resources.

In some implementations, the arbitrator responsibilities may be assigned to a given NMD based on other considerations. For instance, the arbitrator responsibilities may be assigned to an NMD that has already been assigned other responsibilities within the media playback system. As one example, an NMD designated as the "group coordinator" that is responsible for facilitating synchronous playback of audio among the two or more NMDs may be assigned arbitrator responsibilities as well. As another example, an NMD designated as the "primary" device that is responsible for playing back a given audio channel, such as the center channel (e.g., playback device 102*j*) of a home theatre setup or either the left channel of a stereo pair setup, may also be assigned the arbitrator responsibilities.

In any case, in accordance with example embodiments provided herein, local arbitration may generally involve two or more NMD-equipped playback devices (e.g., NMD-equipped playback devices 102*a*, 102*b*, and 102*j*) of the media playback system identifying a particular wake word, the arbitrator NMD (e.g., NMD-equipped playback device 102*b*) selecting one of the NMD-equipped playback devices to extract detected-sound data that may include a voice input for evaluation by the VAS, and after evaluation of the detected-sound data by the VAS, the arbitrator NMD playing back a VAS response indicated by VAS response data generated by the VAS.

More specifically, in an example implementation, each non-arbitrator device (e.g., NMD-equipped playback devices 102*b* and 102*j*) NMD that identifies a particular wake word may transmit to the arbitrator NMD a notification that a wake word was identified. In some examples, a given notification may include a confidence level that the given non-arbitrator NMD identified the particular wake word correctly. In the case that an identifying NMD is the arbitrator NMD, the arbitrator NMD may not transmit a message that includes a confidence level but instead may generate an internal notification, which may include a confidence level that the arbitrator NMD identified the wake word correctly.

In practice, a confidence level may take various forms. For example, the confidence level may be metadata such as a metric calculated based on audio properties of the received wake word. Examples of some such metrics that may be used to calculate the confidence level may include a signal-to-noise ratio (SnR), a frequency spectrum of the identified wake word, a direction of the identified wake word, an amplitude (e.g., decibel level) of the identified wake word, etc. A confidence level may take various other forms as well.

In turn, the NMD-equipped playback device comprising the arbitrator NMD receives each of the notifications. Based on these notifications received, the arbitrator NMD may determine that more than one of the NMD-equipped playback devices 102 has identified the wake word at the same time. In response to this determination, the arbitrator NMD may next select which of the identifying NMDs is to extract the detected-sound data that may include a voice input for evaluation by the VAS. The arbitrator NMD may make this selection in various manners.

As one example, if the notifications include respective confidence levels in their identification of the wake word, the arbitrator NMD may select the NMD having the highest confidence level. For instance, if the NMD-equipped playback device 102*a* identifies the wake word with a higher confidence level than the arbitrator NMD, the arbitrator NMD may select that playback device over all other playback devices of the set. As another example, if the NMDs have differing roles, the arbitrator NMD 102*b* may use these roles as a basis for selecting which of the NMDs is to extract detected-sound data. For instance, if the NMD of NMD-equipped playback device 102*j* has a group coordinator role in the bonded set in FIG. 3D, the arbitrator NMD may select NMD 102*j*. Other examples of selecting the extraction NMD are also possible.

After selecting an NMD to extract the detected-sound data, the arbitrator NMD may cause the selected NMD to extract the detected-sound data that may include the voice input for evaluation by the VAS. In this respect, it should be understood that the extraction NMD may differ from, or be the same as, the arbitrator NMD that is designated to output a voice output. The process of causing the selected NMD to extract the detected-sound data may take various forms.

As one example, if the arbitrator NMD selects a non-arbitrator NMD such as the NMD-equipped playback device 102*b*, then the arbitrator NMD may send an instruction to this non-arbitrator NMD to extract the detected-sound data that may include a voice input for evaluation by the appropriate VAS. As another example, if the arbitrator NMD selects itself for extraction, then the arbitrator NMD 102*b* may trigger its internal voice capture components (e.g., VCC 510) to extract the detected-sound data for evaluation by the VAS.

After extracting the detected-sound data, the selected NMD may format the detected-sound data into a sound-data stream and transmit the sound-data stream containing at least the detected-voice data that may include a voice input (and perhaps also the wake word) to the VAS either directly via a communication network that couples the VAS and the media playback system or indirectly via the arbitrator NMD. In this respect, only one NMD or NMD-equipped playback device transmits a sound-data stream to the VAS, which consumes significantly less bandwidth than when multiple devices make such transmission.

After receiving the voice utterance of the voice input, the VAS may generate a VAS response that is based at least on the voice utterance of the voice input. In this regard, the VAS advantageously only has to process a single sound-data stream from the media playback system and does not need to perform analyses related to remote arbitration, which may help to conserve the VAS' compute resources.

Thereafter, the VAS may determine the identity of the arbitrator NMD 102*b* and send to the arbitrator NMD 102*b* a message including, or otherwise indicating, the VAS response via the communication network.

The VAS may determine the identity of the arbitrator NMD 102*b* in various different manners. According to an embodiment, the VAS may identify the arbitrator NMD 102*b* via UPNP. As one example, UPNP eventing may be used to set the value of a state indicator that specifies the identity of the arbitrator NMD 102*b* to the VAS. In practice, the group coordinator of a bonded set may be the arbitrator NMD. The VAS may determine the identity of the arbitrator NMD in various other manners as well.

After receiving the VAS response message, the arbitrator NMD outputs the VAS response. In this way, the media playback system exhibits a more predictable behavior that aligns with users' expectations. Outputting the VAS response may comprise playing back spoken words, audible tones, and/or various other forms of audio played back in response to a voice input. Outputting the VAS response may also take the form of outputting various visual signals such as one or more lights, outputting graphics on a display, etc. Some of these VAS responses may indicate whether the VAS and/or the NMD will perform a given action (e.g., begin music playback, output requested information, etc.) specified by the voice utterance of the voice input. VAS responses may take various other forms as well.

In line with the above discussion, and with reference to FIG. 5, the playback device 102*a* configured with components and functionality of an NMD 103 may include an audio output interface 530, a network interface 230, at least one processor (e.g. VCC 510, wake-word engine 520, etc.), and at least one microphone 224 each which is configured to detect sound.

IV. Example Use Cases

Figure 7A:
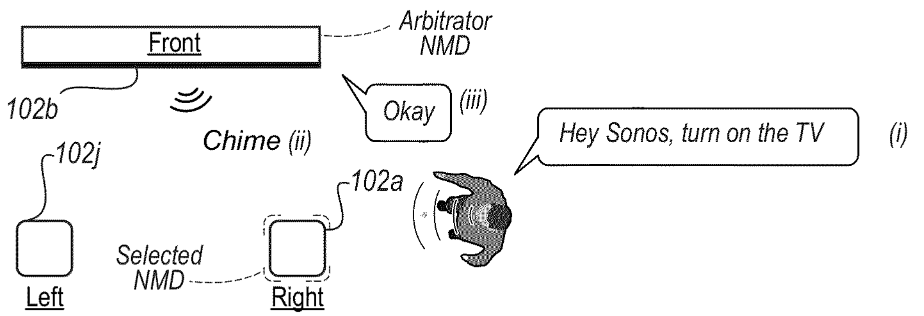
FIG. 7A is a conceptual diagram of an example network system configured in accordance with aspects of this disclosure.

Turning now to FIG. 7A, a conceptual diagram of an example set of NMD-equipped playback devices of a network system configured in accordance with aspects of this disclosure is depicted. The example depicted in FIG. 7A depicts a use case in a network media playback system is configured to perform localized arbitration and has a designated arbitrator NMD for at least a subset of playback devices of the media playback system.

The network media playback system depicted in FIG. 7A includes the right playback device 102*a*, the front playback device 102*b*, and the left playback device 102*j*, which may be collectively referred to as "playback devices 102." While playback devices 102 are described as being playback devices, some or all of playback devices 102 may also be or may include NMDs. In the network media playback system depicted in FIG. 7A, front playback device 102*b* is designated as the arbitrator NMD.

An example behavior of a set of NMD-equipped playback devices of a media playback system in response to a user speaking a voice input comprising a voice input comprising a wake word and a voice utterance will now be described in greater detail. In the illustrated example of FIG. 7A, the front playback device 102*b* is the arbitrator NMD.

In the example of FIG. 7A, the user speaks a wake word, such as "Hey Sonos," or another suitable wake word, such as "Hey Google" or "Alexa" which some or all of playback devices 102 may have detected. The wake word may have been followed by the voice utterance "Turn on the TV" (event "i"). In the illustrated example of FIG. 7A, the front playback device 102*b* outputs a confirmation, such as by playing a chime (event "ii"), indicating that the voice input was detected. In one aspect, the front playback device 102*b* is the only playback device in the set of playback devices 102 that plays the chime, including cases in which the front playback device 102*b* itself did not detect the voice input. In this example, each of the playback devices that detected the given wake word begin performing local extraction by sending data including a confidence level and sound-stream data captured by a given playback device to the arbitrator NMD, which is the front playback device 102*b*.

After receiving the confidence levels from each of the playback devices, the front playback device 102*b* selects the playback device which identified the given wake word with the highest confidence level, the right playback device 102*a* in this example, to perform local extraction. In some examples, the right playback device 102*a* may send instructions to cause the non-selected playback device 102*j* to cease performing local extraction. Playback device 102*b* may send an instruction to cause left playback device 102*a* to perform local extraction.

In any case, after selecting the right playback device 102*a* to perform local extraction, the front playback device 102*b* sends the extracted sound-data stream received from the right playback device 102*a* to a remote network device, such as VAS 190, which in turn determines the intent of the voice input included in the sound-data stream and sends voice output response data back to the arbitrator NMD, which is the front playback device 102*b* in this example.

In turn, the front playback device 102*b* generates a voice output response which may take the form of an audio or visual response based on the voice output response data received from VAS 190. In the example of FIG. 7A, the VAS response may take the form of an audio response, such as the word "Okay" (event "iii"). Finally, the arbitrator NMD, the front playback device 102*b*, outputs the VAS response via a speaker component of the front playback device 102*b*.

Figure 7B:
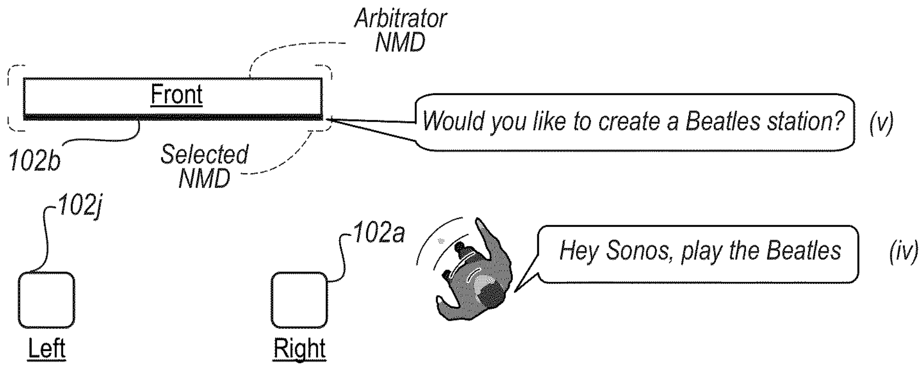
FIG. 7B is a conceptual diagram of an example network system configured in accordance with aspects of this disclosure.

Turning now to FIG. 7B, another conceptual diagram of an example set of NMD-equipped playback devices of a network system configured in accordance with aspects of this disclosure is depicted. The example depicted in FIG. 7B depicts a use case in which network media playback system is configured to perform localized arbitration and has a designated arbitrator NMD.

The network media playback system depicted in FIG. 7B includes the same playback devices 102 as illustrated in FIG. 7A. In the network media playback system depicted in FIG. 7B, the front playback device 102*b* may be designated as the arbitrator NMD. An example behavior of the media playback system depicted in FIG. 7B in response to a user speaking a voice input comprising a voice input comprising a wake word and a voice utterance will now be described.

In the example depicted in FIG. 7B, the user speaks a wake word, "Hey Sonos," or other suitable wake word, such as "Hey Google" or "Alexa" which some or all of playback devices 102 may have detected, followed by the voice utterance "Play the Beatles" (event "iv"). In this example, each of the playback devices that detected the given wake word begin performing local extraction by sending data including a confidence level and extracted sound-stream data captured by a given playback device to the arbitrator device, which is the front playback device 102*b*. The front playback device 102*b* may also play a chime (not shown) as described above, indicating that the voice input was detected.

After receiving the confidence levels from each of the playback devices, the front playback device 102*b* selects the playback device which detected the given wake word with the highest confidence level, which is the front playback device 102*b* itself in this example, to perform local extraction. In some examples, in addition to selecting itself to perform local extraction, the front playback device 102*b* may send instructions to cause non-selected playback devices 102*a* and 102*j* to cease performing local extraction.

In any case, after the front playback device 102*b* selects itself to perform local extraction, the front playback device 102*b* sends the sound-data stream extracted locally to a remote network device, such as VAS 190, which in turn determines the intent of the voice input included in the sound-data stream and sends VAS response data back to the arbitrator device, which is the front the playback device 102*b*.

In turn, the front playback device 102*b* generates a VAS response which may take the form of an audio or visual response based on the VAS response data received from VAS 190. In the example of FIG. 7B, the generated VAS may take a form of spoken audio such as "Would you like to create a Beatles station?" (event "v"). Finally, the arbitrator device, front playback device 102*b*, outputs the VAS response via speakers of the front playback device 102*b*.

Figure 8A:
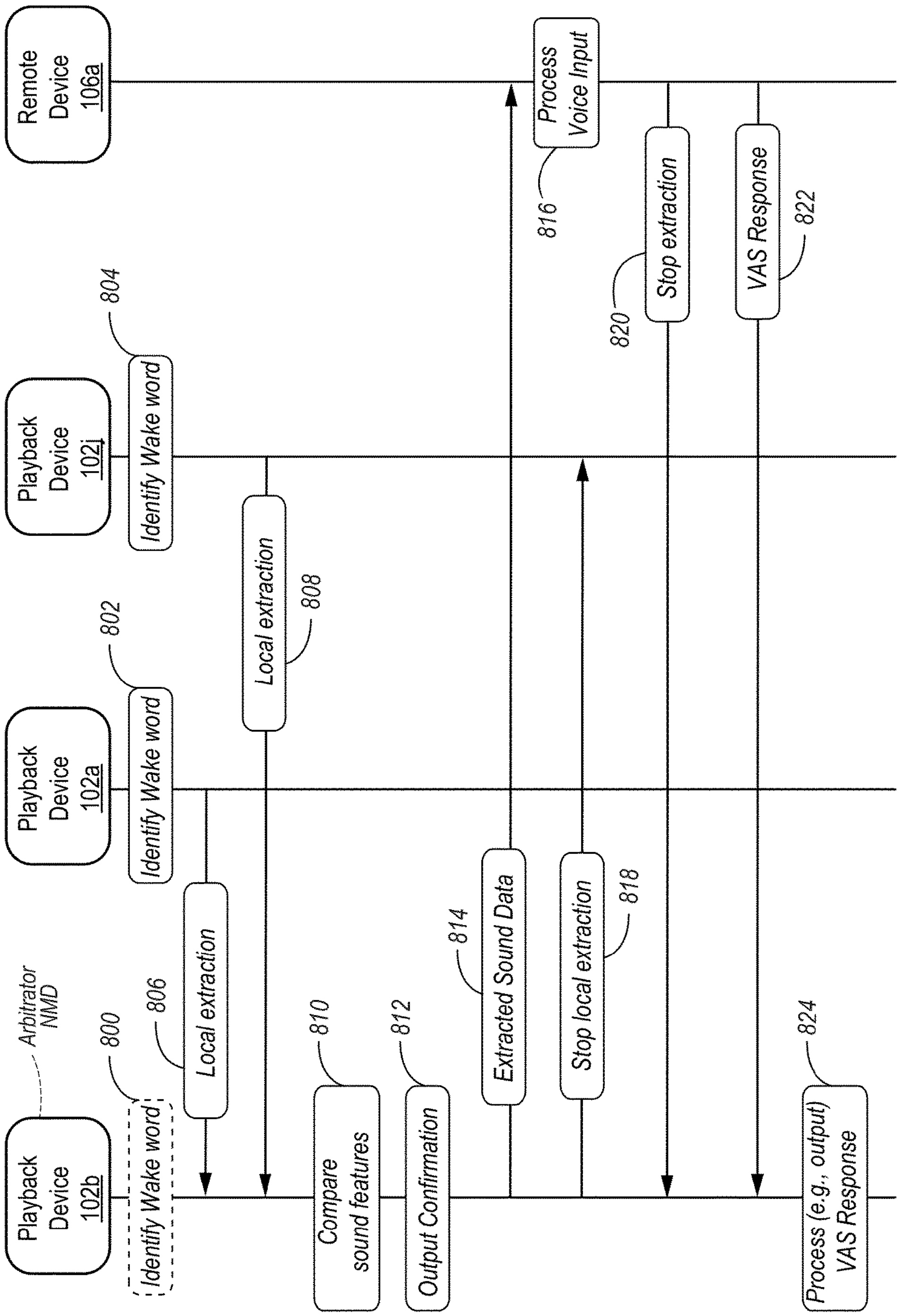
FIG. 8A is a message flow diagram for a network system configured to perform arbitration in accordance with aspects of the disclosure.
Figure 8B:
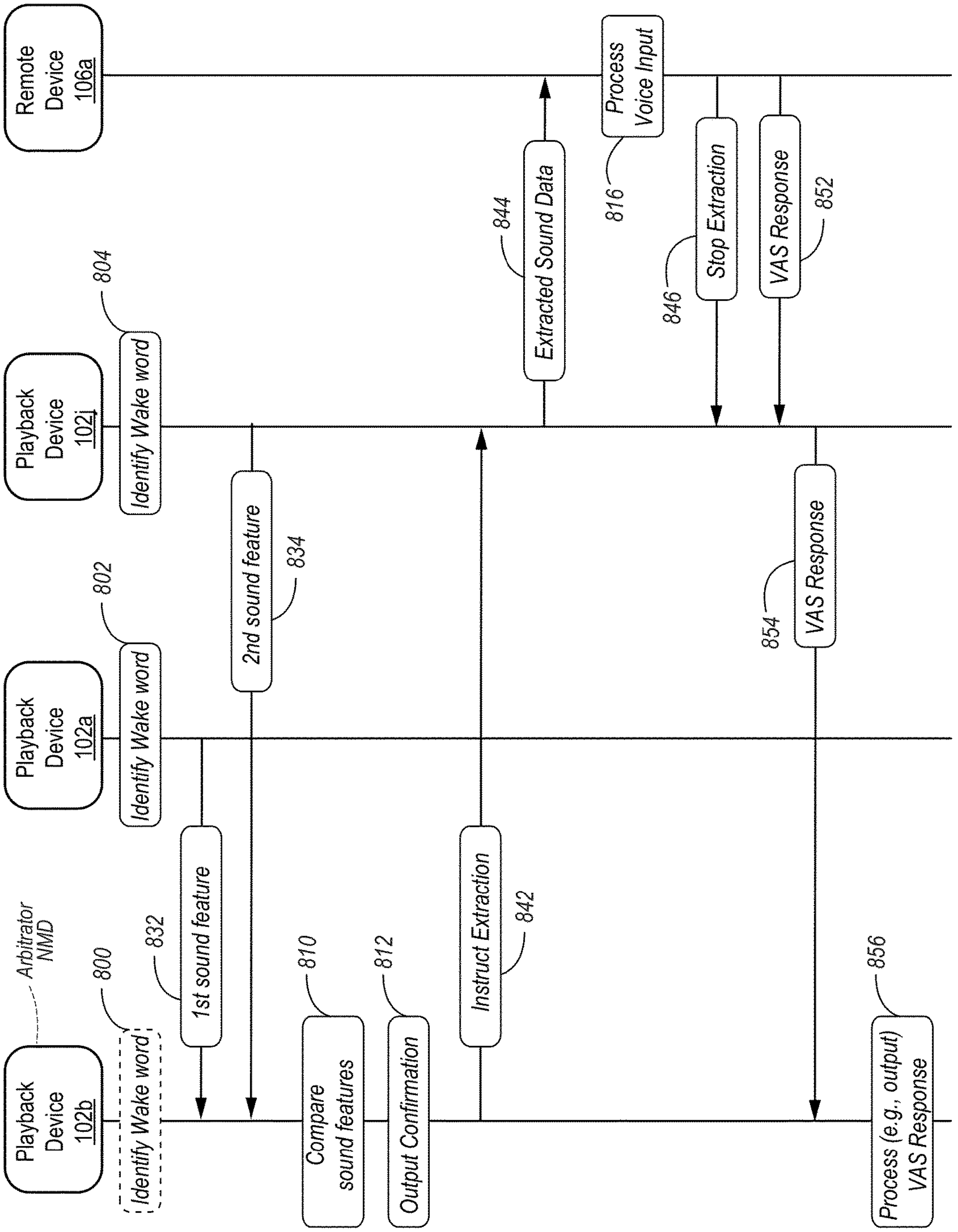
FIG. 8B is an example message flow diagram for a network system configured to perform arbitration in accordance with aspects of the disclosure.

Turning now to FIGS. 8A and 8B, example message flow diagrams for performing local arbitration between two or more playback devices in accordance with this disclosure are depicted. The message flow diagrams may correspond to implementations shown in one or both of FIGS. 7A and 7B. At a high level, FIG. 8A depicts a flow of data among NMD-equipped playback devices 102*a*, 102*b*, 102*j*, and a remote device 106*a* in which playback device 102*b* is the arbitrator NMD.

To begin the flow illustrated in FIG. 8A, each of playback devices 102*a*, and 102*j* may identify wake words 802 and 804, respectively. Also optionally, at block 800, the playback device 102*b* may also identify a same wake word as the playback devices 102*a* and 102*j*. After identifying wake words 802 and 804, at block 806, the playback device 102*a* may perform local extraction by sending sound features that are related to identifying the given wake word, and may be used to determine a confidence level, as well as an extracted sound-data stream to the playback device 102*b*. At block 808, the playback device 102*j* may also perform local extraction by sending metadata related to identifying the given wake word, such as a confidence level, as well as an extracted sound-data stream to the playback device 102*b*.

Next, at block 810, the playback device 102*b* may compare sound features (e.g., as part of performing arbitration), such as confidence levels included in the sound features received from the playback device 102*a* and the playback device 102*j* and may select the playback device that detected the given wake word with the highest confidence level, which in this example is playback device 102*a*.

In some examples, after selecting a playback device, the arbitrator NMD, in this case playback device 102*b*, may output a confirmation 812 to indicate to any users that playback device 102*b* is designated as the arbitrator NMD and as such users should expect playback device 102*b* to generate and output any VAS responses. Outputting a VAS response take various forms. As an example, the VAS response may take the form of an audio indication (e.g., a voice response) and/or visual indication that playback device 102*b* may output. Outputting a VAS response may take various other forms as well.

At block 814, the playback device 102*b* may transmit the extracted sound data, (e.g., an extracted sound-data stream) received from the selected playback device 102*a* to the remote device 106*a*. At block 816, the remote device 106*a*, which may comprise a VAS, may process the voice input included in the extracted sound data 814 received from playback device 102*b*.

At block 818, the playback device 102*b* may transmit an instruction to cause playback device 102*j* to stop local extraction 818 due to the playback device 102*b* selecting playback device 102*a* to perform local extraction rather than playback device 102*j*. While block 818 is illustrated as occurring after block 814 and block 816, block 818 may occur before or between either of these blocks as well.

At block 820, after receiving sufficient extracted sound data to process the voice input, remote device 106*a* may transmit message 820 to cause the playback device 102*b* to stop extraction. Playback device 102*b* may, in turn, send a message to the selected playback device 102*a* to cause the playback device 102*a* to stop performing local extraction (not pictured for the sake of clarity).

At block 822, the playback device 102*b* may receive VAS response data, and based on the received VAS response data, the playback device 102*b* may process (block 824) a VAS response, which may comprise outputting a VAS response, based on the received VAS response data.

Turning now to FIG. 8B, another example message flow diagram of performing arbitration between two or more playback devices in accordance with this disclosure is depicted. At a high level, FIG. 8B depicts a flow of data among the playback devices 102*a*, 102*b*, 102*j*, and the remote device 106*a* in which the playback device 102*b* is an arbitrator NMD.

To begin the flow illustrated in FIG. 8B, at blocks 802 and 804, each of the playback devices 102*a*, and 102*j* may identify wake words. Also optionally, at block 800, the playback device 102*b* may also identify a same wake word as the playback devices 102*a* and 102*j*. Then, at block 832, after identifying the respective wake words at block 802 and 804, the playback device 102*a* may send a first sound feature of the first wake word by sending metadata related to identifying the given wake word, such as a confidence level, to the playback device 102*b*. At block 834, the playback device 102*j* may send a second sound feature by sending metadata related to identifying the given wake word, such as a confidence level, to the playback device 102*b*.

Next, at block 810, the playback device 102*b* may compare sound features, such as the received confidence levels included in the first and second sound features received from the playback device 102*a* and the playback device 102*j*, and optionally sound features detected by the playback device 102*b* itself, and may select the playback device that detected the given wake word with the highest confidence level, which may be the playback device 102*j* in the example of FIG. 8B.

In some examples, at block 812, after selecting a playback device, the arbitrator NMD, in this case the playback device 102*b*, may output a confirmation to indicate to any users that the playback device 102*b* is designated as the arbitrator NMD and as such, users should expect the playback device 102*b* to generate and output any VAS outputs. Outputting a confirmation may take various forms. As an example, the output confirmation may take the form of an audio indication (e.g., a voice response) and/or visual indication that the playback device 102*b* may output.

At block 842, the playback device 102*b* may transmit an instruction to cause the selected playback device 102*j* to begin performing extraction. In turn, at block 844, the playback device 102*j* may transmit extracted sound data, which may take the form of a sound-data stream, to the remote device 106*a*.

After the remote device 106*a* receives the extracted sound data, the remote device 106*a* may process the voice input 816 included in the extracted sound data received from the playback device 102*j*. Then, at block 846, after receiving sufficient extracted sound data to process the voice input, the remote device 106*a* may transmit a message to cause the playback device 102*j* to stop extraction.

Then, at block 852, remote device 106*a* may send a VAS response to the playback device 102*j*. Playback device 102*j*, in turn, transmits the VAS response data to the playback device 102*b* (block 854), which is designated as the arbitrator.

At block 856, the playback device 102*b* may receive VAS response data, and based on the received VAS response data, the playback device 102*b* may process (block 856) a VAS response, such as outputting a voice response, based on the received VAS response data.

In various implementations, the arbitrator NMD may also identify wake words as shown at block 800 in FIGS. 8A and 8B. In cases in which the arbitrator NMD determines that it has identified a wake word with the highest confidence level among one or more NMDs in a set, the arbitrator NMD may trigger its internal voice capture components to extract the detected-sound data for evaluation of a voice input by the VAS, while any of the other NMD(s) that were not selected do not extract their respective detected-sound data, such as in the manner described above.

In some implementations, NMDs and/or NMD-equipped playback devices may interact with one or more remote servers for remote arbitration between sets of devices (e.g., between two arbitrator NMDs of different sets of NMD-equipped playback devices) and/or between a set of devices and one or more NMDs that are not part of the set. In any case, each NMD that is configured to interact with the remote VAS for such arbitration may detect sound, capture detected-sound data in a respective buffer, identify the same wake word, and extract the detected-sound data that may include a voice input from the respective buffer. They may then send their respective extracted detected-sound data and voice inputs in the form of a detected-sound data stream to a VAS that determines which one NMD identified the wake word with a higher level of confidence.

Figure 9A:
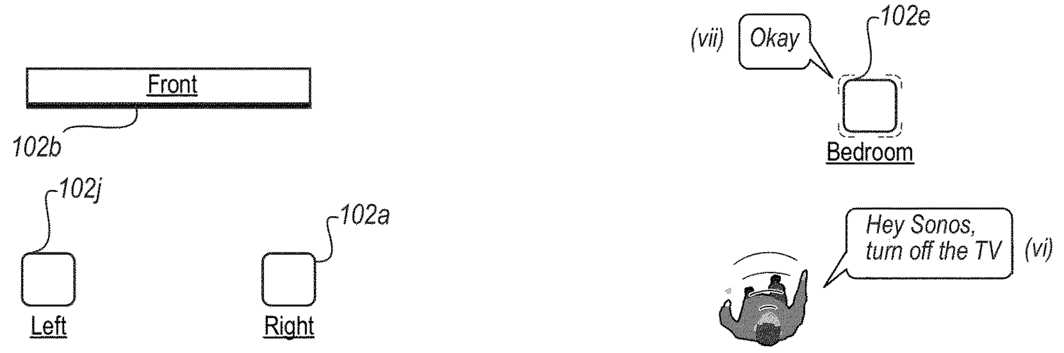
FIG. 9A is a conceptual diagram of an example network system configured in accordance with aspects of this disclosure.

Referring to FIG. 9A, another conceptual diagram of an example set of NMD-equipped playback devices of a network system configured in accordance with aspects of this disclosure is depicted. The example of FIG. 9A depicts a use case in a which network media playback system is configured to perform local arbitration for a bonded set that has a designated arbitrator NMD, and a VAS may be configured to perform subsequent remote arbitration between the local arbitrator NMD and the playback device 102*e* that is not part of bonded the set associated with the arbitrator NMD.

The network media playback system depicted in FIG. 9A includes a bonded set comprising playback devices 102*a*, 102*b*, and 102*j*. The network media playback system also includes the NMD-equipped playback device 102*e* that belongs to a "bedroom" zone group and that is not part of the set comprising the playback devices 102*a*, 102*b*, and 102*j*. The front playback device 102*b* may be designated as the arbitrator NMD for the bonded set, and a VAS may be configured to arbitrate between the playback device 102*e* belonging to the zone group and the bonded set comprising the playback devices 102*a*, 102*b*, and 102*j*.

An example behavior of media playback system in response to a user speaking a voice input comprising a voice input comprising a wake word and a voice utterance will now be described. In the example of FIG. 9A, the user speaks a wake word, "Hey Sonos," or other suitable wake word, such as "Hey Google" or "Alexa" which some or all of the playback devices 102 may have identified. The followed by the voice utterance "Turn off the TV" (event "vi"). In this example, each of the playback devices in the bonded set that identified the given wake word begin performing local extraction by sending data including a confidence level and sound-stream data captured by a given playback device to the arbitrator NMD, which is the front the playback device 102*b*.

After receiving the confidence levels from each of the playback devices, the front playback device 102*b* selects the playback device which detected the given wake word with the highest confidence level. As an example, the left playback device 102*a* may have detected the given wake word with the highest level, and consequently the front playback device 102*b* may select the left playback device 102*j* to perform local extraction for the bonded set and may transmit an extracted sound-data stream from the selected left playback device 102*j* to the VAS for arbitration and voice processing. In some examples, as a result of selecting the left playback device 102*a* to perform local extraction, the front playback device 102*b* may send instructions to cause the non-selected playback device 102*j* and itself, to cause them to cease performing local extraction.

In addition to the local arbitration performed by the bonded set, the playback device 102*e* from the Bedroom zone group also detects the given wake word and may perform extraction by sending data indicating a confidence level determined associated with the identifying the given wake word and sound-stream data captured by the playback device 102*e* to a VAS for arbitration and voice processing.

After the VAS receives the confidence levels from the selected playback devices, namely the playback device 102*e* of the Bedroom zone group and the left playback device 102*j*, the VAS performs arbitration by selecting the playback device from the Bedroom zone group or the bonded set that detects the given wake word with the highest confidence level. In this example, the playback device 102*e* of the Bedroom zone group detects the given wake word with the highest confidence level.

After selecting the playback device 102*e*, VAS 190 determines the intent of the voice input included in the extracted sound-data stream received from the playback device 102*e* and also sends voice output response data back to the selected device, which is the playback device 102*e* in this example. In some examples, VAS 190 may also send an instruction to cause the device a non-selected device, such as the left playback device 102*j* or the front playback device 102*b* and/or not to output a VAS response.

After the selected playback device 102*e* receives the voice output data, playback device 102*e* generates a VAS response which may take the form of an audio or visual response based on the voice output response data received from VAS 190. In the example of FIG. 9A, the generated voice output response may take the form of a VAS response such as "Okay" (event "vii"). Finally, the arbitrator NMD, the playback device 102*e* of the Zone group, an audio interface of the playback device 102*e* outputs a voice output response via speakers of the playback device 102*e*.

Figure 9B:
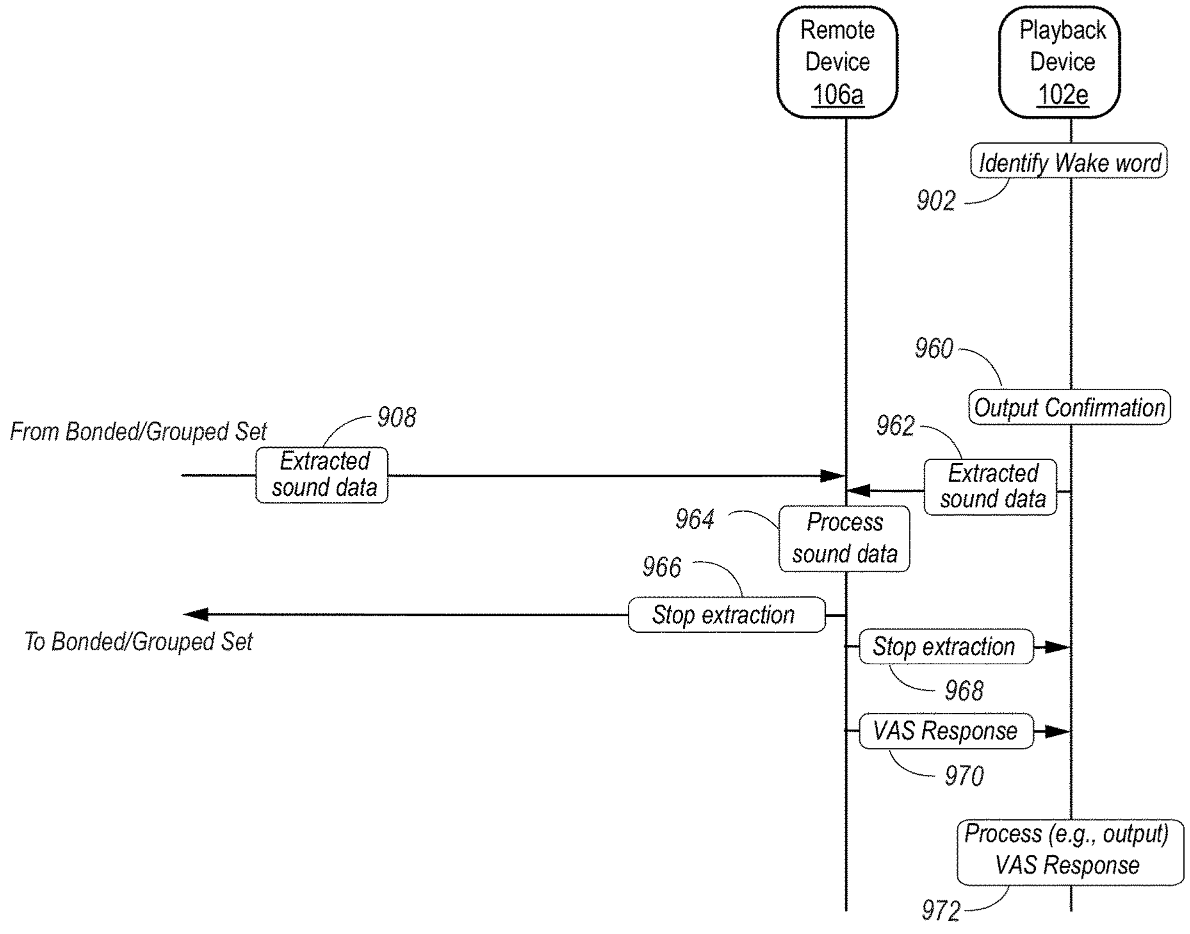
FIG. 9B is an example message flow diagram for a network system configured to perform arbitration in accordance with aspects of the disclosure.

Turning now to FIG. 9B, another example message flow of performing local arbitration between two or more playback devices followed by remote arbitration with one or more additional playback devices in accordance with this disclosure is depicted. At a high level, FIG. 9B depicts an extracted sound stream provided to the remote device 106*a*. FIG. 9B may be one example among others of messages exchanged during the implementation depicted in FIG. 9A.

To begin the flow illustrated in FIG. 9B, at block 902 the playback device 102*e* identifies a wake word. Additionally, one or more of the playback devices 102*a*, 102*b*, and 102*j* (not shown) has identified the wake word, and the local arbitrator of that set of devices may initiate extraction, such as in a manner described above. For example, the playback device 102*a* may perform local extraction by sending extracted sound data to playback device 102*b*, which ultimately extracts the detected sound data to the remote VAS, as shown at block 908.

At block 960, and after identifying the wake word at block 902, the playback device 102*e* may also output a confirmation, which may be similar to the confirmation output by the playback device 102*b*. At block 962, the playback device 102*e* may transmit its own locally-extracted sound data, which may take the form of metadata that may include sound features that may define a confidence level, as well as an extracted sound-data stream, to the remote device 106*a* for arbitration.

At block 964, after receiving extracted sound data from the playback device 102*e* and the bonded set of playback devices, the remote device 106*a* may processes the received extracted sound data. Processing the extracted sound data further includes processing the voice input included in the extracted sound data received from the playback device 102*b* that identified the given wake word with the highest confidence level. Additionally, block 964 may include the remote device 106*a* performing arbitration between the playback device 102*e* and the arbitrator NMD (the NMD-equipped playback device 102*b*, not pictured) of the bonded set of playback devices. More particularly in the example of FIG. 9B, to perform arbitration, the remote device 106*a* may select the playback device from either the zone group that includes the playback device 102*e* or the bonded set that includes the playback devices 102*a*, 102*b*, and 102*j* that identified the given wake word with the highest confidence level, which in this example is the playback device 102*e*. Upon selecting the playback device 102*e*, the remote device 106*a* may send an instruction to stop extraction from non-selected device(s), such as shown at block 966, upon the remote device 106*a* selecting the playback device 102*e* over the set of the playback devices 102*a*, 102*b*, and 102*j*.

At block 968, after receiving sufficient extracted sound data to process the voice input, the remote device 106*a* may transmit a message to cause the playback device 102*e* to stop extraction. Then, at block 970, remote device 106*a* may send VAS response data to the playback device 102*e*.

Finally, at block 972, the playback device 102*e* may receive the VAS response data, and based on the received VAS response data, may process (e.g., output) a VAS response based on the received VAS response data.

As another example, if the remote device 106*a* determines that the bonded set of playback devices detected the wake word with a higher confidence level than the playback device 102*e*, the remote device 106*a* can process extracted sound data that it receives from the bonded set (and cease extraction from the playback device 102*e*). The remote device 106*a* can then provide a VAS response to the arbitrator NMD, as described above.

V. Example Local Arbitration and Output Designation Flow Diagram

Figure 10:
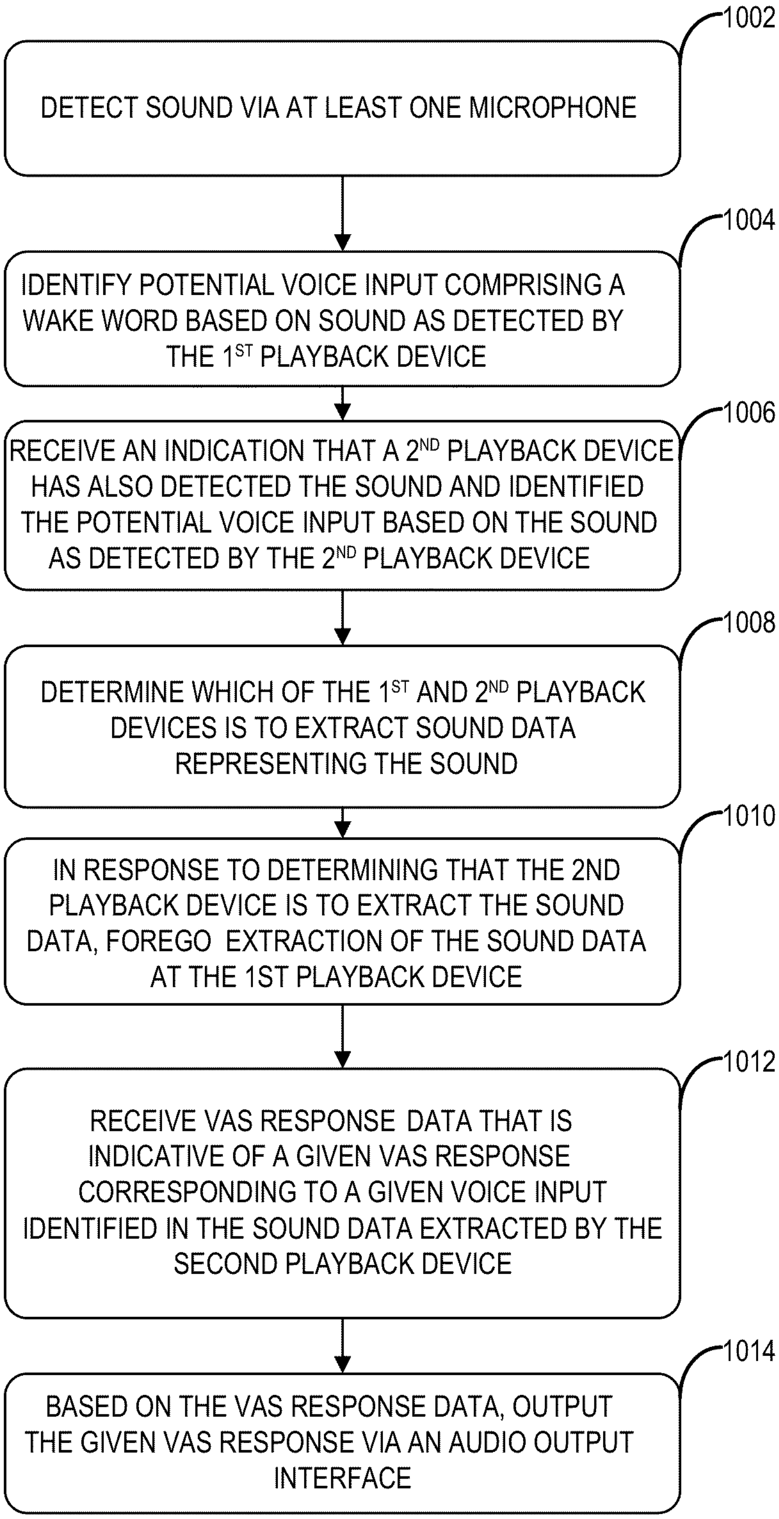
FIG. 10 is a flow diagram of an example method for performing local arbitration and designating voice output playback in accordance with aspects of the disclosure.

For purposes of illustration only, an example method 1000 for locally arbitrating between two or more playback devices in accordance with this disclosure is depicted in FIG. 10 and discussed below as being carried out by a playback device of the MPS 100 that is configured with a designated arbitrator NMD, such as one of the right or left playback devices of FIG. 3B or one of the right, left, or front playback devices of FIG. 3D. However, it should be understood that the method 1000 is merely exemplary. For instance, one or more blocks shown in the flow diagram of FIG. 10 may be rearranged into different orders, combined into fewer blocks, separated into additional blocks, and/or removed altogether. It should further be understood that the method 1000 could be performed by a device other than a playback device of the MPS 100, which may be part of a different type of system.

Turning now to FIG. 10, at block 1002, a first playback device equipped with an arbitrator NMD may detect sound via the at least one microphone 222.

At block 1004, the first playback device may identify a wake word based on the detected sound. The first playback device may identify the wake word based on the detected sound from a notification generated by the playback device or received from a second playback device, i.e., a non-arbitrating playback device.

At block 1006, the first playback device may receive, via the network interface 224, an indication that the second playback device, which may be in a bonded set or group with the first playback device, has also detected the sound and identified the wake word based on the sound as detected by the other playback device At block 1008, after receiving the indication, the first playback device may evaluate which of the playback devices in a set or group of devices is to extract sound data representing the sound. In the illustrated exampled depicted in FIG. 10, the first playback devices determines that the extraction of the sound data is to be performed by the second playback device over the first playback device.

At block 1010, in response to determining that the second playback device is to extract the sound data, the first playback device may forego extraction of the sound data at the first playback device. In some embodiments, the first playback device may then forward the extracted sound data of the second playback device to the VAS, while in other embodiments, the second playback device may directly transmit the extracted sound data to the VAS without forwarding the sound data to the first playback device, as discussed above.

At block 1012, the first playback device may receive, via the network interface 224 and from a network-based system configured to evaluate sound data for voice input and determine a corresponding VAS response (e.g., VAS 190), VAS response data that is indicative of a given VAS response corresponding to a given voice input identified in the sound data extracted by the second playback device.

Then, at block 1014, based on the VAS response data, the first playback device may output the given VAS response via one or more interfaces, such audio output interface 519, a visual interface or in various other manners.

CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. For example, in some implementations the arbitrator NMD may be configured to disregard some or all other NMDs in a set of bonded devices, such as by disabling wake-word detection on some or all of the NMDs in the set (e.g., to mitigate or further mitigate a ping-pong effect). In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1: A computer-implemented method comprising: detecting sound via at least one microphone, identifying a wake word based on the sound as detected by a first playback device, receiving, via a network interface, an indication that a second playback device has also detected the sound and identified the wake word based on the sound as detected by the second playback device, after receiving the indication, evaluating which of the first and second playback devices is to extract sound data representing the sound and thereby determining that the extraction of the sound data is to be performed by the second playback device over the first playback device, in response to the determining, foregoing extraction of the sound data at the first playback device, receiving, via the network interface from a network-based system that is configured to evaluate sound data for voice input and determine a corresponding VAS (Voice Assistant Service) response, VAS response data that is indicative of a given VAS response corresponding to a given voice input identified in the sound data extracted by the second playback device, and based on the VAS response data, playing back the given VAS response via an audio output interface.

Example 2: the computer-implemented method of claim 1, wherein identifying the wake word based on the sound as detected by the first playback device triggers the first playback device to determine a first feature of the sound as detected by the first playback device, wherein the indication that the second playback device has also detected the sound and identified the wake word based on the sound as detected by the second playback device comprises an indication of a second feature of the sound as detected by the second playback device, and wherein evaluating which of the first and second playback devices is to extract the sound data comprises comparing the first feature to the second feature.

Example 3: the computer-implemented method of any combination of Examples 1-2, wherein the first feature comprises a first signal-to-noise ratio of the sound as detected by the first playback device, and wherein the second feature comprises a second signal-to-noise ratio of the sound as detected by the second playback device.

Example 4: The computer-implemented method of any combination of Examples 1-3, in response to the determining, instructing the second playback device to perform the extraction of the sound data.

Example 5: The computer-implemented method of any combination of Examples 1-4, wherein the extraction of the sound data involves transmission of the sound data to the network-based system.

Example 6: The computer-implemented method of any combination of Examples 1-5, further comprising: receiving the sound data from the second playback device via the network interface, and transmitting the received sound data to the network-based system via the network interface.

Example 7: The computer-implemented method of any combination of Examples 1-6, further comprising: detecting a second sound via the at least one microphone, identifying the wake word based on the second sound as detected by the first playback device, receiving, via the network interface, a second indication that the second playback device has also detected the second sound and identified the wake word based on the second sound as detected by the second playback device, after receiving the second indication, evaluating which of the first and second playback devices is to extract second sound data representing the second sound and thereby determining that the extraction of the second sound data is to be performed by the first playback device over the second playback device, begin to perform the extraction of the second sound data, and thereafter cease the extraction of the second sound data in response to receiving an indication that the network-based system has selected a third playback device to extract the second sound data.

Example 8: The computer-implemented method of any combination of examples 1-7, wherein the first playback device and the second playback device are members of a bonded set, and wherein the third playback device is not a member of the bonded set.

Example 9: The computer-implemented method of any combination of examples 1-8, wherein the VAS response data comprises at least one of (a) a data representation of the given VAS response or (b) an identifier of the given VAS response.

Example 10: A first playback device, comprising: at least one microphone, an audio output interface, a network interface, at least one processor, a non-transitory computer-readable medium; and program instructions stored on the non-transitory computer-readable medium that, when executed by the at least one processor, cause the first playback device to perform functions comprising: any combination of Examples 1-9.

Example 11: A tangible, non-transitory, computer-readable medium having instructions stored thereon that are executable by one or more processors to cause a first playback device to perform operations comprising: any combination of Examples 1-10.

The invention claimed is:

1. A playback device comprising:

an audio output interface;

at least one processor;

at least one non-transitory computer-readable medium; and program instructions stored on the at least one non-transitory computer-readable medium that are executable by the at least one processor such that the playback device is configured to:

form an arbitration group with one or more first additional playback devices, wherein each respective playback device of the arbitration group has detected a first sound and identified a wake word based on the first sound as detected by the respective playback device;

evaluate which playback device of the arbitration group is to respond to voice input included in the first sound;

based on the evaluation, determine a given playback device of the arbitration group that is to respond to the voice input included in the first sound; and based on the determination:

if the given playback device comprises the playback device, (i) designate the playback device as a response device of the arbitration group and (ii) output, via the audio output interface of the playback device, an audio response to the voice input included in the first sound; or if the given playback device comprises one of the one or more first additional playback devices, cause the given playback device to (i) be designated as a response device of the arbitration group and (ii) output, via an audio output interface of the given playback device, an audio response to the voice input included in the first sound.

2. The playback device of claim 1, wherein the program instructions that are executable by the at least one processor such that the playback device is configured to evaluate which playback device of the arbitration group is to respond to the voice input included in the first sound comprise program instructions that are executable by the at least one processor such that the playback device is configured to:

determine a respective feature of the first sound as detected by each respective playback device of the arbitration group; and perform a comparison of the respective features of the first sound as detected by the playback devices of the arbitration group.

3. The playback device of claim 2, wherein the respective feature of the first sound as detected by each respective playback device of the arbitration group comprises a respective signal-to-noise ratio of the first sound as detected by the respective playback device.

4. The playback device of claim 2, wherein the respective feature of the first sound as detected by each respective playback device of the arbitration group comprises a respective confidence level of the first sound as detected by the respective playback device.

5. The playback device of claim 2, wherein the respective feature of the first sound as detected by each respective playback device of the arbitration group comprises a respective direction of the first sound as detected by the respective playback device.

6. The playback device of claim 1, wherein the program instructions that are executable by the at least one processor such that the playback device is configured to evaluate which playback device of the arbitration group is to respond to the voice input included in the first sound comprise program instructions that are executable by the at least one processor such that the playback device is configured to:

determine a respective playback device role of each playback device in the arbitration group; and evaluate which playback device of the arbitration group is to respond to the voice input included in the first sound based on the respective playback device role of the given playback device.

7. The playback device of claim 1, wherein;

the program instructions that are executable by the at least one processor such that the playback device is configured to output, via the audio output interface of the playback device, the audio response to the voice input included in the first sound comprise program instructions that are executable by the at least one processor such that the playback device is configured to:

extract, from the first sound, sound data comprising the voice input;

process the extracted sound data and thereby determine a VAS response; and output the VAS response via the audio output interface of the playback device; and the program instructions that are executable by the at least one processor such that the playback device is configured to cause the given playback device to output, via the audio output interface of the given playback device, the audio response to the voice input included in the first sound comprise program instructions that are executable by the at least one processor such that the playback device is configured to:

cause the given playback device of the arbitration group to (i) extract, from the first sound, the sound data comprising the voice input, (ii) process the extracted sound data and thereby determine the VAS response, and (iii) output the VAS response via the audio output interface of the given playback device.

8. The playback device of claim 7, wherein processing the extracted sound data and thereby determining the VAS response comprises:

transmitting the extracted sound data to a network-based system that is configured to evaluate sound data for voice input and determine a corresponding VAS response; and receiving, from the network-based system, VAS response data that is indicative of the VAS response corresponding to the voice input included in the extracted sound data.

9. The playback device of claim 1, wherein;

the program instructions that are executable by the at least one processor such that the playback device is configured to designate the playback device as the response device of the arbitration group comprise program instructions that are executable by the at least one processor such that the playback device is configured to:

cause the playback device, and not any other playback device of the arbitration group, to respond to any new voice inputs included in any new sound detected by any playback device of the arbitration group within a given period of time; and the program instructions that are executable by the at least one processor such that the playback device is configured to cause the given playback device to be designated as the response device of the arbitration group comprise program instructions that are executable by the at least one processor such that the playback device is configured to:

cause the given playback device, and not any other playback device of the arbitration group, to respond to any new voice inputs included in any new sound detected by any playback device of the arbitration group within the given period of time.

10. The playback device of claim 1, further comprising program instructions stored on the at least one non-transitory computer-readable medium that are executable by the at least one processor such that the playback device is configured to:

continue to detect for new sound for a given period of time; and after the given period of time has lapsed and no new sound has been detected, leave the arbitration group.

11. The playback device of claim 1, wherein the arbitration group is a first arbitration group, the playback device further comprising program instructions stored on the at least one non-transitory computer-readable medium that are executable by the at least one processor such that the playback device is configured to:

after the audio response to the voice input included in the first sound is output, leave the first arbitration group;

after leaving the first arbitration group, form a second arbitration group with one or more second additional playback devices, wherein each respective playback device in the second arbitration group has detected a second sound and identified a wake word based on the second sound as detected by the respective playback device;

evaluate which playback device of the second arbitration group is to respond to voice input included in the second sound; and based on the evaluation, cause a given playback device of the second arbitration group to be designated as a response device of the second arbitration group.

12. The playback device of claim 11, wherein the one or more first additional playback devices are different from the one or more second additional playback devices.

13. A non-transitory computer-readable medium, wherein the non-transitory computer-readable medium is provisioned with program instructions that, when executed by at least one processor, cause a playback device to:

form an arbitration group with one or more first additional playback devices, wherein each respective playback device of the arbitration group has detected a first sound and identified a wake word based on the first sound as detected by the respective playback device;

evaluate which playback device of the arbitration group is to respond to voice input included in the first sound;

based on the evaluation, determine a given playback device of the arbitration group that is to respond to the voice input included in the first sound; and based on the determination:

if the given playback device comprises the playback device, (i) designate the playback device as a response device of the arbitration group and (ii) output, via an audio output interface of the playback device, an audio response to the voice input included in the first sound; or if the given playback device comprises one of the one or more first additional playback devices, cause the given playback device to (i) be designated as a response device of the arbitration group and (ii) output, via an audio output interface of the given playback device, an audio response to the voice input included in the first sound.

14. The non-transitory computer-readable medium of claim 13, wherein the program instructions that, when executed by at least one processor, cause the playback device to evaluate which playback device of the arbitration group is to respond to the voice input included in the first sound comprise program instructions that, when executed by at least one processor, cause the playback device to:

determine a respective feature of the first sound as detected by each respective playback device of the arbitration group; and perform a comparison of the respective features of the first sound as detected by the playback devices of the arbitration group.

15. The non-transitory computer-readable medium of claim 14, wherein the respective features of the first sound comprise respective confidence levels of the first sound as detected by the playback devices of the arbitration group.

16. The non-transitory computer-readable medium of claim 14, wherein the respective features of the first sound comprise respective directions of the first sound as detected by the playback devices of the arbitration group.

17. The non-transitory computer-readable medium of claim 13, wherein the program instructions that, when executed by at least one processor, cause the playback device to evaluate which playback device of the arbitration group is to respond to the voice input included in the first sound comprise program instructions that, when executed by at least one processor, cause the playback device to:

determine a respective playback device role of each playback device in the arbitration group; and evaluate which playback device of the arbitration group is to respond to the voice input included in the first sound based on the respective playback device role of the given playback device.

18. A method carried out by a playback device, the method comprising:

forming an arbitration group with one or more first additional playback devices, wherein each respective playback device of the arbitration group has detected a first sound and identified a wake word based on the first sound as detected by the respective playback device;

evaluating which playback device of the arbitration group is to respond to voice input included in the first sound;

based on the evaluation, determining a given playback device of the arbitration group that is to respond to the voice input included in the first sound; and based on the determination:

if the given playback device comprises the playback device, (i) designating the playback device as a response device of the arbitration group and (ii) outputting, via an audio output interface of the playback device, an audio response to the voice input included in the first sound; or if the given playback device comprises one of the one or more first additional playback devices, causing the given playback device to (i) be designated as a response device of the arbitration group and (ii) output, via an audio output interface of the given playback device, an audio response to the voice input included in the first sound.

19. The method of claim 18, wherein evaluating which playback device of the arbitration group is to respond to the voice input included in the first sound comprises:

determining a respective feature of the first sound as detected by each respective playback device of the arbitration group; and performing a comparison of the respective features of the first sound as detected by the playback devices of the arbitration group.

20. The method of claim 19, wherein the respective feature of the first sound as detected by each respective playback device of the arbitration group comprises (i) a respective signal-to-noise ratio of the first sound as detected by the respective playback device, (ii) a respective confidence level of the first sound as detected by the respective playback device, or (iii) a respective direction of the first sound as detected by the respective playback device.

* * * * *